US012693821B2

(12) United States Patent
Yamagishi et al.

(10) Patent No.: US 12,693,821 B2
(45) Date of Patent: Jul. 28, 2026

(54) INFORMATION PROCESSING DEVICE AND METHOD, AND PROGRAM FOR DISPLAYING A REACTION OF A SPECTATOR

(71) Applicant: Sony Group Corporation, Tokyo (JP)

(72) Inventors: Asami Yamagishi, Tokyo (JP); Goro Takaki, Tokyo (JP); Hajime Ogura, Kanagawa (JP); Hiromu Yumiba, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 98 days.

(21) Appl. No.: 18/688,231

(22) PCT Filed: Mar. 10, 2022

(86) PCT No.: PCT/JP2022/010490
§ 371 (c)(1),
(2) Date: Feb. 29, 2024

(87) PCT Pub. No.: WO2023/037606
PCT Pub. Date: Mar. 16, 2023

(65) Prior Publication Data
US 2024/0378781 A1 Nov. 14, 2024

(30) Foreign Application Priority Data
Sep. 7, 2021 (JP) ................................ 2021-145226

(51) Int. Cl.
G06T 11/60 (2026.01)
G06F 3/14 (2006.01)
H04N 21/442 (2011.01)

(52) U.S. Cl.
CPC ................ G06T 11/60 (2013.01); G06F 3/14 (2013.01); H04N 21/44218 (2013.01)

(58) Field of Classification Search
None
See application file for complete search history.

(56) References Cited

U.S. PATENT DOCUMENTS

| 2017/0264954 A1* | 9/2017 | Nakagawa ....... H04N 21/44008 |
| 2021/0056750 A1 | 2/2021 | Rowley |
| 2022/0132224 A1* | 4/2022 | Hayashi ............. H04N 21/2668 |
| 2022/0345782 A1* | 10/2022 | Kojima ............. H04N 21/2187 |

(Continued)

FOREIGN PATENT DOCUMENTS

| JP | 2017-016535 A | 1/2017 |
| JP | 2019-050576 A | 3/2019 |

(Continued)

*Primary Examiner* — Jeffrey J Chow
(74) *Attorney, Agent, or Firm* — Paratus Law Group, PLLC

(57) ABSTRACT

The present technology relates to an information processing device, a method, and a program that more effectively display a reaction of a spectator. The information processing device includes a communication unit that receives reaction information indicating the reaction of the spectator outside a venue of a predetermined event and a control unit that generates an effect video that changes according to the reaction of the spectator on the basis of the reaction information. The present technology is applicable to a remote live system.

18 Claims, 44 Drawing Sheets

(56)     References Cited

U.S. PATENT DOCUMENTS

2023/0199252 A1* 6/2023 Shida ............... H04N 21/44218
                                                      725/14
2023/0326115 A1* 10/2023 Xiao .................... H04N 21/431
                                                      345/473
2023/0421865 A1* 12/2023 Noto .................... H04N 9/8205
2024/0089686 A1* 3/2024 Kotani ...................... H04S 3/00

FOREIGN PATENT DOCUMENTS

JP        2020-009027 A      1/2020
JP        2021-077257 A      5/2021

* cited by examiner

REPRODUCTION PROCESSING START

RECEIVE DISTRIBUTION VIDEO    S41

REPRODUCE DISTRIBUTION VIDEO    S42

ACQUIRE REACTION INFORMATION    S43

TRANSMIT REACTION INFORMATION    S44

END

*FIG. 18*

SPHERE

CUBE

FIG. 31

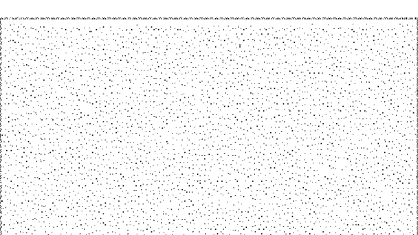

PLANE

Great! I'm so happy  I want to see more  Thank you  Impressed  Do not finish  Cool!!
Great  Too much fun!  This sound is cool  Thanks for the great live!
Genius  Final fireworks are cool  Cute  Impressed so much  I can work hard tomorrow
Amazing, great  Amazing music  Endless excitement  Connecting  Share the same time  Not
enough  I will follow you  Cool  Wave your hands  So many comments  Iconic song!!
Really good  I'm happy to see  I enjoy  I want to listen more  Do not finish  Touching
Impressed  I was just as well that I was fan  The best memory in this year  Connecting even
we are apart from each other!  Definitely go to live next year!  I really enjoyed  So happy
Thank you  So cool  Great!  I'm so happy  I want to see more  Thank you  Impressed  Do
not finish  Cool!!  Great  Too much fun!  This sound is cool  Thanks for the great live
Genius  Final fireworks are cool  Cute  Impressed so much  I can work hard tomorrow

RING

OPERATION SIDE

SEND CAPTURED
MOVING IMAGE
BEFORE LIVE

Q131

TRANSITION MODE
(SWITCH PERSON FOR
EACH CERTAIN TIME)

Q132

CHORUS MODE
(SIMULTANEOUSLY DISPLAY FACES
OF LARGE NUMBER OF PEOPLE)

DISPLAY EDITED VIDEO
DURING LIVE

INFORMATION PROCESSING DEVICE AND METHOD, AND PROGRAM FOR DISPLAYING A REACTION OF A SPECTATOR

CROSS REFERENCE TO PRIOR APPLICATION

This application is a National Stage Patent Application of PCT International Patent Application No. PCT/JP2022/010490 (filed on Mar. 10, 2022) under 35 U.S.C. § 371, which claims priority to Japanese Patent Application No. 2021-145226 (filed on Sep. 7, 2021), which are all hereby incorporated by reference in their entirety.

TECHNICAL FIELD

The present technology relates to an information processing device and method and program, and more particularly, to an information processing device and method, and program that can more effectively present a reaction of a spectator.

BACKGROUND ART

In recent years, a remote live has been known in which a video captured in a venue with no audience or with an audience is live-distributed to an audience outside the venue online.

For example, as a technology related to the remote live, a technology has been proposed in which a sensor senses a motion of each of a plurality of spectators and a virtual space event for presenting a video in which an avatar in a virtual space moves according to the motions of the spectators is realized (for example, refer to Patent Document 1).

In the remote live, since a performer who performs a performance such as performance at a venue cannot see a reaction of a spectator such an excitement degree of the spectators at a distribution destination of a live video, the performer unilaterally plays the performance or the like. Therefore, there is a case where the performer cannot increase motivation, and in addition, the performer cannot communicate with the spectators.

CITATION LIST

Patent Document

Patent Document 1: Japanese Patent Application Laid-Open No. 2019-50576

SUMMARY OF THE INVENTION

Problems to be Solved by the Invention

Currently, as a method for presenting a reaction of a viewer (spectator) in real time to online distribution, there are a method for inputting a text message in a chat field provided in a window of the online distribution and a method for scroll displaying a text message input by the spectator in an entire screen of the online distribution. Furthermore, there is a method for selecting a button representing a feeling of the spectator from among buttons prepared in advance or a method for displaying the number of accesses in the online distribution.

However, even if these methods are used, it cannot be said that it is possible to sufficiently tell (express) reactions such as the excitement degree, enthusiasm, or support of the spectators to the remote live venue, that is, the performer in the remote live.

The present technology has been made in view of such a situation, and can more effectively present a reaction of a spectator.

Solutions to Problems

An information processing device according to one aspect of the present technology includes a communication unit that receives reaction information indicating a reaction of a spectator outside a venue of a predetermined event and a control unit that generates an effect video that changes according to the reaction of the spectator, on the basis of the reaction information.

An information processing method and program according to one aspect of the present technology include steps for receiving reaction information indicating a reaction of a spectator outside a venue of a predetermined event and generating an effect video that changes according to the reaction of the spectator, on the basis of the reaction information.

According to one aspect of the present technology, reaction information indicating a reaction of a spectator outside a venue of a predetermined event is received, and an effect video that changes according to the reaction of the spectator is generated, on the basis of the reaction information.

BRIEF DESCRIPTION OF DRAWINGS

FIG. 1 is a diagram illustrating a configuration example of a remote live system.

FIG. 2 is a diagram illustrating an installation example of a screen.

FIG. 5 is a diagram illustrating a configuration example of a spectator-side terminal.

FIG. 18 is a diagram for explaining a change in a movement of the fountain at an excitement point.

FIG. 31 is a diagram illustrating an example of the collection of the messages.

FIG. 35 is a diagram for explaining a change in a size of a sphere.

FIG. 39 is a diagram for explaining display of a message on a cube.

FIG. 41 is a diagram for explaining switching of a display mode.

FIG. 45 is a diagram illustrating a configuration example of a computer.

MODE FOR CARRYING OUT THE INVENTION

Figure 3:
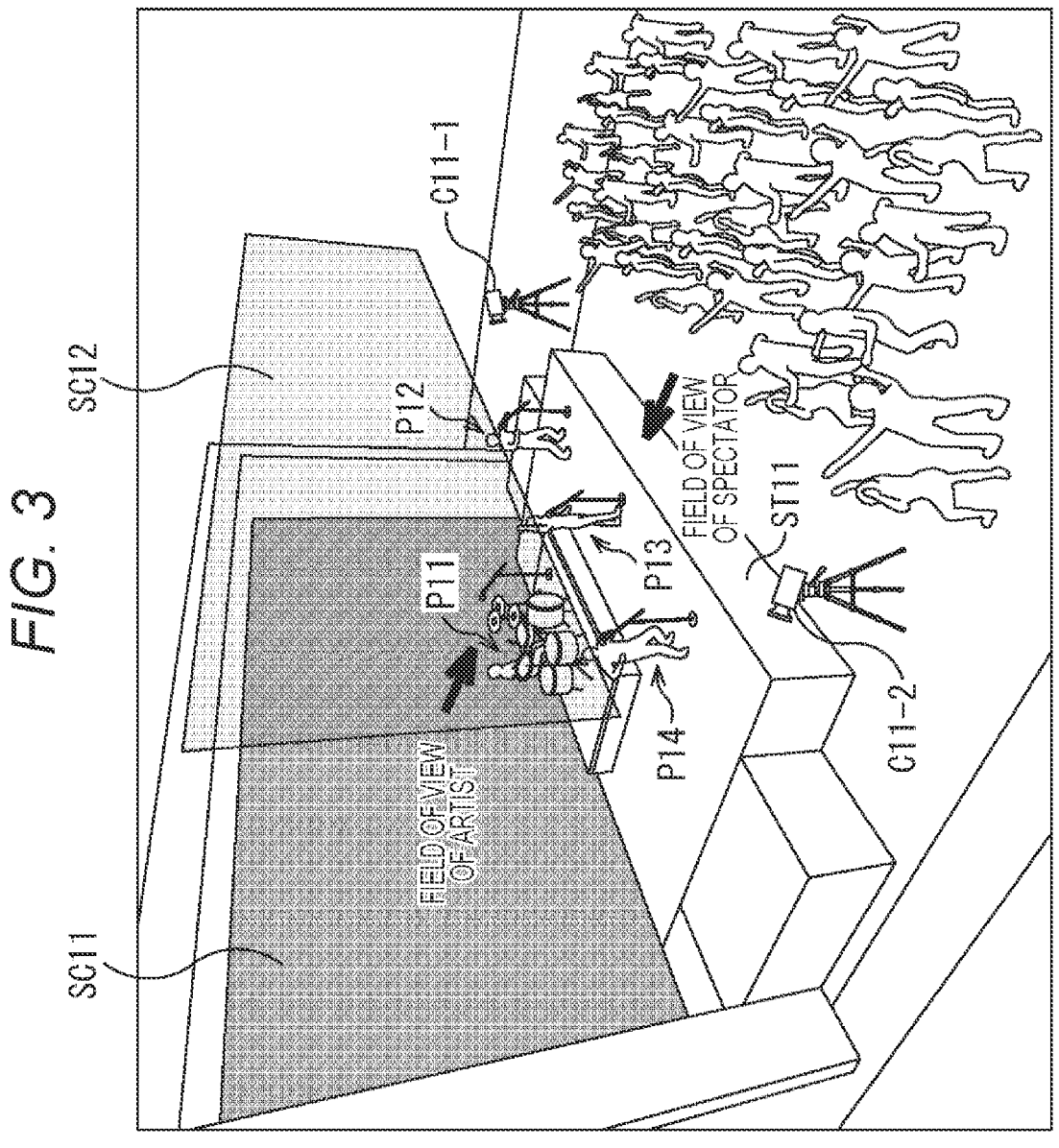
FIG. 3 is a diagram illustrating an installation example of the screen.

Hereinafter, embodiments to which the present technology is applied will be described with reference to the drawings.

First Embodiment

Configuration Example of Remote Live System

The present technology generates an effect video that changes according to a reaction of a spectator in a remote live and presents the video to a performer and the spectator.

As a result, it is possible to visualize reactions of a plurality of spectators who is not in a remote live venue and more effectively present the reactions of the spectators. Furthermore, by presenting the effect video, it is possible to realize communication between the performer and a large number of spectators who are not visible to the performer (at distant places) via the effect video.

For example, the effect video can be a video of a predetermined object such as a fountain or a firework that changes or occurs with time according to the reaction of the spectator. At this time, a size, a shape, a color, or the like of the object may change according to the reaction of the spectator. Furthermore, the effect video may be amplified, for example, according to an excitement of music or the like.

Furthermore, for example, a video of an object of a figure such as a sphere or a cube having a surface on which a message (text information) including characters and symbols input by the spectator is displayed, that is, an object that is a collection of messages may be used as the effect video.

In such a case, for example, according to the number of messages and the number of characters transmitted from a spectator side, according to an operation on an operation side, or the like, an object display form such as the size, the shape, and an arrangement position of the object, or a size of a message to be displayed may change with time.

Moreover, for example, a video of a face of a spectator imaged on the spectator side, a point-clouded video of the face of the spectator obtained from the video, or the like may be used as the effect video. In such a case, the video captured by the spectator side may be a video, indicating a reaction of the spectator before start of the remote live, captured in advance or may be a video indicating a real-time reaction of the spectator for the remote live, captured during the remote live.

In a case where the face of the spectator or the message is displayed as the effect video, the reactions of the spectators can be directly presented to the performer.

Figure 1:
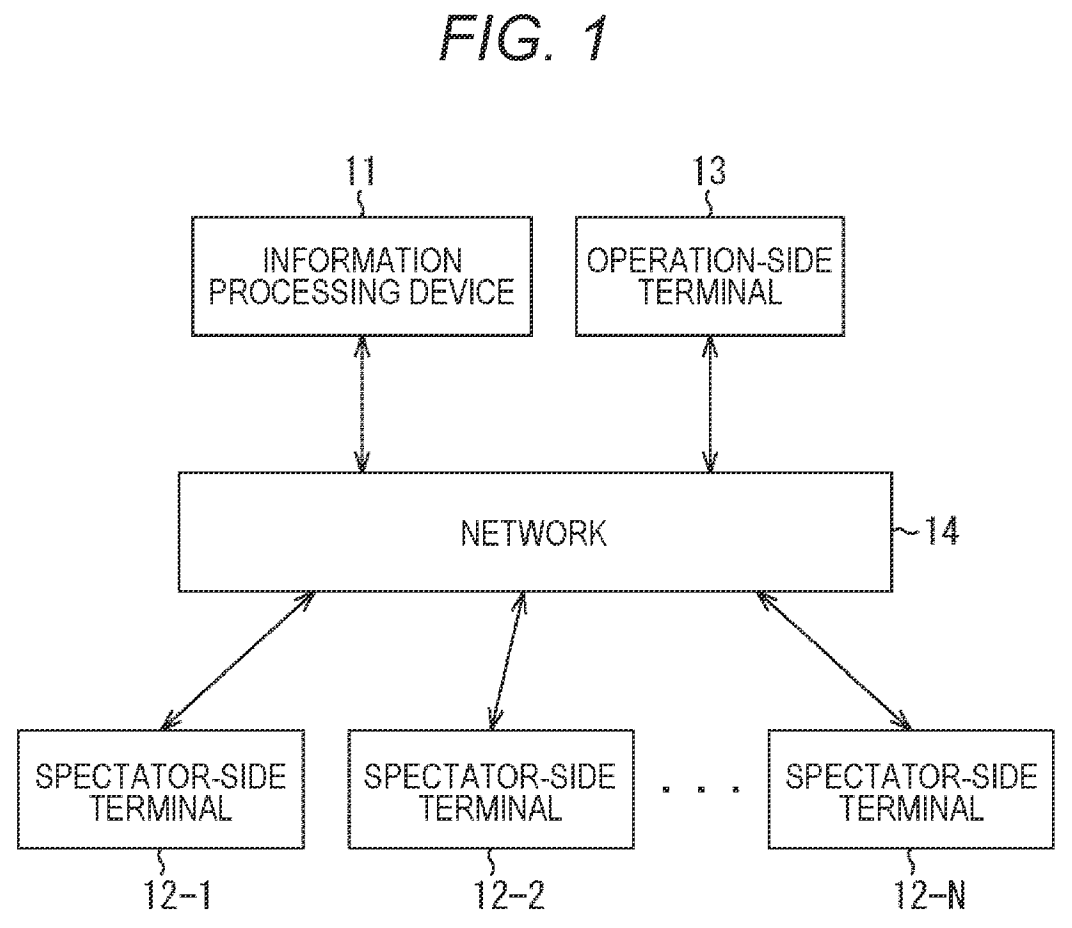

FIG. 1 is a diagram illustrating a configuration example of an embodiment of a remote live system to which the present technology is applied. In this remote live system, a remote live is realized in which a performer in a venue and a large number of spectators outside the venue can communicate with each other via the effect video.

The remote live system illustrated in FIG. 1 includes an information processing device 11, spectator-side terminals 12-1 to 12-N, and an operation-side terminal 13.

The information processing device 11 includes, for example, a server that is managed by an operator of the remote live or the like, and is connected to the spectator-side terminals 12-1 to 12-N via a network 14 such as the Internet.

Furthermore, the information processing device 11 is connected to the operation-side terminal 13 via the network 14. Note that the information processing device 11 and the operation-side terminal 13 may be directly connected in a wireless or wired manner.

The information processing device 11 receives reaction information indicating the reaction of each spectator, transmitted from the spectator-side terminals 12-1 to 12-N and generates an effect video on the basis of the received reaction information, in response to an instruction input appropriately supplied from the operation-side terminal 13.

Furthermore, the information processing device 11 causes a display device such as a display installed in the remote live venue to display the generated effect video and transmits (distribute) a distribution video of the remote live to the spectator-side terminals 12-1 to 12-N.

Here, the distribution video is, for example, a video of a performance such as the performance by the performer in the remote live, including the effect video as a subject. That is, the distribution video is the video of the remote live including the effect video as the subject.

Note that the distribution video may be a video obtained by performing imaging so as to include the effect video and the performer as the subjects, in a state where the effect video is displayed (reproduced) or may be a video obtained by synthesizing the effect video with the video of the performance of the performer or the like.

Each of the spectator-side terminals 12-1 to 12-N includes a personal computer (PC), a tablet-type terminal device, a smartphone, a smart television, a game machine, a head mounted display, or the like of the spectator, outside the remote live venue.

For example, each spectator views the video of the remote live with the spectator-side terminals 12-1 to 12-N, outside the remote live venue. That is, the spectator participates in the remote live from the outside of the venue.

The spectator-side terminals 12-1 to 12-N detect a reaction of the spectator in the remote live, generates the reaction information, transmits the reaction information to the information processing device 11, and receives the distribution video from the information processing device 11 and reproduces the distribution video.

Note that, hereinafter, in a case where it is not necessary to particularly distinguish the spectator-side terminals 12-1 to 12-N from each other, the spectator-side terminals 12-1 to 12-N may be simply referred to as a spectator-side terminal 12. Furthermore, the number N of spectator-side terminals 12 may be any number.

The operation-side terminal 13 includes, for example, a tablet-type terminal device in the remote live venue or the like. The operation-side terminal 13 is operated by the operator (operator concerned party) or the performer (performer) of the remote live and supplies (transmits) an instruction input or the like regarding the effect video or the like according to the operation to the information processing device 11.

Installation Example of Screen

Figure 2:
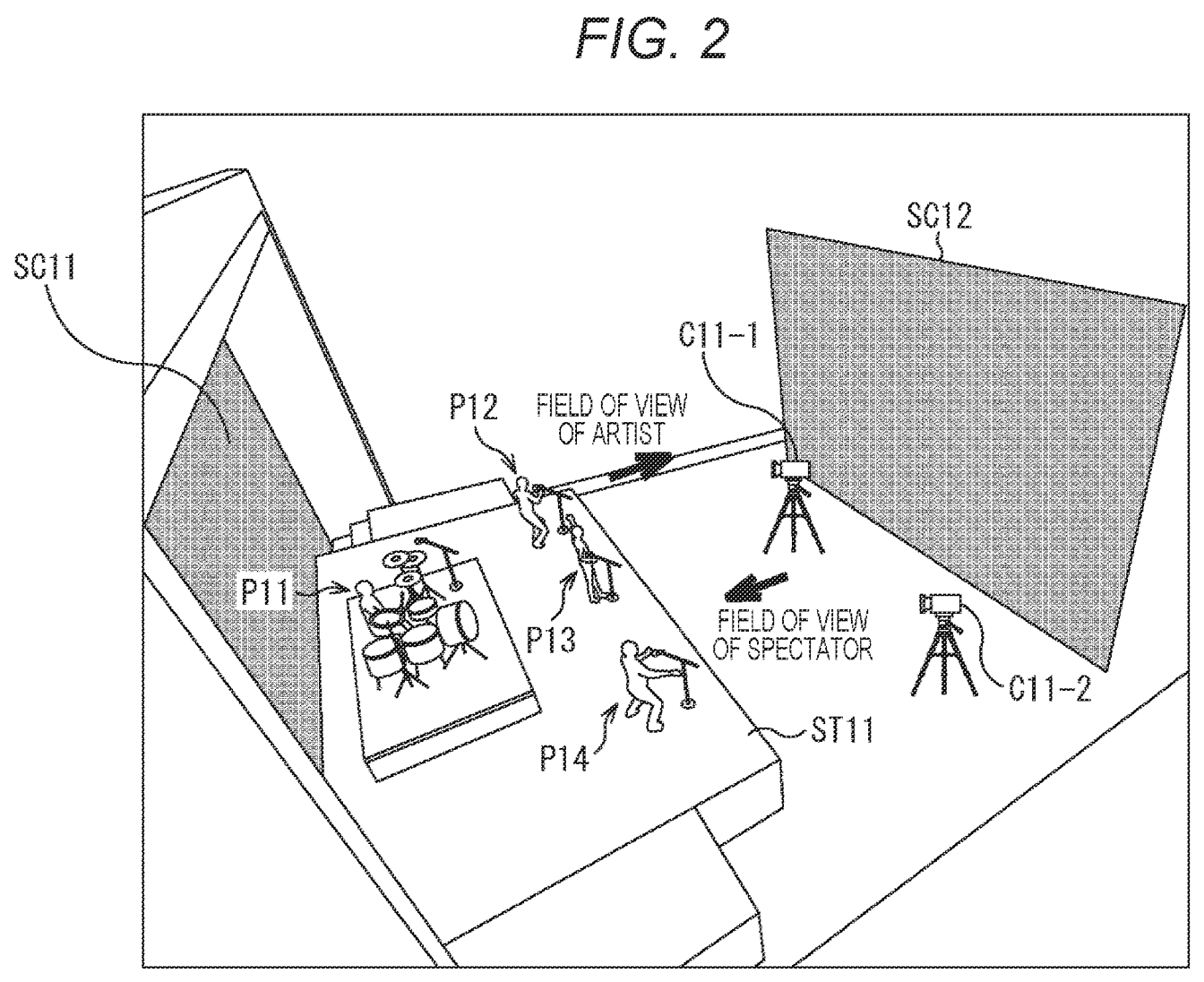

For example, in a case where the remote live is held with no audience, that is, in a case where there is no audience in the venue, as illustrated in FIG. 2, a back screen SC11 and a sub screen SC12 for displaying the effect video are installed in the venue.

In this example, performers P11 to P14 who are four artists are on a stage ST11, and these performers P11 to P14 perform.

Furthermore, behind (rear side of performer) the stage ST11 as viewed from the performers P11 to P14, the back screen SC11 is installed, and the effect video is displayed on the back screen SC11. Then, the performers P11 to P14 and the back screen SC11 are imaged by cameras C11-1 and C11-2 installed in front of the stage ST11 as the subjects, and the distribution video is obtained. Note that, hereinafter, in a case where it is not particularly necessary to distinguish the cameras C11-1 and C11-2 from each other, the cameras C11-1 and C11-2 are simply referred to as a camera C11.

Moreover, the sub screen SC12 is installed in front of the stage ST11, that is, in front of the performers P11 to P14, and the effect video or the distribution video is displayed on the sub screen SC12. Therefore, the performers P11 to P14 can perform the performance or the like while visually confirming the effect video displayed on the sub screen SC12, in other words, the reaction of the spectator who is participating in the remote live from a place away from the venue.

By presenting the effect video to the spectator in this way, it is possible to visualize and effectively present the reaction of the spectator such as an excitement degree, enthusiasm, or support to the performer and to realize the communication between the performer and the spectator via the effect video. As a result, the performer can perform the performance or the like while maintaining high motivation.

Note that the back screen SC11 and the sub screen SC12 may be a screen that displays a video projected by a projector or the like or may be a display that directly displays the effect video and the distribution video.

Furthermore, here, an example has been described where the back screen SC11 and the sub screen SC12 are provided in the venue. However, only one of the back screen SC11 and the sub screen SC12 may be provided.

For example, in a case where only the sub screen SC12 is installed in the venue and the back screen SC11 is not installed, the video imaged by the camera C11 and the effect video are synthesized to be the distribution video. In such an example, it is possible to generate and distribute the distribution video with the effect video different for each spectator or for each spectator group including the plurality of spectators.

Furthermore, in a case where the remote live is held in a hybrid manner, that is, in a case where there are spectators not only outside the remote live venue but also in the venue, for example, as illustrated in FIG. 3, it is considered to install the back screen SC11 and the sub screen SC12 in the venue. Note that, in FIG. 3, portions corresponding to those in FIG. 2 are denoted by the same reference numerals, and description thereof will be omitted as appropriate.

In the example in FIG. 3, the back screen SC11 is installed behind the stage ST11, and the semi-transparent sub screen SC12 is installed on the upper front side of the stage ST11.

Furthermore, there are a large number of spectators in front of the stage ST11, that is, in front of the performers P11 to P14, when viewing the venue from the above, the semi-transparent sub screen SC12 is installed between the stage ST11 and the spectators. In particular, in this example, the sub screen SC12 is installed at a position higher than positions of faces of the performer and the spectators.

Therefore, the performers P11 to P14 can see not only the effect video or the distribution video displayed on the sub screen SC12 but also spectators on a back side of the venue directly or via the sub screen SC12.

In the example illustrated in FIGS. 2 and 3 as described above, the spectator who is participating from the outside of the venue inputs an own reaction with the spectator-side terminal 12 and views the distribution video distributed by the information processing device 11 so as to know a state of the venue, that is, not only the performance or the like of the performer but also the reaction such as the excitement of a large number of spectators. Furthermore, the performer can directly view the effect video presented on the screen installed in the venue and can know the reaction such as the excitement of the spectator.

Moreover, the operator appropriately operates the operation-side terminal 13 according to a predetermined set live, a camera angle, an illumination, or the like and can control the generation of the effect video, that is, production of the remote live, such as which effect is used for which song.

Configuration Example of Information Processing
Device and Operation-Side Terminal Subsequently, a configuration example of each device included in the remote live system will be described.

Figure 4:
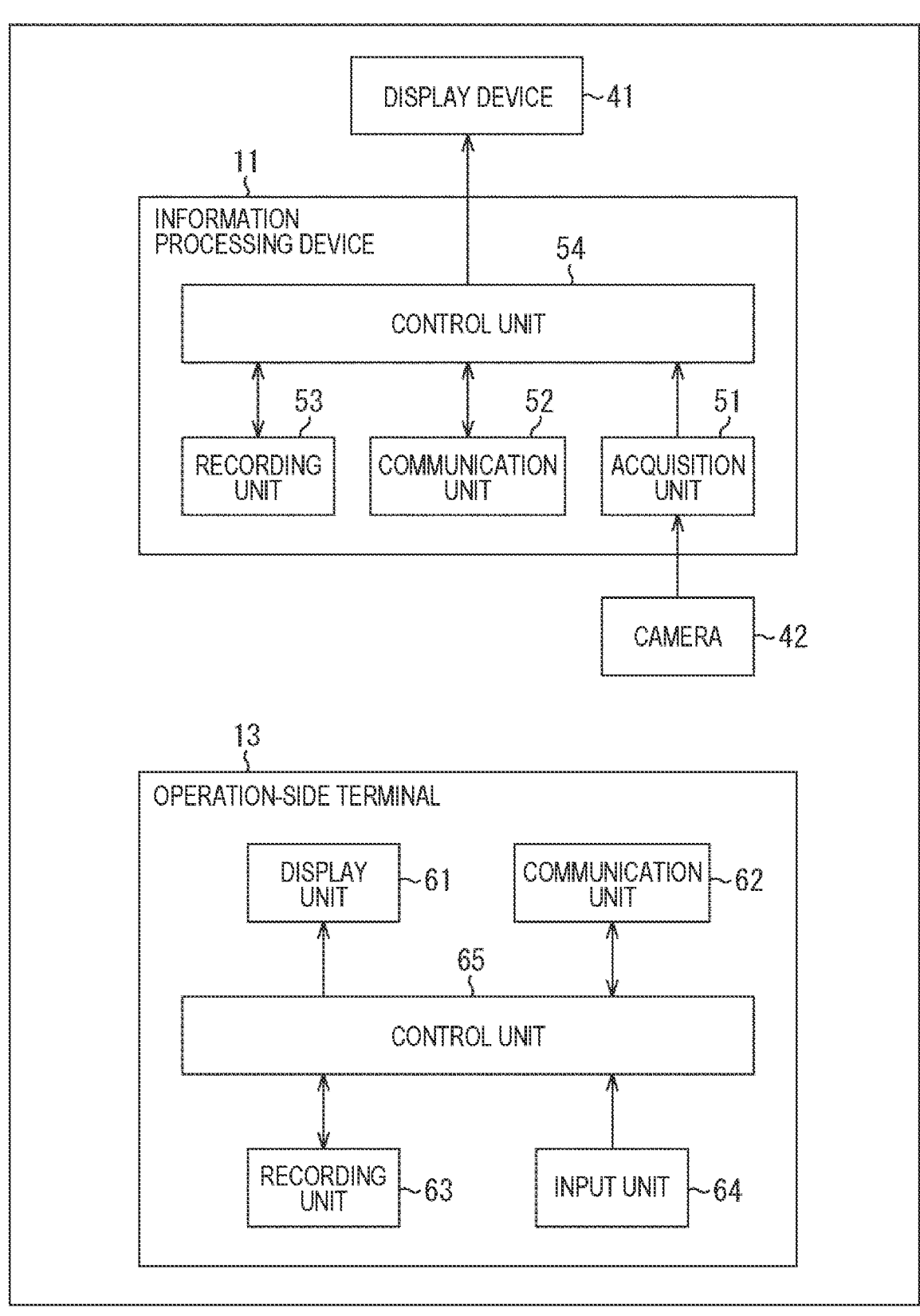
FIG. 4 is a diagram illustrating a configuration example of an information processing device and an operation-side terminal.

First, configuration examples of the information processing device 11 and the operation-side terminal 13 will be described with reference to FIG. 4.

This example is an example in which the information processing device 11, a display device 41, and a camera 42 are arranged (installed) in the remote live venue and the information processing device 11 directly outputs the effect video to the display device 41. Note that the effect video output from the information processing device 11 may be supplied to the display device 41 installed in the venue, via another device.

The display device 41 corresponds to, for example, the back screen SC11 or the sub screen SC12 illustrated in FIGS. 2 and 3 and displays the effect video or the distribution video supplied from the information processing device 11.

Note that the display device 41 may include a projector or the like, project light corresponding to the effect video or the distribution video on a screen installed in the venue, and display the effect video or the distribution video. In the following description, it is assumed that the display device 41 include a display such as a liquid crystal display panel and display the effect video supplied from the information processing device 11.

The camera 42 corresponds to, for example, the camera C11 illustrated in FIGS. 2 and 3, images the performer in the venue as the subject, and outputs a video obtained as a result (hereinafter, also referred to as captured image) to the information processing device 11.

Note that the captured image may include not only the performer but also the effect video displayed on the display device 41 as the subjects. Hereinafter, description is made as basically assuming that the captured image does not include the effect video as the subject.

The information processing device 11 includes an acquisition unit 51, a communication unit 52, a recording unit 53, and a control unit 54.

The acquisition unit 51 acquires the captured image output from the camera 42 and supplies the captured image to the control unit 54. The captured image is accompanied by sound collected by a microphone built in the camera 42, for example.

The communication unit 52 communicates with the spectator-side terminal 12 and the operation-side terminal 13. That is, the communication unit 52 receives information transmitted from the spectator-side terminal 12 and the operation-side terminal 13 and supplies the information to the control unit 54 or transmits information supplied from the control unit 54 to the spectator-side terminal 12 and the operation-side terminal 13.

The recording unit 53 records various types of data such as auxiliary information generated in advance or the distribution video, the effect video, or the like supplied from the control unit 54 and appropriately supplies the recorded data to the control unit 54.

For example, the recording unit 53 records set list information indicating a song name to be played in the remote live, a performance order of songs, or the like, a list of spectators who are participating in the remote live, that is, spectator identification information indicating the spectator-side terminal 12 corresponding to the spectator, setting information such as a purchase history of the spectator or the like, as the auxiliary information.

The control unit 54 controls an entire operation of the information processing device 11.

For example, the control unit 54 generates the effect video on the basis of the reaction information supplied from the communication unit 52 or supplies the generated effect video to the display device 41 and displays the effect video. Furthermore, the control unit 54 generates the distribution video on the basis of the effect video and the captured image supplied from the acquisition unit 51.

Note that, more specifically, the distribution video is accompanied by sound, and the accompanying sound of the distribution video is generated, for example, from sound accompanied by the captured image, and in addition, sound collected by a microphone (not illustrated) installed in the venue or the like.

The operation-side terminal 13 includes a display unit 61, a communication unit 62, a recording unit 63, an input unit 64, and a control unit 65.

The display unit 61 displays various images (video) such as the effect video supplied from the control unit 65. The communication unit 62 communicates with the information processing device 11. For example, the communication unit 62 transmits information supplied from the control unit 65 to the information processing device 11, or receives the effect video or the like transmitted from the information processing device 11 and supplies the effect video to the control unit 65.

The recording unit 63 records various types of data and supplies the recorded data to the control unit 65 as necessary. The input unit 64 includes a switch, a button, a touch panel superimposed and provided on the display unit 61, or the like and supplies a signal according to an operation of the operator or the performer to the control unit 65.

The control unit 65 controls an entire operation of the operation-side terminal 13. For example, the control unit 65 supplies the effect video received by the communication unit 62 to the display unit 61 and displays the effect video.

Configuration Example of Spectator-Side Terminal

Figure 5:
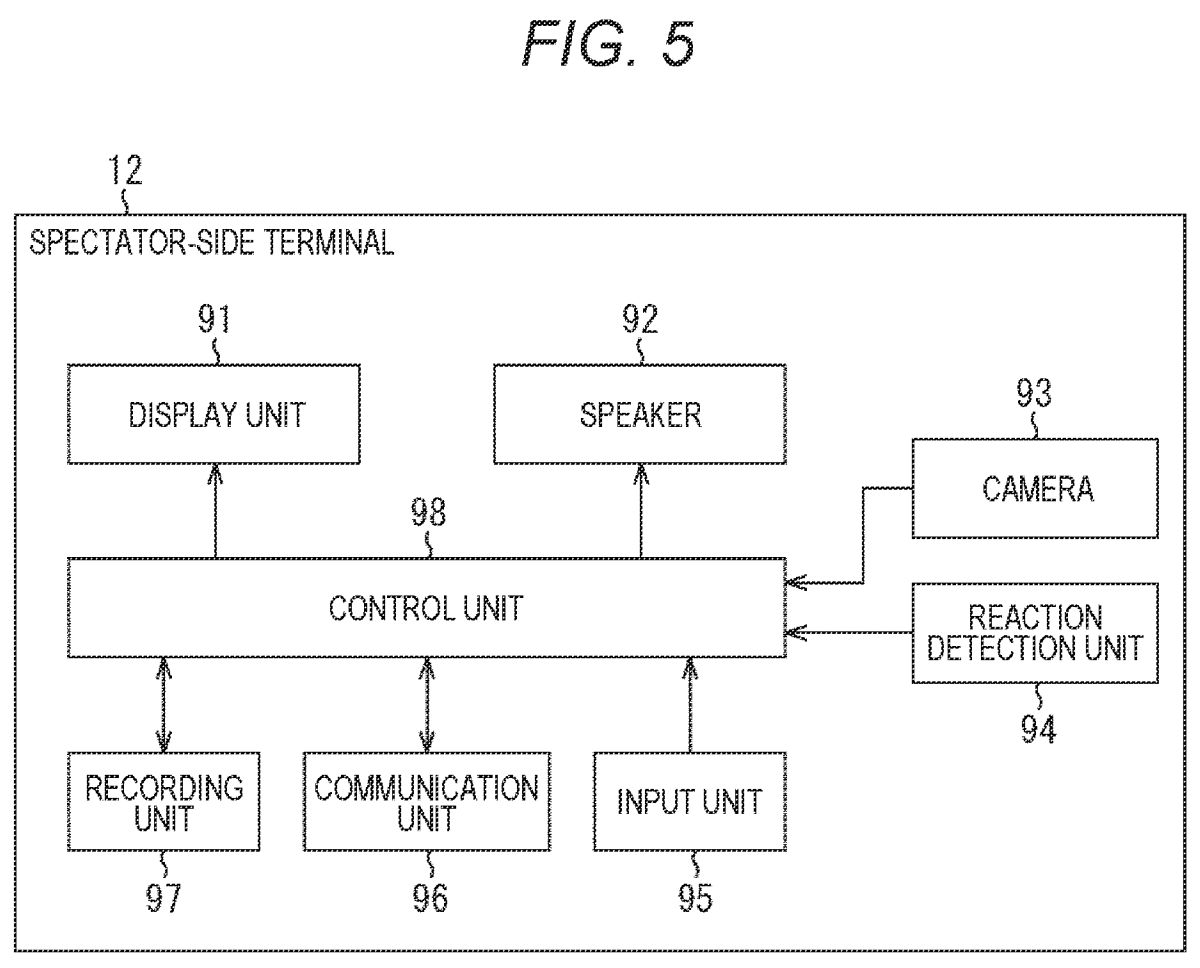

Furthermore, for example, the spectator-side terminal 12 is configured as illustrated in FIG. 5.

The spectator-side terminal 12 includes a display unit 91, a speaker 92, a camera 93, a reaction detection unit 94, an input unit 95, a communication unit 96, a recording unit 97, and a control unit 98.

The display unit 91 displays various videos (image) such as the distribution video supplied from the control unit 98. The speaker 92 outputs various types of sound such as accompanying sound of the distribution video supplied from the control unit 98. The camera 93 includes, for example, an image sensor having a distance measuring function by an arbitrary method such as time of flight (ToF), images a subject around the spectator-side terminal 12, such as the face of the spectator, and supplies a video obtained as a result to the control unit 98.

The reaction detection unit 94 includes, for example, a single or a plurality of sensors such as a gyro sensor, an acceleration sensor, a geomagnetic sensor, a microphone, a position measurement sensor, or a distance measurement sensor. The reaction detection unit 94 detects (senses) a reaction of a spectator who views the distribution video with the spectator-side terminal 12 and supplies a detection result to the control unit 98.

For example, as the detection result of the reaction of the spectator, an acceleration degree or a direction of a movement of the spectator, collected sound of the spectator, a position of the spectator, or the like is output from the reaction detection unit 94.

The input unit 95 includes a switch, a button, a keyboard, a touch panel superimposed and provided on the display unit

91, or the like and supplies a signal according to an operation of the spectator to the control unit 98.

The communication unit 96 communicates with the information processing device 11. That is, the communication unit 96 transmits the reaction information supplied from the control unit 98 or the like to the information processing device 11, or receives the distribution video transmitted from the information processing device 11 or the like and supplies the distribution video to the control unit 98.

The recording unit 97 records various types of data and supplies the recorded data to the control unit 98 as necessary. The control unit 98 controls an entire operation of the spectator-side terminal 12. For example, the control unit 98 supplies the distribution video supplied from the communication unit 96 to the display unit 91 and displays the distribution video, and generates the reaction information on the basis of the detection result of the reaction of the spectator supplied from the reaction detection unit 94 and supplies the reaction information to the communication unit 96.

The reaction information indicates a result of detecting the reaction of the spectator in real time or a result of counting the detection result, and for example, can be an acceleration when the spectator holds and shakes the spectator-side terminal 12, a behavior (gesture) of the spectator, the number of times when the spectator shakes (shakes) the spectator-side terminal 12, a volume of voice of the spectator, the number of times when the spectator presses the button, or the like. Furthermore, the reaction information may be amplified according to excitement of music or the like, for example.

Furthermore, the camera 93 may be used as the reaction detection unit 94, and a magnitude of the movement of the spectator, an expression of the spectator such as a smile, a behavior of the spectator, a video of the face of the spectator, 3D data of the face of the spectator, or the like may be generated by the control unit 98 as the reaction information, on the basis of the video of the spectator captured by the camera 93 or a distance image.

In addition, the input unit 95 may be used as the reaction detection unit 94, and a message (text information) including characters, symbols, or the like input by operating the input unit 95 by the spectator, the number of times when the spectator presses (tap) a button or a touch panel as the input unit 95, or the like may be used as the reaction information.

Note that, here, an example will be described in which the display unit 91 to the control unit 98 are provided in the spectator-side terminal 12. However, some or all of the display unit 91, the speaker 92, the camera 93, the reaction detection unit 94, and the input unit 95 may be provided outside of the spectator-side terminal 12. In other words, the spectator-side terminal 12 may include a plurality of devices.

For example, in a case where the spectator-side terminal 12 includes a PC, a smart television, or the like, the spectator-side terminal 12 can obtain the reaction information in cooperation with a smartphone of the spectator including the camera 93, the reaction detection unit 94, and the input unit 95, that is wirelessly connected.

In this case, for example, the spectator-side terminal 12 acquires an acceleration when the spectator shakes the smartphone, the number of times when the spectator taps the smartphone, a volume of voice of the spectator detected using the smartphone, a movement of the spectator for shaking hands, the expression of the spectator such as a smile, or the like obtained through image recognition or the like on the video of the face of the spectator imaged by the camera 93, from the smartphone and sets the information as the reaction information.

Furthermore, for example, in a case where the spectator-side terminal 12 includes a PC, a smart television, a smartphone, or the like, the spectator-side terminal 12 may wirelessly connect to and cooperate with a device including the reaction detection unit 94 such as a penlight-type device, a headphone worn by the spectator, a device worn by a wrist of the spectator or the like. In such a case, the spectator-side terminal 12 acquires an acceleration of a device movement, detected when the spectator moves in a state of wearing or holding the device, from the device and sets the acceleration as the reaction information.

Moreover, for example, in a case where the spectator-side terminal 12 is the smartphone, the acceleration when the spectator shakes the smartphone, the number of times when the spectator taps the smartphone, the volume of the voice of the spectator, the movement of the spectator for shaking hands, the expression of the spectator such as a smile, or the like obtained through the image recognition on the video of the face of the spectator may be generated as the reaction information.

Note that, in a case where the smartphone is used as the spectator-side terminal 12, for example, when the spectator shakes the smartphone, it is difficult for the spectator to view the distribution video. Therefore, it is preferable that information different from the acceleration when the smartphone is shaken be set as the reaction information.

<Description of Distribution Processing>

Next, operations of the information processing device 11 and the spectator-side terminal 12 included in the remote live system will be described.

First, distribution processing executed by the information processing device 11 will be described with reference to the flowchart in FIG. 6.

This distribution processing is repeatedly executed in frame units of a video or the like until end of the remote live, after start of the remote live.

In step S11, the communication unit 52 receives the reaction information transmitted from the plurality of spectator-side terminals 12 and supplies the reaction information to the control unit 54.

For example, to the reaction information, the spectator identification information such as ID information used to identify a spectator-side terminal 12 that is a transmission source of the reaction information, that is, a spectator is added.

In step S12, the control unit 54 generates the effect video on the basis of the reaction information of the plurality of spectators supplied from the communication unit 52. As a result, the effect video that changes according to the reactions of the plurality of spectators who participates in the remote live from the outside of the venue is obtained.

At this time, the control unit 54 generates the effect video using the captured image acquired from the camera 42 via the acquisition unit 51 as necessary, the accompanying sound of the captured image, the auxiliary information such as the set list information recorded in the recording unit 53, the instruction input received from the operation-side terminal 13, or the like. Note that the generated effect video may be supplied to and recorded in the recording unit 53.

In step S13, the control unit 54 supplies the generated effect video to the display device 41 installed in the remote live venue and displays the effect video. As a result, the effect video is presented to the performer.

In step S14, the control unit 54 generates the distribution video on the basis of the captured image supplied from the camera 42 via the acquisition unit 51 and the effect video generated in step S12.

For example, the control unit 54 generates the distribution video by synthesizing the captured image and the effect video so that the effect video serves as a background of the captured image. Furthermore, the control unit 54 supplies the generated distribution video to the communication unit 52 and the recording unit 53.

In step S15, the communication unit 52 transmits the distribution video supplied from the control unit 54 to each of the plurality of spectator-side terminals 12.

In step S16, the recording unit 53 records the distribution video supplied from the control unit 54. As a result, the distribution video can be provided to the spectator or the like after the remote live. Note that the control unit 54 may supply and display the distribution video to the display device 41 arranged in front of the performer.

When the processing in step S16 is executed and the distribution video is recorded, the distribution processing ends.

As described above, the information processing device 11 generates the effect video on the basis of the reaction information and presents the effect video to the performer. In this way, the reaction of the spectator can be more effectively presented to the performer. Furthermore, communication via the effect video can be realized between the performer and a large number of spectators.

<Description of Reproduction Processing>

Figure 7:
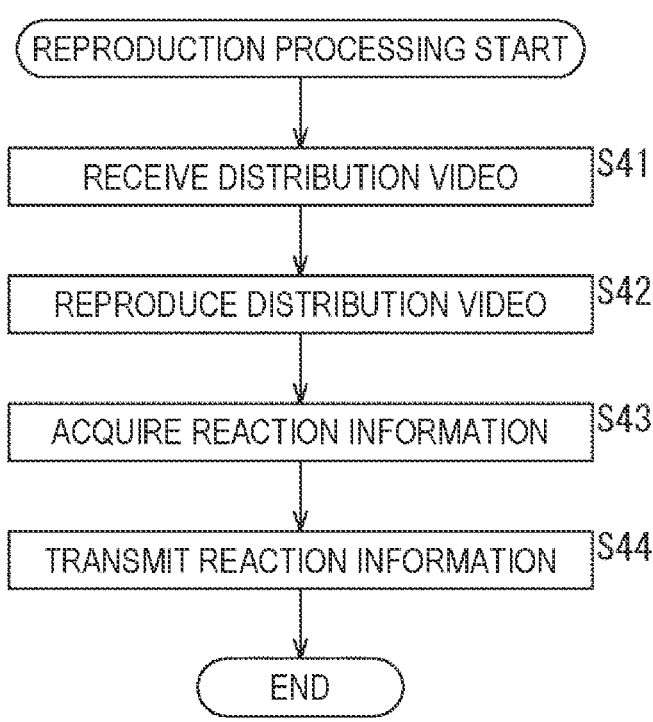
FIG. 7 is a flowchart for explaining reproduction processing.

When the distribution processing is executed by the information processing device 11, each spectator-side terminal 12 executes reproduction processing in response to that. Hereinafter, the reproduction processing by the spectator-side terminal 12 will be described with reference to the flowchart in FIG. 7.

In step S41, the communication unit 96 receives the distribution video transmitted from the information processing device 11 and supplies the distribution video to the control unit 98.

In step S42, the control unit 98 reproduces the distribution video supplied from the communication unit 96. That is, the control unit 98 supplies the distribution video to the display unit 91 and displays the distribution video on the display unit 91 and supplies sound accompanying the distribution video to the speaker 92 to output.

Then, the spectator views and listens the reproduced distribution video, and the reaction detection unit 94 detects a reaction of the spectator to the distribution video, that is, the performance or the like of the performer and supplies the detection result to the control unit 98.

In step S43, the control unit 98 acquires the reaction information.

That is, the control unit 98 sets the detection result supplied from the reaction detection unit 94 as the reaction information or sets the detection result as the reaction information, for example, by appropriately processing the detection result. The control unit 98 supplies the obtained reaction information to the communication unit 96. Note that the reaction information may be generated on the basis of the video supplied from the camera 93 or the text information supplied from the input unit 95 as described above.

In step S44, the communication unit 96 transmits the reaction information supplied from the control unit 98 to the information processing device 11 and ends the reproduction processing.

As described above, the spectator-side terminal 12 reproduces the distribution video, generates the reaction information indicating the reaction of the spectator with respect to the distribution video, and transmits the reaction information to the information processing device 11.

As a result, it is possible to generate the effect video on the side of the information processing device 11 and present the effect video to the performer, and it is possible to realize the communication via the effect video between the performer and a large number of spectators.

Example of Video of Fountain

Subsequently, a specific example of the effect video will be described.

Hereinafter, as specific examples, an example in which an effect video is mainly a video of a fountain, an example of a video of fireworks, an example of a video of a collection of messages, and an example of a video of a face of a spectator will be described.

First, an example will be described in which the effect video is a video of a fountain.

Figure 8:
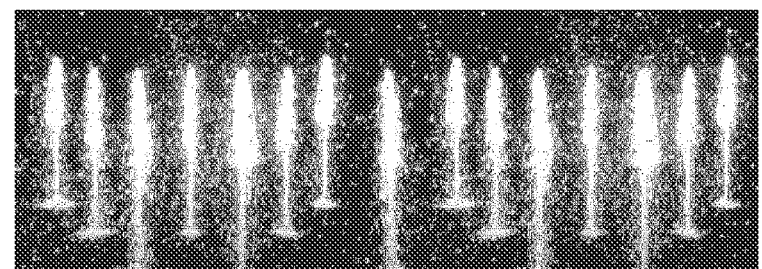
FIG. 8 is a diagram illustrating an example of a video of a fountain.

In such a case, for example, the effect video can be a video in which a plurality of fountains is displayed as objects (effect), as illustrated in FIG. 8.

In this example, for example, the acceleration when the spectator shakes the smartphone is set as the reaction information, and an effect video in which heights of all the fountains change up or down at the same timing in accordance with a magnitude of the reaction information (acceleration).

At this time, for example, the control unit 54 obtains an average value of the received reaction information of all the spectators (participants), that is, the accelerations, and linearly (linearly) changes the heights of the fountains from zero to 100 according to the average value. That is, the effect video is generated so that the height of the fountain increases, as the average value of the reaction information (acceleration) increases.

For example, the effect video is a particle expression video in which the fountains are drawn by a plurality of particles (particle). That is, in the effect video, the fountain as the object is formed by the plurality of particles, in other words, an aggregate of a plurality of dots.

By changing the height of the fountain depending on the reaction information, that is, a strength with which the spectator shakes the smartphone, the spectator can tell the reaction (action) of the spectator such as shaking the smartphone, in other words, the excitement degree of the spectator to the performer in a form of the height of the fountain.

Therefore, by viewing the effect video that changes according to the reaction information, the performer can recognize the excitement degree of the remote live and can increase motivation. Furthermore, since the effect video is synthesized with the captured image and is presented to the spectator as the distribution video, the spectator can also recognize the excitement degree of the remote live.

Moreover, for example, each of objects such as the plurality of fountains, corresponding to each reaction of the plurality of spectators different from each other or each of the plurality of spectator groups different from each other may be arranged on the effect video. In this case, each of the plurality of objects on the effect video changes according to the reactions of the spectators different from each other or the reactions of the spectators belonging to the spectator groups different from each other.

Figure 9:
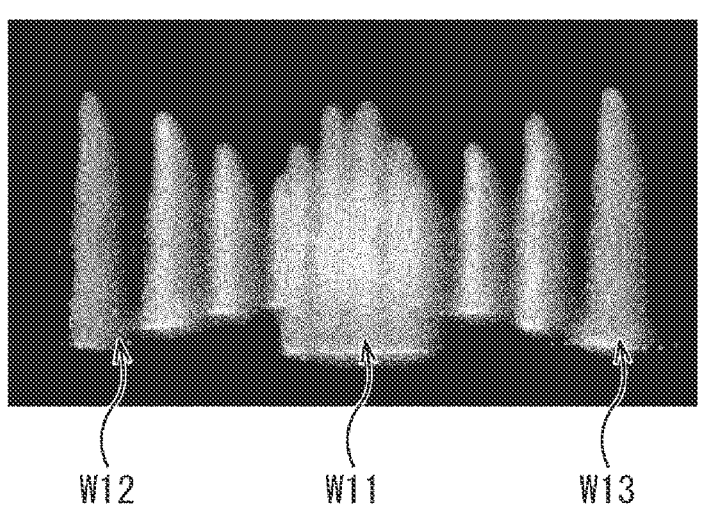
FIG. 9 is a diagram illustrating an example of the video of the fountain.

Specifically, for example, the participants (spectator) of the remote live are divided into groups as many as the number of fountains (fountain group) as illustrated in FIG. 9, and the height of each fountain may change according to an average value of the reaction information (acceleration) of the spectators allocated to these fountains.

In this example, each spectator is allocated to any one of a group A corresponding to a fountain (fountain group) indicated by an arrow W11 in the effect video, a group B corresponding to a fountain (fountain group) indicated by an arrow W12, and a group C corresponding to a fountain (fountain group) indicated by W13.

Therefore, for example, the control unit 54 obtains an average value of reaction information (acceleration) of all the spectators belonging to the group A and changes a height of the fountain (fountain group) indicated by the arrow W11 according to the obtained average value.

In this example, heights of the fountain at the center indicated by the arrow W11, the fountain on the left rear side indicated by the arrow W12, and the fountain on the right rear side indicated by W13 change (move) at different timings, and the height differs for each fountain.

Note that, it is sufficient to determine which spectator is allocated to a group corresponding to which fountain, depending on, for example, a location of the spectator, that is, from which region such as Kanto the spectator participates, a reference number of a ticket of the remote live of the spectator or the like, an order of arrival, a lottery result for each fountain, or the like.

In this case, for example, a group to which the spectator belongs, an arrangement position of a fountain corresponding to the group, or the like is determined in advance before the remote live starts, for example, at the time of ticket purchase, and it is possible to make the spectator know the determination result. Then, the spectator can recognize which fountain reflects the reaction of the own at the time of remote live and can enjoy the remote live more.

In the example in FIG. 9, auxiliary information that associates a group ID indicating the group corresponding to the fountain with spectator identification information of the spectator who belongs to the group is recorded in the recording unit 53 in advance. Then, the control unit 54 calculates the average value of the reaction information for each group, using the spectator identification information added to the reaction information of each spectator and the auxiliary information recorded in the recording unit 53.

Figure 10:
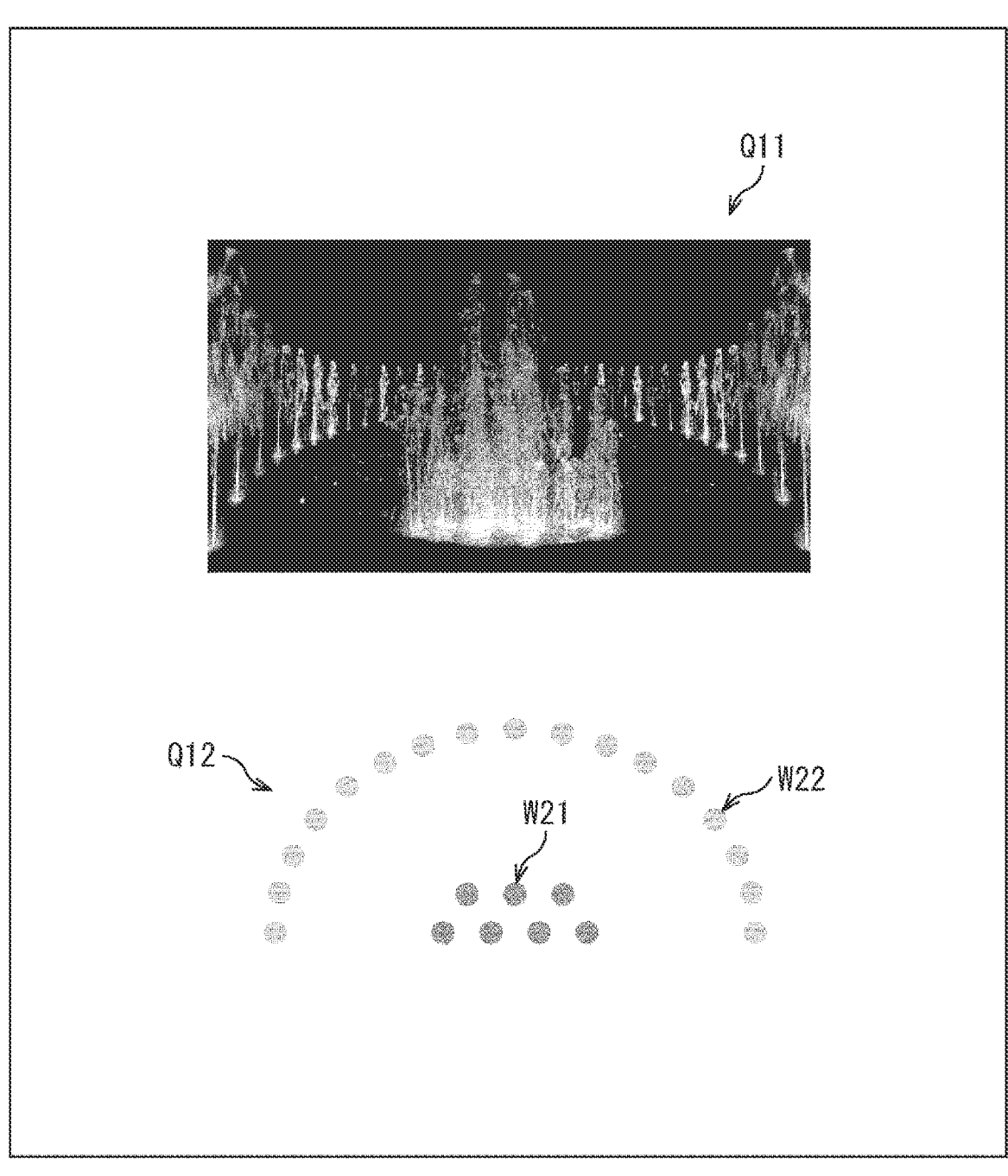
FIG. 10 is a diagram illustrating an example of the video of the fountain.

Moreover, for example, as illustrated in FIG. 10, a fountain that moves in conjunction with the reaction information of the spectator and a fountain that moves in conjunction with a movement of the performer are arranged on the effect video, and dynamic control may be performed with a plurality of algorithms.

In the example in FIG. 10, an example of the effect video is illustrated in a portion indicated by an arrow Q11. In this effect video, a fountain (fountain group) is arranged on the front side at the center, and a plurality of fountains are arranged in a semicircular shape so as to surround the fountain.

That is, when these fountains are viewed from above, each fountain is arranged as indicated by the arrow Q12. Specifically, the fountains of which the heights change according to the movements of the performers are arranged at a position indicated by an arrow W21, and the fountains of which the heights change according to the reaction information (acceleration) of the spectators are arranged in a semicircular shape at positions indicated by an arrow W22, so as to surround the fountain.

In such a case, for example, the control unit 54 detects a magnitude of the movement of the performer by executing image processing such as image recognition or movement detection on the captured image and changes the heights of the fountains arranged at the positions indicated by the arrow W21 according to the detection result. Note that the movement of the performer is detected by the acceleration sensor or the like provided in the operation-side terminal 13 held by the performer, and the control unit 54 may acquire the movement of the performer from the operation-side terminal 13 via the communication unit 52.

Furthermore, which one of the examples (algorithm) described with reference to FIGS. 8 to 10 is used to generate the effect video may be selected according to, for example, an intention or a budget on the side of the production, the number of spectators, or the like.

For example, if set list information including information indicating which music and which algorithm are used to generate the effect video is generated in advance and is recorded in the recording unit 53, the control unit 54 can generate the effect video by referring to the set list information recorded in the recording unit 53. In this way, the operation side of the remote live can control the production using the effect video to some extent and prevent the production from not being as intended.

Furthermore, a layout (arrangement) and a color of the fountain in the effect video may be any arrangement and color, for example, as in the examples illustrated in FIGS. 11 to 14. Note that, in FIGS. 11 to 14, the example of the effect video is illustrated on the upper side in the drawings, and the arrangement of the fountains in the effect video as viewed from directly above is illustrated on the lower side in the drawings.

Figure 11:
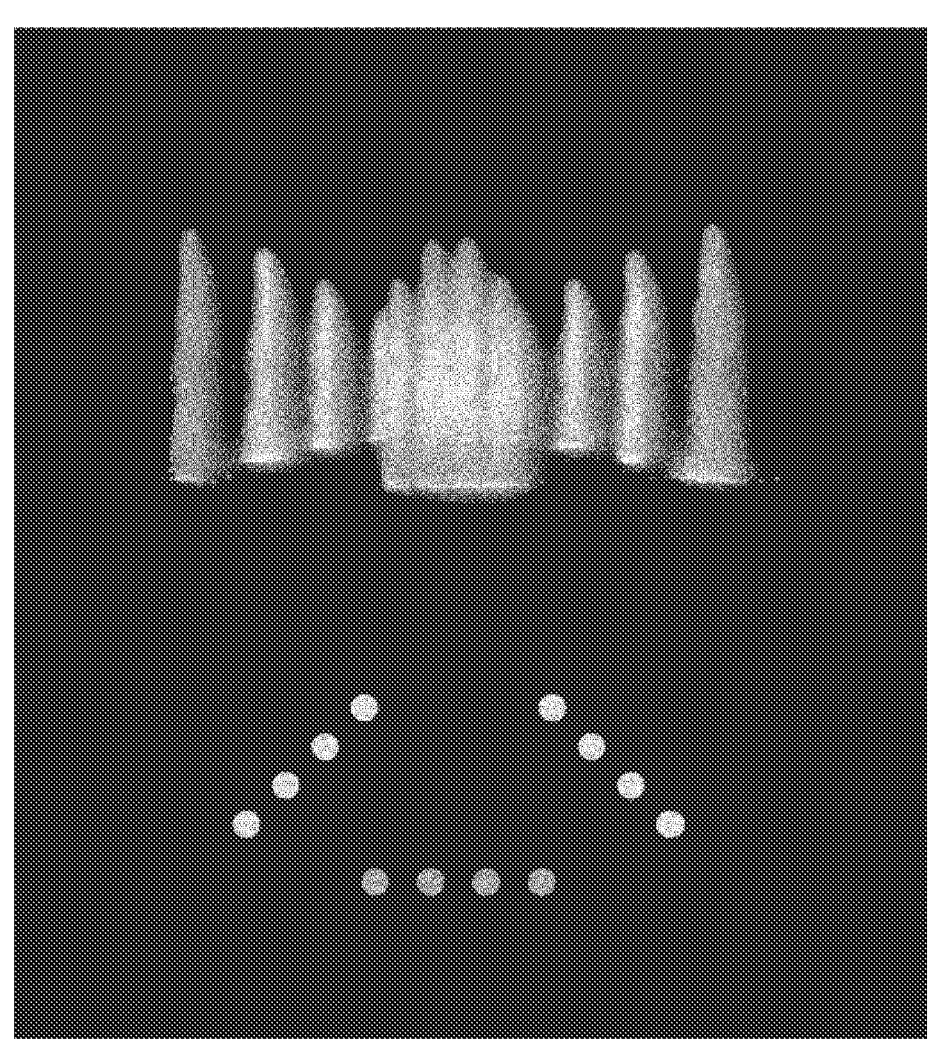
FIG. 11 is a diagram illustrating an arrangement example of the fountain.

For example, in the example illustrated in FIG. 11, on the front side at the center in the effect video, the plurality of fountains that moves in conjunction with the movements of the performers is arranged and aligned in the lateral direction. Furthermore, at left and right ends, in an oblique direction from the front to the back side (direction from outside toward center), the plurality of fountains that moves in conjunction with the movements (reaction) of the spectators is aligned and arranged in line.

Figure 12:
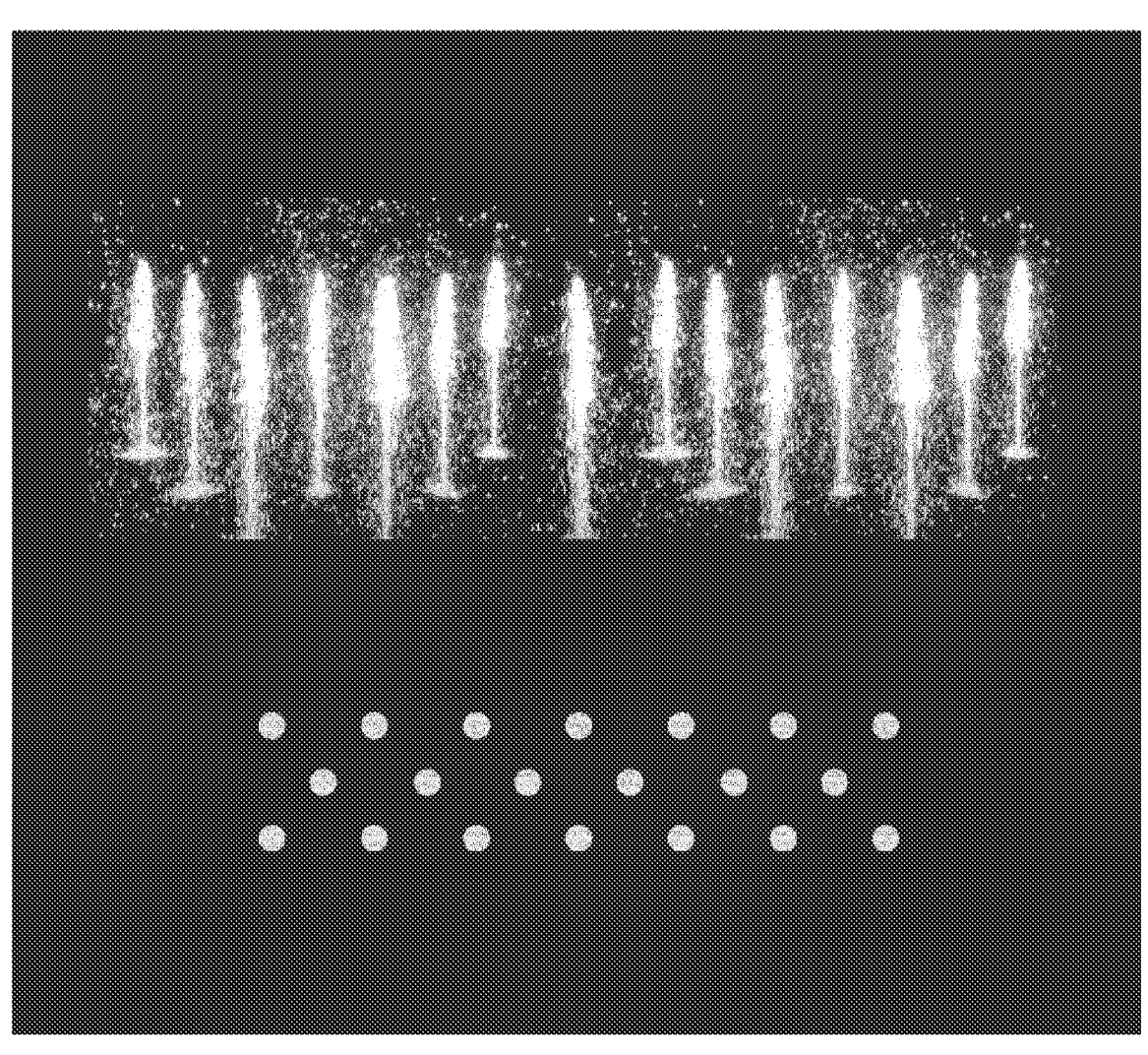
FIG. 12 is a diagram illustrating an arrangement example of the fountain.

In the example illustrated in FIG. 12, three fountain lines each including a plurality of fountains aligned in the lateral direction are arranged in the depth direction. In this example, for example, heights of all the fountains change in conjunction with the movements of the spectators.

Figure 13:
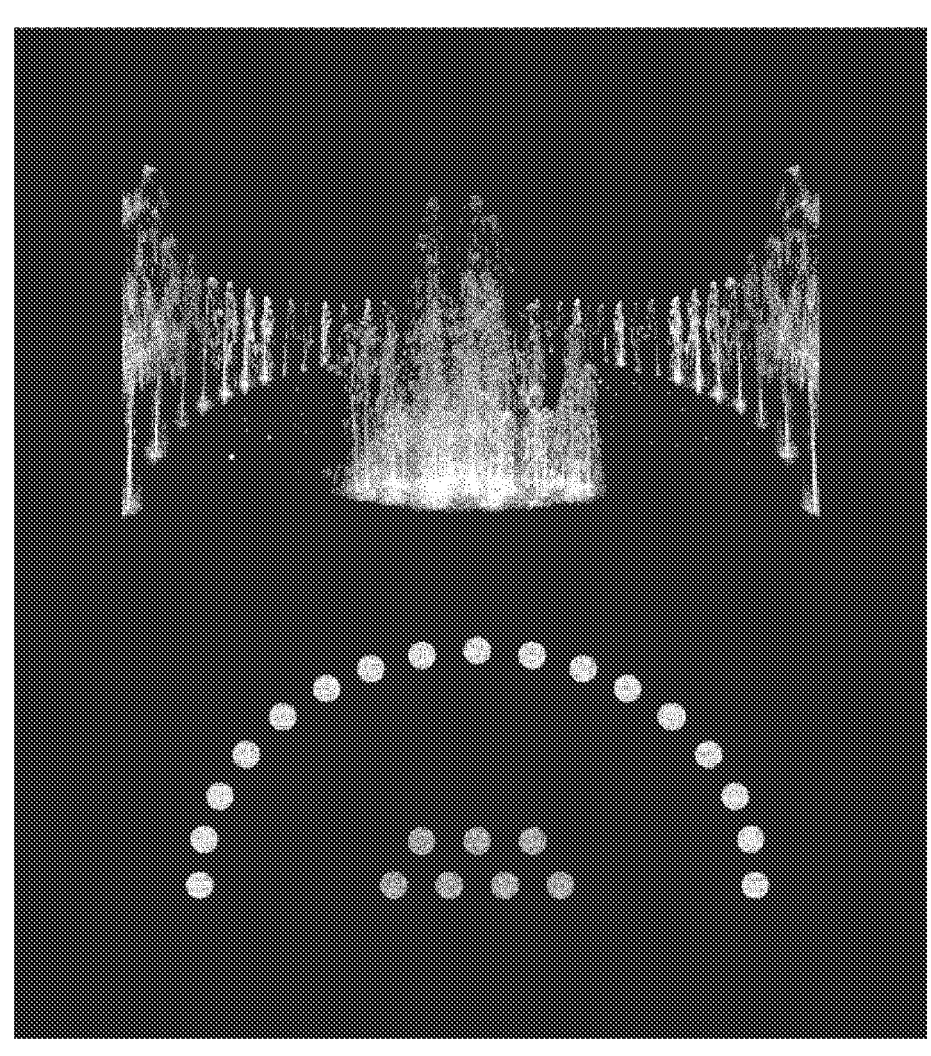
FIG. 13 is a diagram illustrating an arrangement example of the fountain.

In the example illustrated in FIG. 13, on the front side at the center in the effect video, the plurality of fountains that moves in conjunction with the movements of the performers is aligned and arranged in two lines in the lateral direction. Furthermore, the plurality of fountains that moves in conjunction with the movements of the spectators is aligned and arranged in a semicircular shape (arch-like shape), so as to surround the fountain arranged on the front side at the center.

Figure 14:
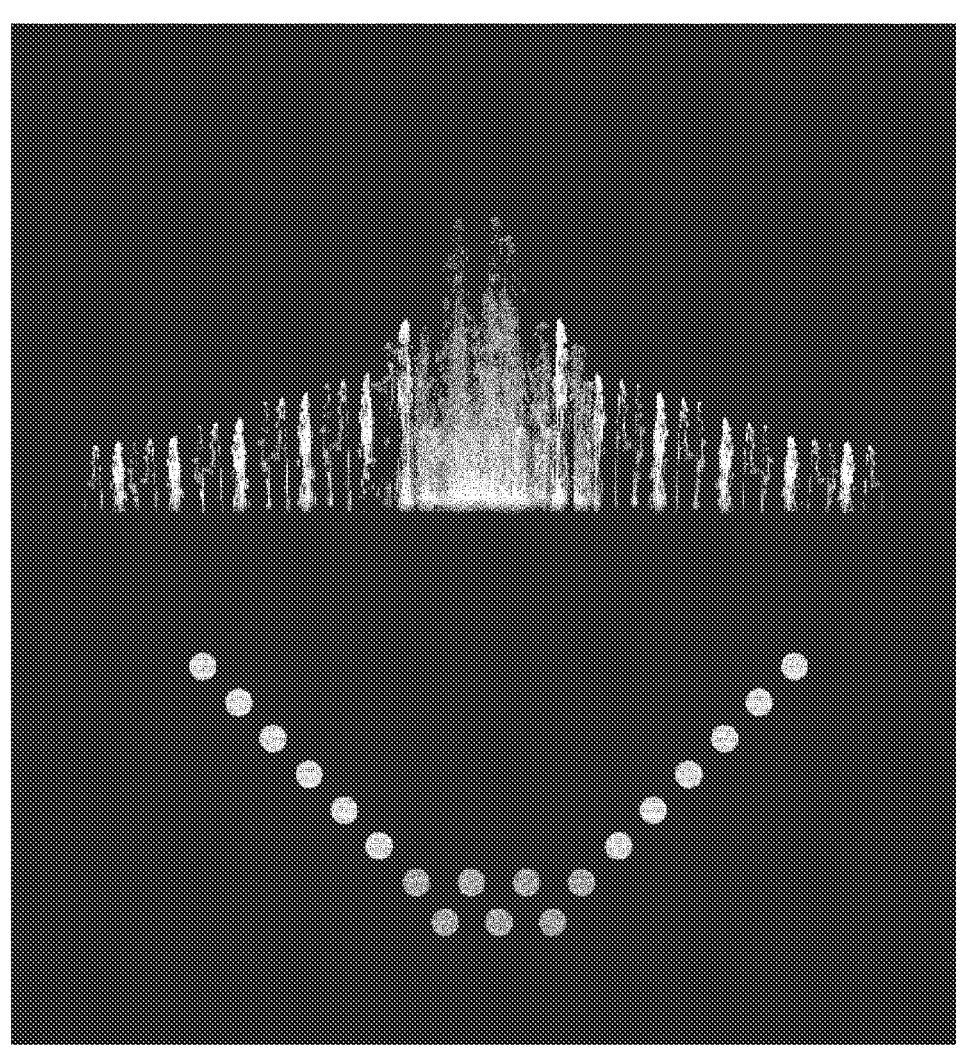
FIG. 14 is a diagram illustrating an arrangement example of the fountain.

In the example illustrated in FIG. 14, on the front side at the center in the effect video, the plurality of fountains that moves in conjunction with the movements of the performers is aligned and arranged in two lines in the lateral direction. Furthermore, at the left and right ends, in an oblique direction from the front to the back side (direction from center side toward outer side), the plurality of fountains that moves in conjunction with the movements of the spectators is arranged in line.

It is sufficient that the number of fountains in the effect video be appropriately determined in accordance with the number of spectators, a budget of an organizer (operation side), the number of PCs as the information processing device 11, the number of display devices 41 that display the effect video, that is, the number of displayed effect videos, or the like.

Moreover, for example, a fountain corresponding to an answer to a question from the performer to the spectator is arranged in the effect video, and the fountain may be used for the communication between the performer and the spectator.

Specifically, for example, during MC in the remote live or the live, the performer can ask the spectator a question such as "Which song do you want me to sing last?".

In this case, in response to a question "People who like the song A, shake your smartphones" by the performer, the spectator appropriately makes a reaction for shaking the smartphone (spectator-side terminal 12).

Then, reaction information in accordance with the reaction is generated and is transmitted to the information processing device 11. Then, the height of the fountain in the effect video changes according to the reaction of each spectator.

Subsequently, when the performer asks a question "Next, people who like the song B, shake your smartphones", as in a case of the song A, the height of the fountain in the effect video changes according to the reaction of each spectator.

The performer can see the height of the fountain at the time of the reaction corresponding to the song A and the height of the fountain at the time of the reaction corresponding to the song B and select the song of which the fountain is higher (larger) as a final song. In this case, the control unit 54 can specify which song has selected by comparing reaction information corresponding to the song A with reaction information corresponding to the song B.

In addition, for example, by generating the distribution video for each spectator or for each spectator group including the plurality of spectators, it may be presented in an easy-to-understand manner that the reaction of the spectator is reflected.

Figure 15:
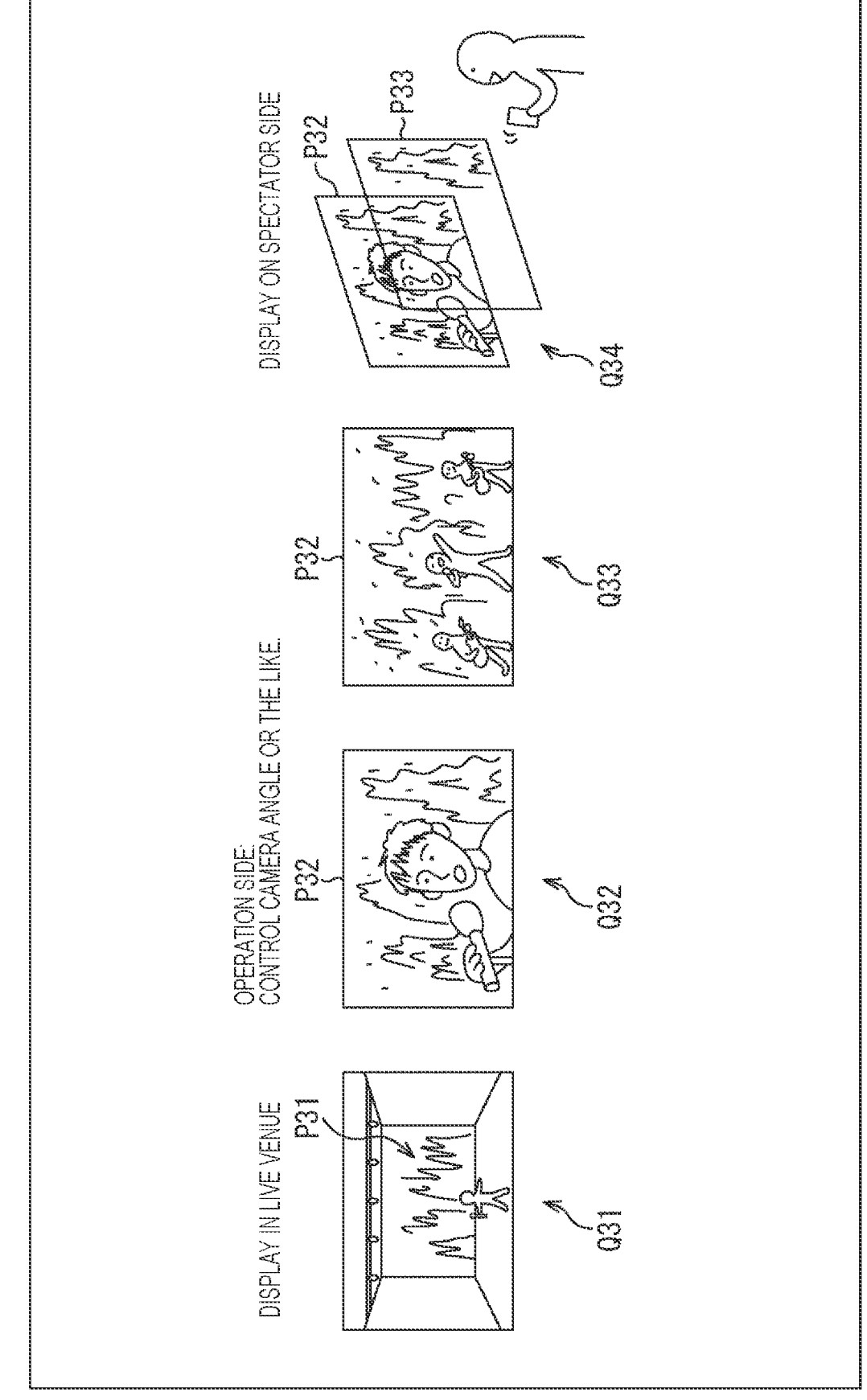
FIG. 15 is a diagram for explaining generation of a distribution video for each spectator.

Specifically, in a case where the distribution video is generated for each spectator, for example, as indicated by an arrow Q31 in FIG. 15, the control unit 54 generates an effect video P31 using the reaction information received from all the spectator-side terminals 12 and makes the display device 41, installed in the remote live venue, display the effect video P31. In this case, in the effect video P31, the object such as the fountain changes according to the reactions of all the spectators.

The camera 42 in the venue captures an image in a state where the effect video P31 is displayed on the background of the performer, and obtains captured images P32 indicated by arrows Q32 and Q33. At this time, the operation side appropriately controls a camera angle or the like.

Furthermore, as indicated by an arrow Q34, the control unit 54 generates a distribution video of a predetermined spectator, on the basis of the video of the venue, that is, the captured image P32, and reaction information of the predetermined spectator.

For example, the control unit 54 generates an effect video P33 about the predetermined spectator, on the basis of only the reaction information of the predetermined spectator. In the effect video P33, the object such as the fountain changes in conjunction with a reaction of a single spectator (predetermined spectator).

At this time, a color of the object in the effect video P31 and a color of the object in the effect video P33 may be different, so that the spectator can identify the object such as the fountain corresponding to the reaction of the own.

Furthermore, text information indicating that the object corresponds to the spectator or the like may be displayed in the effect video P33.

By synthesizing the captured image P32 and the effect video P33, that is, by superimposing (overlaying) the effect video P33 on the captured image P32, the control unit 54 generates a distribution video dedicated to the spectator corresponding to the effect video P33.

At this time, by executing chromaticity processing or the like on the basis of the video of the venue, that is, the captured image P32, the control unit 54 follows a change if an angle of the camera 42 changes, and generates the distribution video so as to display the object such as the fountain that moves in conjunction with the reaction of the spectator in the distribution video, without overlapping the performer.

By executing the above processing for each spectator, the control unit 54 generates the distribution video for each spectator. As a result, when viewing the displayed distribution video, each spectator can easily know that the reaction of the spectator is reflected and can enjoy the remote live more.

Furthermore, in a case where the distribution video is generated for each spectator group, for example, the information processing device 11 registers a spectator group including two or more spectators, such as a plurality of spectators who are close to each other in advance, before the start of the remote live.

That is, for example, the recording unit 53 records a spectator group ID used to identify the spectator group and the spectator identification information indicating the spectator belonging to the spectator group in association with each other, as the auxiliary information. Note that an upper limit of the number of spectators included in the spectator group may be provided.

Figure 16:
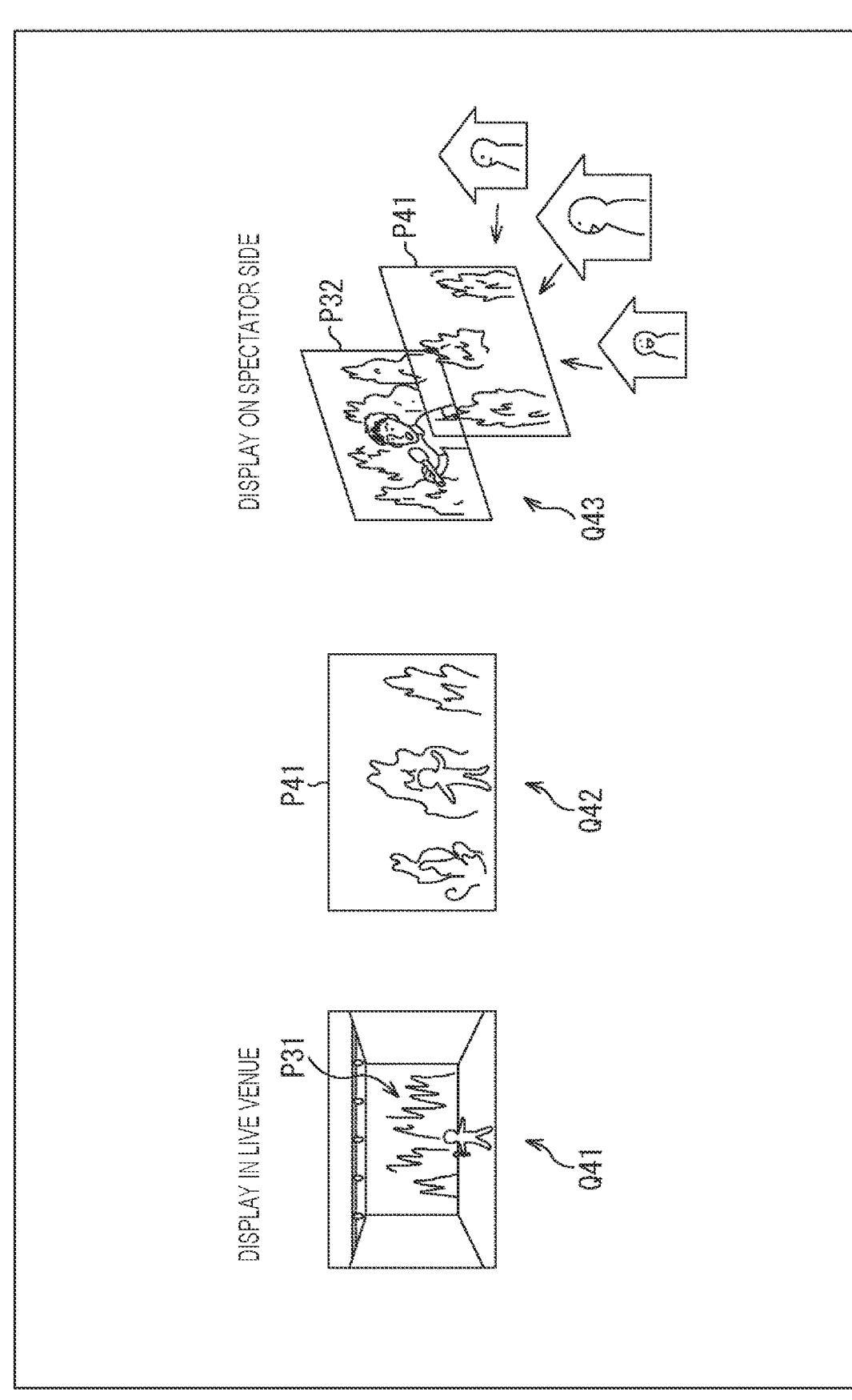
FIG. 16 is a diagram for explaining generation of a distribution video for each spectator group.

In such a case, for example, as indicated by an arrow Q41 in FIG. 16, the control unit 54 generates the effect video P31 using the reaction information received from all the spectator-side terminals 12 and makes the display device 41 installed in the remote live venue display the effect video P31. Note that, in FIG. 16, portions corresponding to those in FIG. 15 are denoted by the same reference numerals, and description thereof will be omitted as appropriate.

Furthermore, in the venue, the camera 42 captures an image in a state where the effect video P31 is displayed on the background of the performer, and the captured image P32 is obtained.

Moreover, the control unit 54 refers to the auxiliary information regarding the spectator group recorded in the recording unit 53 and generates an effect video P41 for each spectator group as indicated by an arrow Q42.

Specifically, the control unit 54 generates the effect video P41 for each spectator group, using the reaction information of the spectators belonging to the same spectator group, that is, only the reaction information of the spectators indicated by the spectator identification information associated with the same spectator group ID. In the effect video P41, the object such as the fountain changes in conjunction with the reactions of all the spectators belonging to the same spectator group.

Moreover, by synthesizing the video of the venue, that is, the captured image P32 with the effect video P41 for each spectator group as indicated by an arrow Q43, the control unit 54 generates a distribution video dedicated to the spectator group corresponding to the effect video P41.

By executing the above processing for each spectator group, the control unit 54 generates the distribution video for each spectator group and distributes (transmits) the distribution video of the spectator group to which the spectator belongs, to the spectator-side terminal 12 of each spectator. As a result, when viewing the displayed distribution video, each spectator can easily know that the reaction of the spectator and reactions of other spectators in the spectator group to which the spectator belongs are reflected and can enjoy the remote live more.

Note that, when generating the distribution video for each spectator group, when there is a spectator who does not belong to any spectator group, the control unit 54 may generate a distribution video dedicated to the spectator.

Furthermore, when the effect video is generated, the captured image, the accompanying sound, the set list information, or the like may be used in addition to the reaction information.

Since the accompanying sound of the captured image is supplied to the control unit 54, the control unit 54 can obtain tempo information indicating a tempo (beats per minute (BPM)) of a song being played as the accompanying sound by performing beat tracking or the like on the accompanying sound.

Therefore, for example, the control unit 54 may generate an effect video in which a fountain moves in accordance with a tempo of a song, for example, like a fountain swings in accordance with the tempo (rhythm) of the song or a height of the fountain changes at a timing in accordance with the tempo of the song, on the basis of the obtained tempo information.

At this time, as described with reference to FIG. 8, the control unit 54 may change the height of the fountain in proportion to the average value of the acceleration as the reaction information of all the spectators or change the color of the fountain according to the average value of the acceleration as the reaction information of the spectator and reflect the enthusiasm degree of the spectator on the effect video.

Figure 17:
FIG. 17 is a diagram for explaining a change in a color of a fountain according to an enthusiasm degree.

For example, in a case where the color of the fountain changes according to the reaction information, as illustrated in FIG. 17, a fountain of which a movement and a color change according to the accompanying sound of the captured image and the reaction information is displayed in the effect video, and a legend indicated by an arrow G11 is also displayed.

In this example, the enthusiasm degree is represented as a numerical value from zero % to 100%, and the enthusiasm degree increases as the average value of the acceleration as the reaction information increases.

Furthermore, the color of the fountain changes according to the enthusiasm degree in the effect video, and the numerical value of the enthusiasm degree and the color of the fountain displayed at the time of the enthusiasm degree are displayed in the legend in association with each other. Note that a gauge or the like indicating the enthusiasm degree at the current time may be displayed. In this way, the spectator can recognize the enthusiasm degree by seeing the gauge.

Furthermore, by including information indicating an excitement time (excitement point) such as a chorus portion in a song in the set list information recorded in the recording unit 53, and different effects can be applied to the excitement point and other times.

Figure 18:
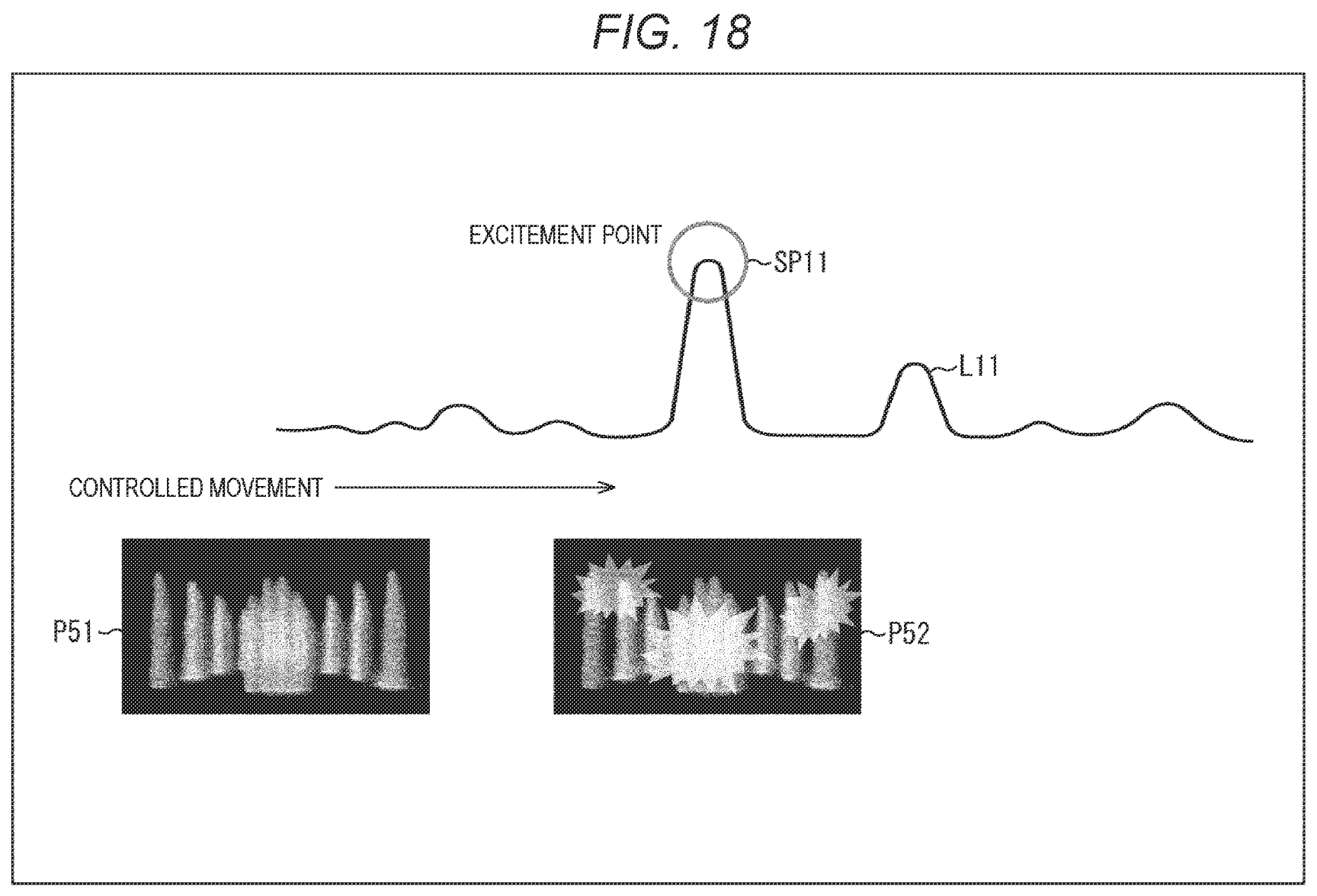

In such a case, for example, as illustrated in FIG. 18, at the time other than the predetermined excitement point, the control unit 54 generates an effect video P51 in which the fountain moves according to the tempo information. The reaction information is not used at the time when the effect video P51 is generated, and the movement of the fountain is controlled on the basis of only the tempo information.

Note that, in the drawing, the lateral direction indicates a time direction. Furthermore, a curve L11 indicates an excitement degree of a song at each time, and an upward convex portion in the drawing indicates a higher excitement degree.

The set list information includes time information indicating an excitement point SP11, and the control unit 54 generates a video based on the tempo information of the song and the reaction information of the spectator as an effect video P52, at the excitement point SP11.

For example, in addition to the fountain that changes (moves) according to the tempo information, in the effect video P52, an object such as a figure of which a size or a shape changes according to the reaction information of the spectator is displayed as an effect. In addition, in the effect video P52 at the excitement point SP11, a color of the fountain that moves according to the tempo information may change according to the reaction information.

In this way, by basically generating the effect video using only information other than the reaction information, such as the tempo information and generating the effect video using the reaction information at a specific excitement point, the operation side can reflect the reaction of the spectator on the effect video while performing production according to an intention.

Furthermore, since the effect according to the reaction of the own is displayed on the spectator-side terminal 12 at the specific excitement point as a feedback to the reaction of the own, it is possible to obtain feeling of participating in the remote live.

Moreover, at the time when the reaction of each spectator is large, for example, when the average value of the reaction information of all the spectators is equal to or more than a predetermined value, not at the specific excitement point, the effect video on which the effect according to the reaction of the spectator is applied may be generated.

Furthermore, the effect video in which the effect according to the reaction information is applied to only a specific spectator such as a spectator with a large reaction may be displayed. That is, for example, for a spectator of which the reaction information is equal to or more than the predetermined value and a spectator of which the reaction information is less than the predetermined value, distribution videos to which different effect videos are superimposed (synthesized) may be generated.

Example of Video of Firework

Next, an example will be described in which the effect video is a video of fireworks.

In such a case, for example, when the acceleration at the time when the spectator shakes the smartphone in which the reaction detection unit 94 is provided is detected as the reaction of the spectator and a large change in the acceleration is detected by the spectator-side terminal 12, a value of a reaction gauge indicating the reaction of the spectator increases according to the detection result.

At this time, the control unit 98 of the spectator-side terminal 12 may display the distribution video and the reaction gauge on the display unit 91, on the basis of the detection result supplied from the reaction detection unit 94.

For example, when a large change in the acceleration is continuously detected (recognized) for three seconds by the control unit 98, the value of the reaction gauge increases to a predetermined maximum value. Then, reaction information indicating that the reaction gauge has been full, that is, the value of the reaction gauge has reached the maximum value is transmitted from the spectator-side terminal 12 to the information processing device 11.

Then, the control unit 54 of the information processing device 11 generates a video in which a firework is shot according to the reaction information, in other words, a video of a firework as the object that is generated according to the reaction of the spectator, as the effect video. For example, the firework as the object in the effect video may be drawn as an aggregate of particles, that is, dots.

Note that, by setting the acceleration as the reaction information, the control unit 54 of the information processing device 11 may obtain the value of the reaction gauge for each spectator from the reaction information or may obtain a value of a single reaction gauge on the basis of the reaction gauge of all the spectators.

Figure 19:
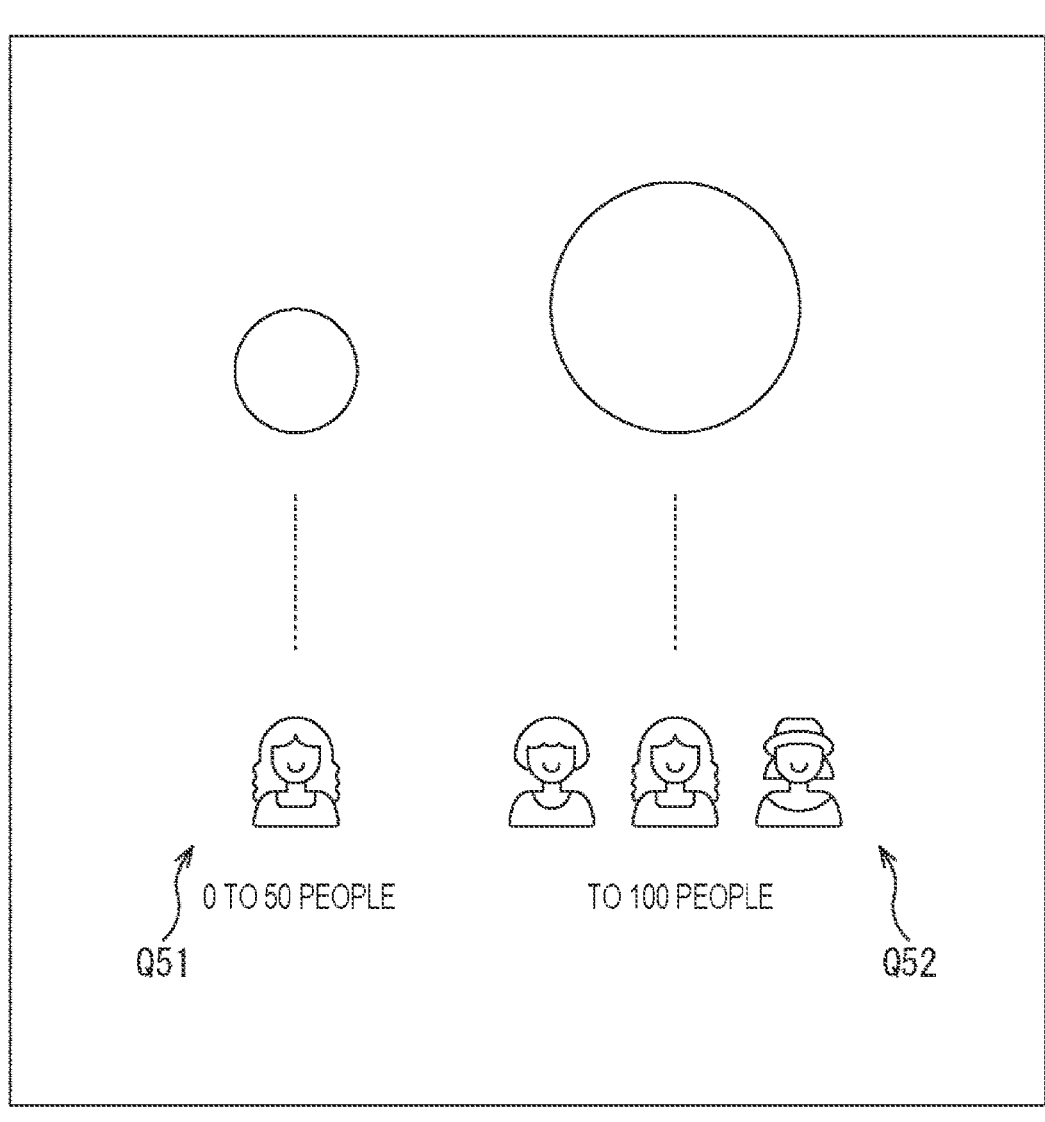
FIG. 19 is a diagram for explaining a change in a size of a firework.

Furthermore, for example, as illustrated in FIG. 19, in accordance to the number of spectators whose value of the reaction gauge becomes the maximum value at the same timing, that is, the number of pieces of reaction information that is simultaneously received, the control unit 54 may change a size of the firework in the effect video.

For example, as indicated by an arrow Q51 in FIG. 19, when the number of spectators whose value of the reaction gauge becomes the maximum value is about zero to 50, a relatively small firework is shot in the effect video.

On the other hand, for example, as indicated by an arrow Q52, when the number of spectators whose value of the reaction gauge becomes the maximum value is larger than 50 and is equal to or less than 100, a relatively large firework is shot in the effect video. Note that the number of spectators whose value of the reaction gauge becomes the maximum value, to be a threshold when the size of the firework is determined can be set according to a scale of the remote live or the like.

Figure 20:
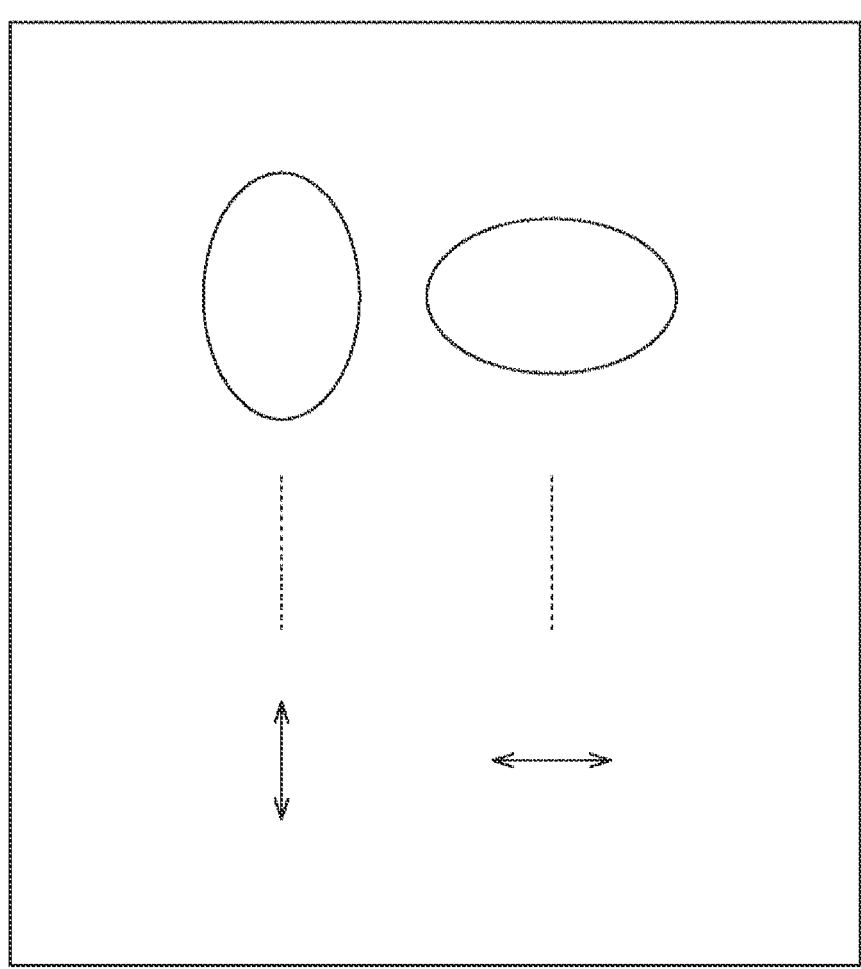
FIG. 20 is a diagram for explaining a change in a shape of the firework.

Moreover, for example, as illustrated in FIG. 20, according to the reaction of the spectator to increase the value of the reaction gauge, that is, how to shake the smartphone (how acceleration changes), the shape of the firework may be changed.

In this example, as illustrated on the left side in FIG. 20, when the spectator shakes the smartphone in the vertical direction, a vertically-long elliptical firework is shot. On the other hand, as illustrated on the right side in FIG. 20, when the spectator shakes the smartphone in the lateral direction, a horizontally-long elliptical firework is shot.

In such a case, the direction (direction of movement of spectator) in which the spectator shakes the smartphone (reaction detection unit 94) is included in the reaction information, and the control unit 54 generates the effect video in which the firework with the shape according to the direction indicated by the reaction information is shot.

In addition, for example, by including information indicating a position of the spectator in the reaction information, the control unit 54 may change a type or a color of the firework in the effect video, according to the position of the spectator, that is, a region or a country where the spectator is viewing the distribution video. In this case, the position (region or country) of each spectator may be recorded in the recording unit 53 as the auxiliary information and referred by the control unit 54.

Moreover, on the basis of the tempo information obtained from the accompanying sound of the captured image, that is, the tempo of the song, the control unit 54 may change a speed from a shooting of the firework in the effect video to disappearance.

Specifically, for example, the control unit 54 generates the effect video of the firework so that a time from the shooting to the disappearance of the firework is a time period for two bars of the song. Therefore, in this case, when the tempo of the song is doubled, the speed of the shooting of the firework or the like is also doubled.

Furthermore, the control unit 54 may perform code analysis on the accompanying sound of the captured image and change a hue, a type, a shape, or the like of the firework according to a code of the song obtained as a result.

In addition, the control unit 54 may determine a position of the firework in the effect video on the basis of the position of the performer.

In such a case, for example, the control unit 54 specifies the position of the performer in the captured image (distribution video), by performing image recognition or the like on the captured image or the distribution video.

Then, for example, the control unit 54 determines a position, a height, or the like of the shot firework so that the firework is shot around the performer when the effect video is superimposed (synthesized) on the captured image, and generates the effect video in which the firework is shot, on the basis of the determination result and the reaction information.

Figure 21:
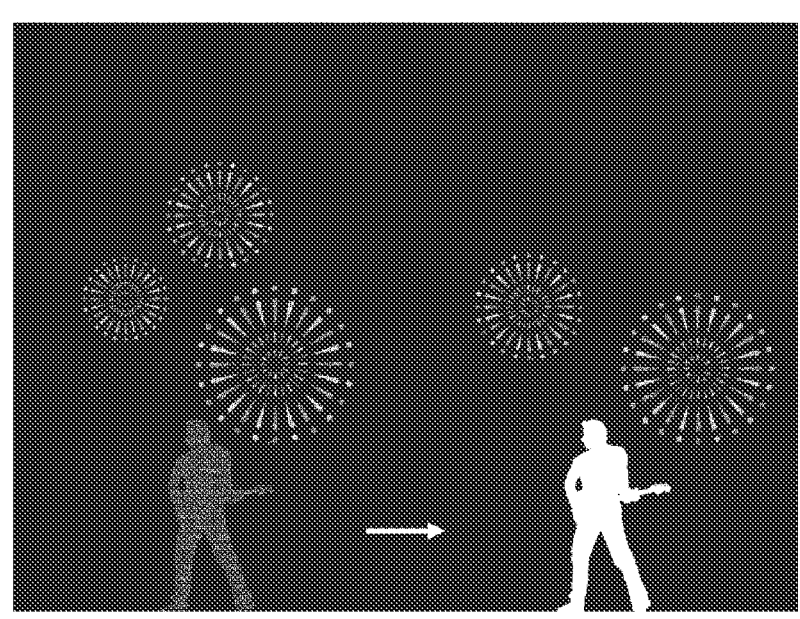
FIG. 21 is a diagram for explaining a shooting position of the firework.
Figure 22:
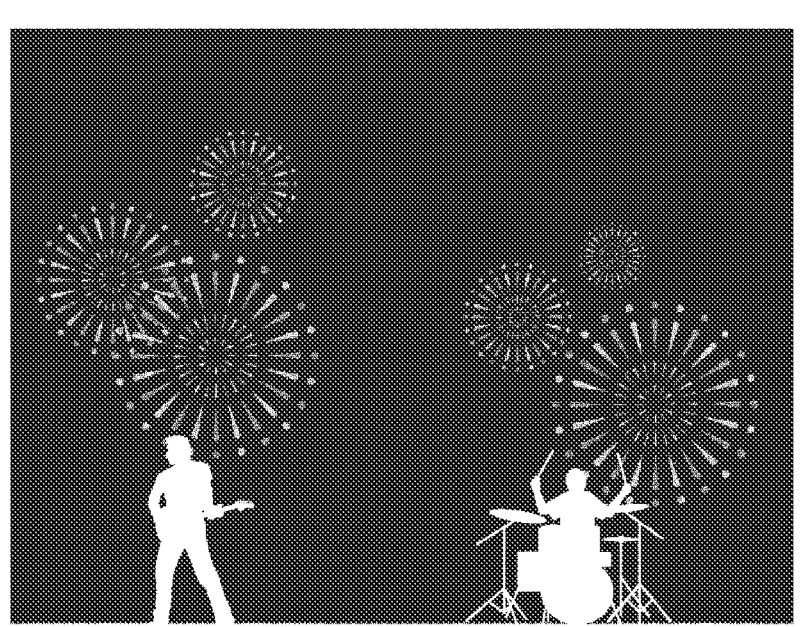
FIG. 22 is a diagram for explaining the shooting position of the firework.

Therefore, for example, when the performer moves as illustrated in FIG. 21, a new firework shooting position moves together with the performer according to that movement. Furthermore, for example, as illustrated in FIG. 22, when there is the plurality of performers, the firework is shot around each performer, and the shooting position of the firework follows the movement of each performer.

Note that, in a case where there is the plurality of performers, for example, the control unit 54 may randomly select a single performer when the shooting position of the new firework is determined and determine a position around the selected performer as the shooting position.

Furthermore, for example, the spectator may select a performer to be supported in advance, and performer selection information obtained by associating the spectator identification information indicating the spectator with information indicating the performer selected by the spectator may be recorded in the recording unit 53 in advance, as the auxiliary information. In such a case, the control unit 54 determines the shooting position of the firework on the basis of the reaction information, the performer selection information, and the position of the performer in the captured image (distribution video).

Moreover, for example, the operation side can sell a firework of which a design or the like can be customized by a spectator, a firework with a tour limited design.

In such a case, for example, a purchase history of the spectator, that is, setting information such as information indicating a firework purchased by the spectator is recorded in the recording unit 53 in advance as the auxiliary information, and the control unit 54 generates an effect video in which the firework purchased by the spectator is shot, on the basis of the setting information and the reaction information. In this way, the spectator can shoot the firework purchased by himself/herself and can enjoy the remote live more.

Note that, for example, it is possible to limit the number of times of use (purchase) of the firework for each spectator or utilize the firework purchased by the spectator once for a next or subsequent remote live.

Figure 23:
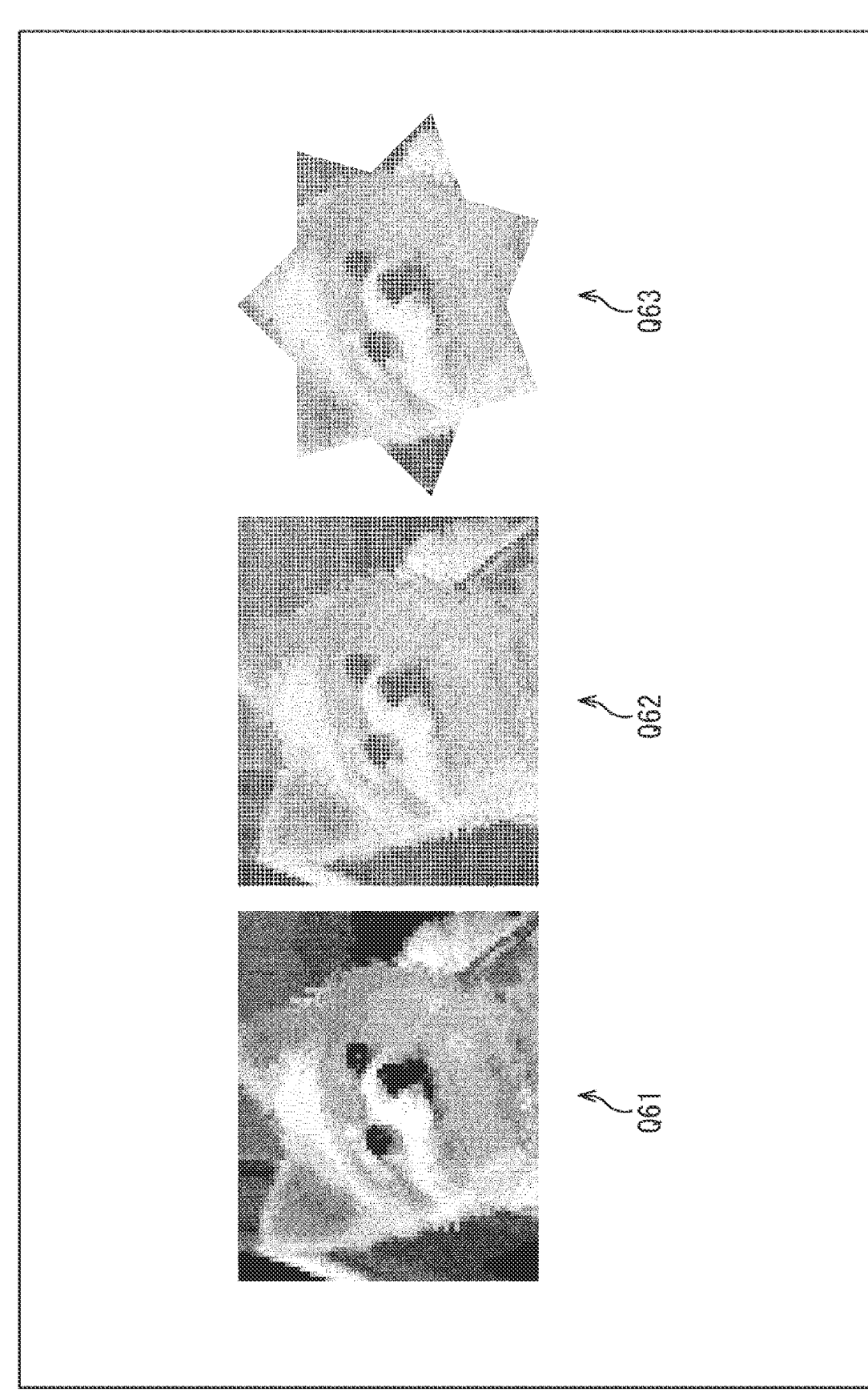
FIG. 23 is a diagram for explaining customization of the firework.

Furthermore, in the customization of the firework by the spectator, for example, the customization may be performed by freely combining the following matters.

point cloud photograph to make a firework draw a firework using a pen function (finger) according to
 a guide
select from among prepared firework shape samples
type text and make the text be as a part or all of the
 firework According to such customization, for example, the fireworks as illustrated in FIG. 23 are obtained.

That is, for example, when the spectator prepares a photograph (image) indicated by an arrow Q61, the photograph is point clouded as indicated by an arrow Q62, and for example, a firework indicated by an arrow Q63 is generated, on the basis of point cloud data obtained as a result and a shape designated by the spectator. In this example, a firework obtained by processing the point-clouded photograph into the designated shape is obtained.

Furthermore, an image (moving image (video) or still image) of the firework customized for each spectator, generated by the control unit 54, may be recorded in the recording unit 53.

In such a case, for example, if an image of a firework is distributed to the spectator for free or with fee after the remote live, the spectator can use the image of the firework for a wallpaper, a stamp, a sticker, or the like. Moreover, the spectator may use an augmented reality (AR) function installed in a predetermined application in the spectator-side terminal 12 so as to shoot a virtual firework on the basis of the distributed image of the firework and take a ceremonial photograph or the like.

Example of Video of Collection of Messages

Subsequently, an example will be described in which the effect video is a video of a collection of messages indicated by the text information as the reaction information, that is, a video of a collection of characters included in the message.

Figure 24:
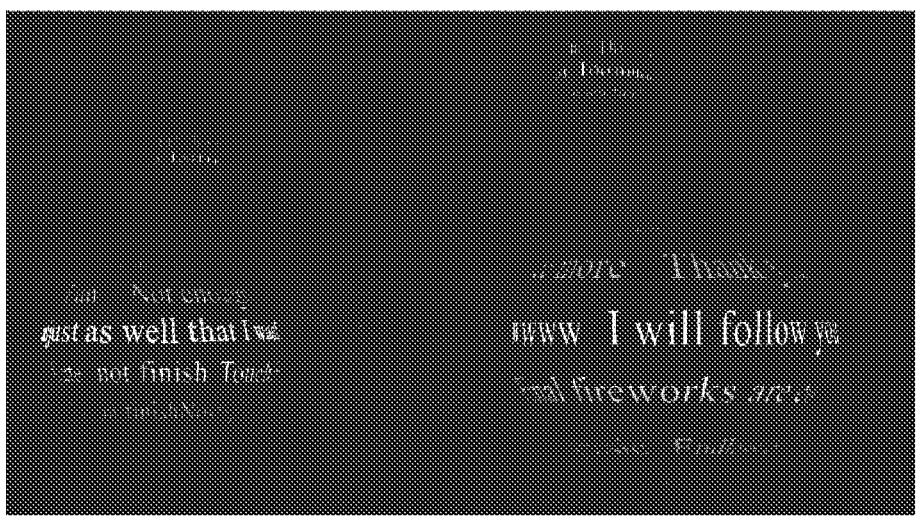
FIG. 24 is a diagram illustrating an example of a video of a collection of messages.

In a case where the message input by the spectator, that is, the text information is transmitted to the information processing device 11 as the reaction information, the control unit 54 generates, for example, a video illustrated in FIG. 24 as the effect video.

In the example illustrated in FIG. 24, a plurality of spheres is displayed in the effect video, and on surfaces of the spheres, the message (text information) as the reaction information input by each of the plurality of spectators is displayed. That is, the effect video is a video of a collection of spherical messages.

In this case, for example, the effect video may be a particle expression video in which spheres or messages as the objects are drawn as the plurality of particles (aggregate of dots).

In this way, the video (effect) can be flexibly changed, for example, like the particles included in the sphere or the message are diffused with time or the diffused particles gather and form a new sphere or message.

As a result, various visual expressions with a higher freedom degree can be performed, and it is possible to obtain a seamless video, and it is possible to improve satisfactions of the production side and the spectator side. An effect obtained by such a particle expression can be similarly obtained not only in a case where the effect video is the video of the collection of the messages but also in a case where the effect video is the video of the fountain or the firework, or the video of the face of the spectator, or the like.

Furthermore, the graphic object such as the sphere having the surface on which the message (text information) is displayed may be colored or colorless. In a case where the object is colorless (transparent), it can be said that an object with a predetermined shape (graphic object) such as the message, more specifically, the sphere formed by the plurality of characters included in the message is displayed as the effect video.

Here, a processing example at the time when the effect video is generated will be described. In particular, here, an example will be described in which a message is displayed on a surface of a sphere as illustrated in FIG. 24.

For example, when the text information as the reaction information is supplied from the communication unit 52, the control unit 54 confirms whether or not the text information includes a predetermined banned word (inappropriate word) and excludes text information including the banned word.

Figure 25:
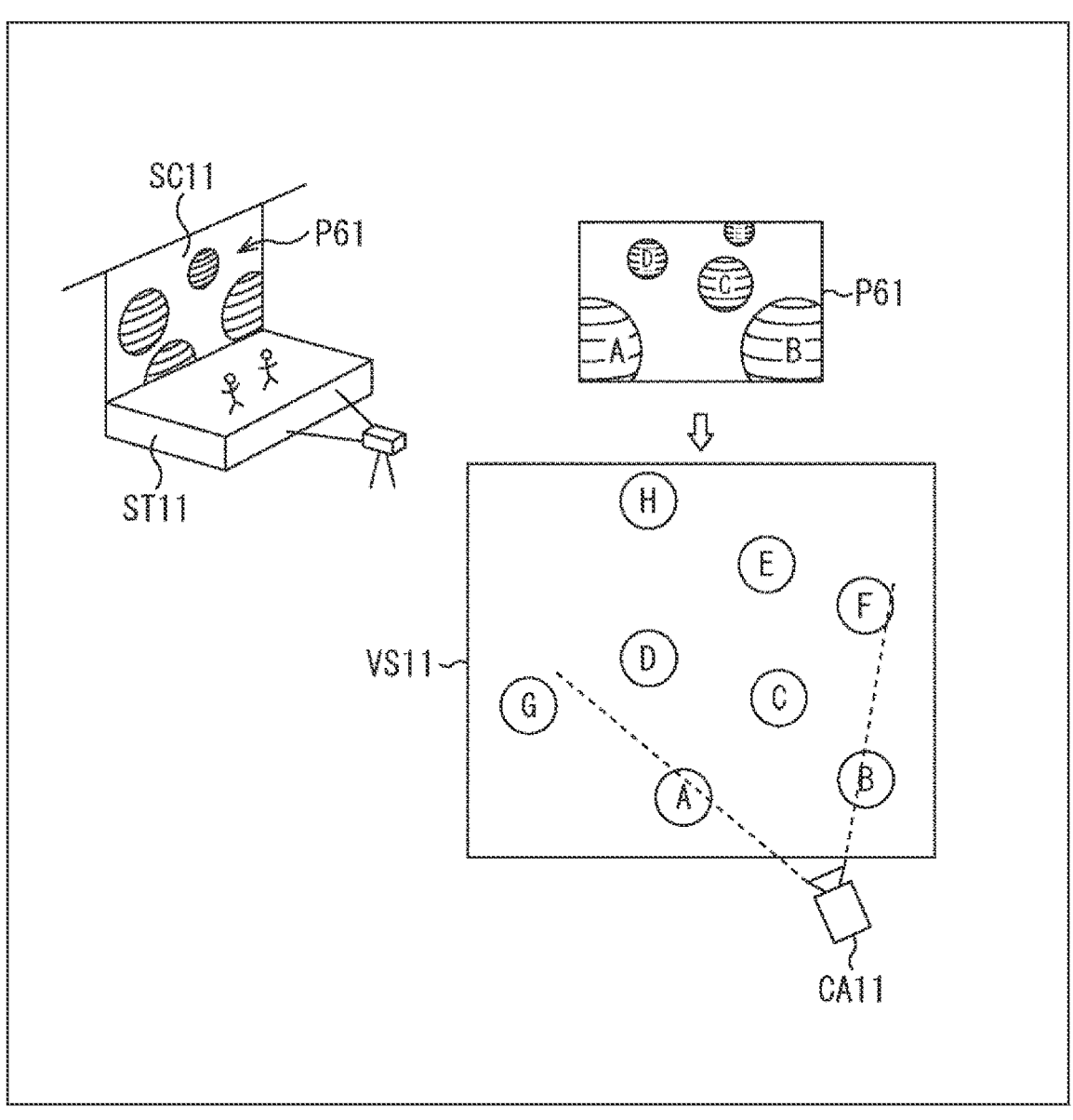
FIG. 25 is a diagram for explaining generation of an effect video.

For example, as illustrated in FIG. 25, the control unit 54 arranges a plurality of spheres in a virtual space VS11 prepared in advance, and displays the text information (message from spectator) as the received reaction information on surfaces of these spheres, according to a predetermined rule. Note that, in FIG. 25, portions corresponding to those in FIG. 2 are denoted by the same reference numerals, and description thereof will be omitted as appropriate.

The control unit 54 generates, as an effect video P61, a video obtained by imaging the virtual space VS11 in which the plurality of spheres having the surface on which the text information is displayed is arranged, with a virtual camera CA11 that is a virtual camera.

An appearance of the effect video P61 changes according to an angle of view of the virtual camera CA11, and the control unit 54 can freely change a position, a direction, a zoom magnification, or the like of the virtual camera CA11.

The effect video P61 obtained in this way is displayed, for example, on the back screen SC11 arranged behind the stage ST11 and is used to generate the distribution video.

During the remote live, since the text information as the reaction information is sequentially received from the plurality of spectators, it is necessary to devise how to display the text information on the object such as the sphere in the effect video.

Figure 26:
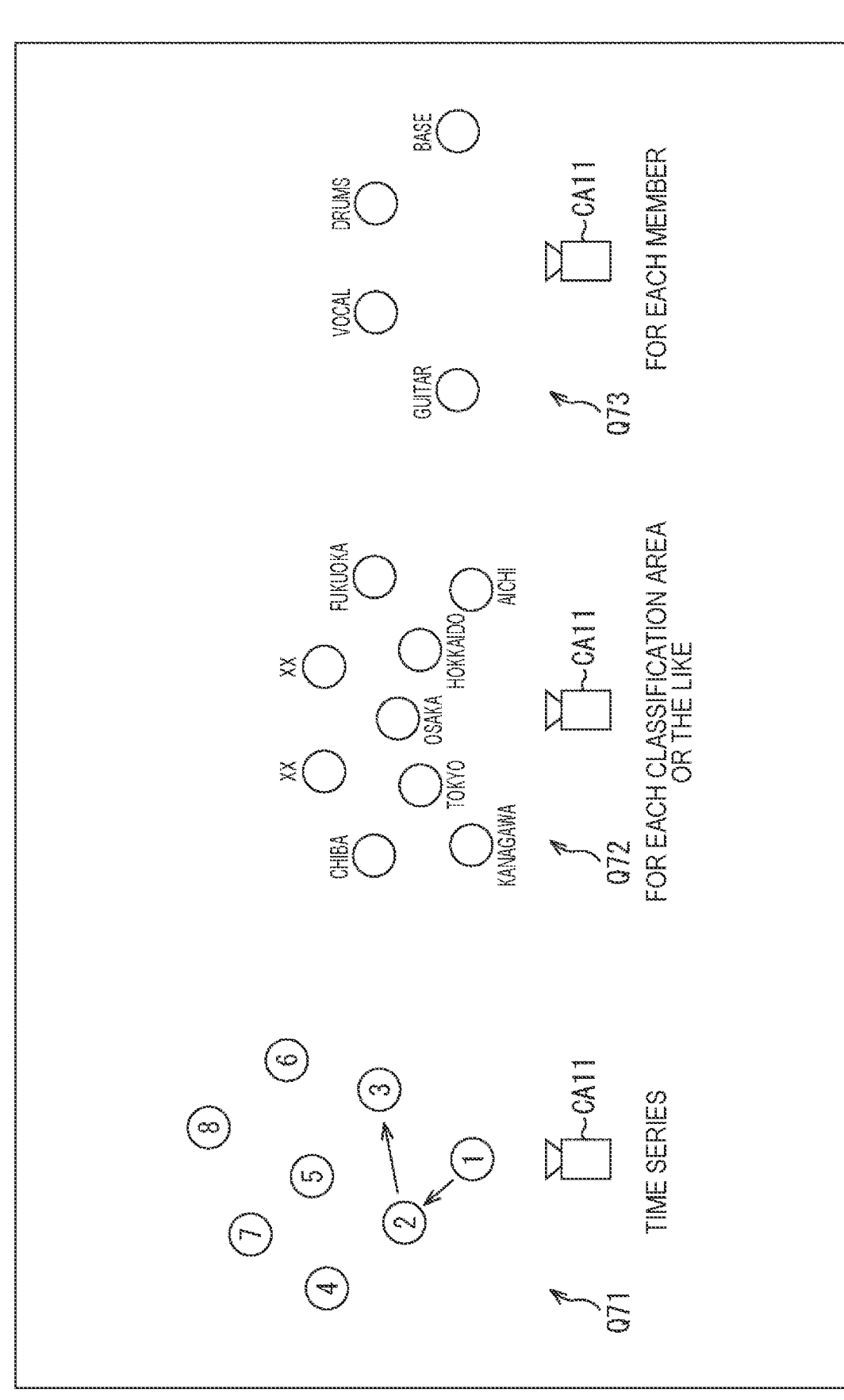
FIG. 26 is a diagram for explaining a message display method.

For example, when the plurality of spheres is arranged in the virtual space and the text information is displayed on these spheres, it is considered that the control unit 54 controls the display according to a rule illustrated in FIG. 26.

Note that, in FIG. 26, portions corresponding to those in FIG. 25 are denoted by the same reference numerals, and description thereof will be omitted as appropriate. Furthermore, one circle in FIG. 26 represents a position of a single sphere or a movement destination of the sphere arranged in the virtual space.

For example, in the example indicated by an arrow Q71, the control unit 54 moves a sphere (collection of messages) that has been already displayed in the effect video backward and displays a new sphere (collection of messages) based on newly received text information on the front side of the sphere.

Specifically, the sphere is formed at a position close to the virtual camera CA11, and the text information (message) as the reaction information is sequentially displayed on the surface of the sphere. Then, when there is no free space for displaying the message on the sphere, a new sphere is formed.

In a portion indicated by the arrow Q71, a number written in the sphere represents an order to be the movement destination of the sphere. That is, the control unit 54 first forms a sphere at a position on a front center side where a number "1" is written and displays a message on a surface of the sphere in the reception order.

Then, in a state where it is not possible to display messages any more on the sphere at the position where the number "1" is written, the control unit 54 moves the sphere to a position where a number "2" is written and forms a new sphere at the position where the number "1" is written.

Moreover, the control unit 54 displays a newly received message on a surface of the new sphere formed at the position where the number "1" is written.

Therefore, each time when a new sphere is formed, the old sphere moves sequentially from the position where the number "1" is written to a position where a number "8" is written.

In this way, when there is no space for displaying the message on the sphere, the control unit 54 moves the sphere backward, forms a new sphere on the front side, and displays a newly received message on a surface of the new sphere.

Note that the plurality of spheres is displayed in advance, and the message is displayed on the sphere on the front side, and when there is no free space on the sphere on the front side, the message displayed on the sphere may be pushed (moved) to another sphere behind the sphere.

Furthermore, for example, in the example indicated by an arrow Q72, a sphere is arranged for each area (region) where the spectator exists, such as Tokyo, in the virtual space.

When the message (reaction information) is newly received from the spectator, the control unit 54 displays the message of the spectator on a surface of the sphere corresponding to the area where the spectator exists.

Note that it is sufficient that the area (region) where each spectator exists be recorded in the recording unit 53 as the auxiliary information and be referred by the control unit 54. Furthermore, here, an example has been described in which the sphere is provided for each area. However, a sphere may be prepared for each country, each community, or the like.

In the example indicated by an arrow Q73, for each performer who performs a performance such as a remote live performance, a sphere corresponding to the performer is arranged in the virtual space.

In this case, for example, the reaction information includes destination information indicating a performer (band member or the like) to be a destination of a message, selected by the spectator at the time of inputting the message (text information). The control unit 54 displays the text information (message) included in the reaction information, on the surface of the sphere corresponding to the performer indicated by the destination information included in the reaction information, among the spheres arranged in the virtual space.

Furthermore, when the message as the reaction information is displayed, the plurality of spheres (concentric spheres) having the same center position may be assumed as a single object, and the messages may be sequentially displayed on surfaces of the plurality of spheres included in the object. In other words, the object may include a plurality of layers, and the messages may be displayed on the plurality of layers.

Figure 27:
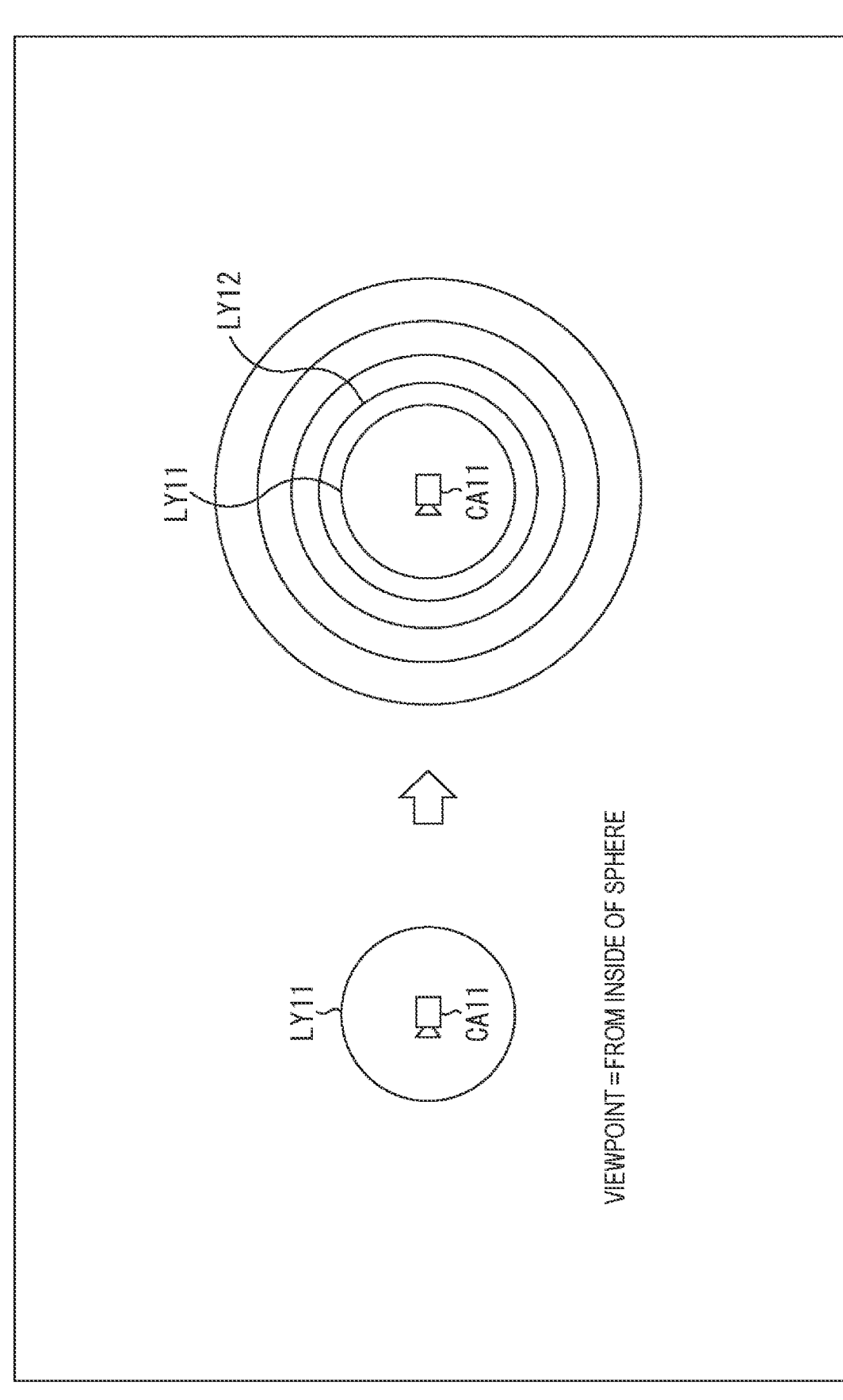
FIG. 27 is a diagram for explaining the message display method.
Figure 28:
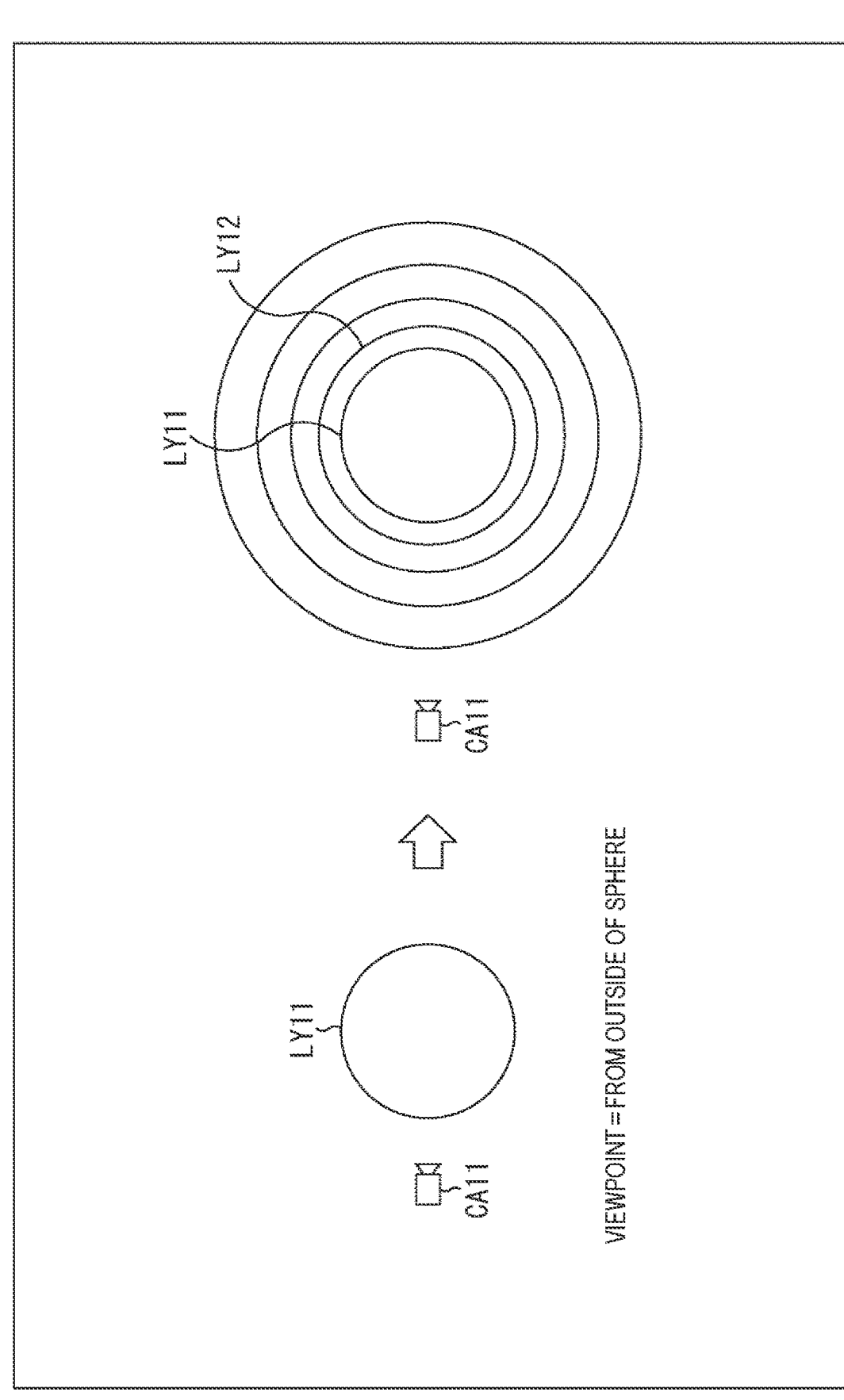
FIG. 28 is a diagram for explaining the message display method.

An example of a message display method in such a case is illustrated in FIGS. 27 and 28. Note that, in FIGS. 27 and 28, portions corresponding to those in FIG. 25 are denoted by the same reference numerals, and description thereof will be omitted as appropriate. Furthermore, in FIGS. 27 and 28, the same reference numerals are assigned to portions corresponding to each other, and description thereof will be omitted as appropriate.

In the example in FIG. 27, first, a spherical layer LY11, that is, the sphere centered on the position of the virtual camera CA11 is formed in the virtual space as illustrated on the left side in FIG. 27, and the text information (message) as the reaction information is displayed in the layer LY11 (sphere surface) in chronological order.

In this example, the virtual camera CA11, that is, a viewpoint of the effect video is positioned on an inner side of the spherical layer LY11 (sphere). Furthermore, in the imaging by the virtual camera CA11, an operation for moving a direction of the virtual camera CA11, that is, a line-of-sight direction to an arbitrary direction within a range of 360 degrees and an operation of an angle of view such as zoom-in (close) or zoom-out (pull) can be performed.

When the message is displayed in the layer LY11 and there is no space for displaying the message in the layer LY11, a next layer LY12 is formed on an outer of the layer LY11 as illustrated on the right side in FIG. 27. Then, the messages of the plurality of spectators displayed in the layer LY11 so far are moved to the next layer LY12 in order from the oldest one, and as a result, a newly received message is displayed in a free space generated in the layer LY11.

In this example, the layer LY12 is a spherical layer (sphere) having the same center position as the center of the layer LY11.

Thereafter, when there is no free space in the layer LY12, a spherical layer is further formed on an outer side of the layer LY12, and the messages displayed in the layer LY12 are moved to a next layer in order from the oldest one.

As the number of messages received in this way increases, a layer for displaying messages is formed on an outer side of the currently outermost layer. As a result, it is possible to obtain an effect video as if the single sphere as the object on which the message is displayed grows and becomes larger as the number of messages increases.

In FIG. 27, an example has been described in which the viewpoint of the effect video, that is, the virtual camera CA11 is positioned inside of the layer LY11. However, the viewpoint (virtual camera CA11) may be positioned on the outer side of the sphere including the single or the plurality of layers including the layer LY11 as illustrated in FIG. 28.

As in the example illustrated in FIG. 28, as in the example in FIG. 27, first, the layer LY11 is formed, and the message is displayed in the layer LY11. Then, thereafter, layers are sequentially formed on an outer side such as the layer LY12, the outer-side layer of the layer LY12 as the number of messages increases, and the message are displayed in each of the plurality of layers.

In this example, the position, the direction, or the like of the virtual camera CA11 can be arbitrarily changed.

Furthermore, the text information as the reaction information, that is, the shape of the object on which the message is displayed may have any shape.

For example, according to the intention of the production side such as a desire to make a message be clearly read, a desire to make a production be attractive, or a desire to show a large number of sent messages, it is possible to select an object with an arbitrary shape or switch the object to an object with an arbitrary shape.

In FIGS. 29 to 32, examples of the shape of the object on which the message is displayed and a collection of messages that are actually displayed, that is, an effect are illustrated.

Figure 29:
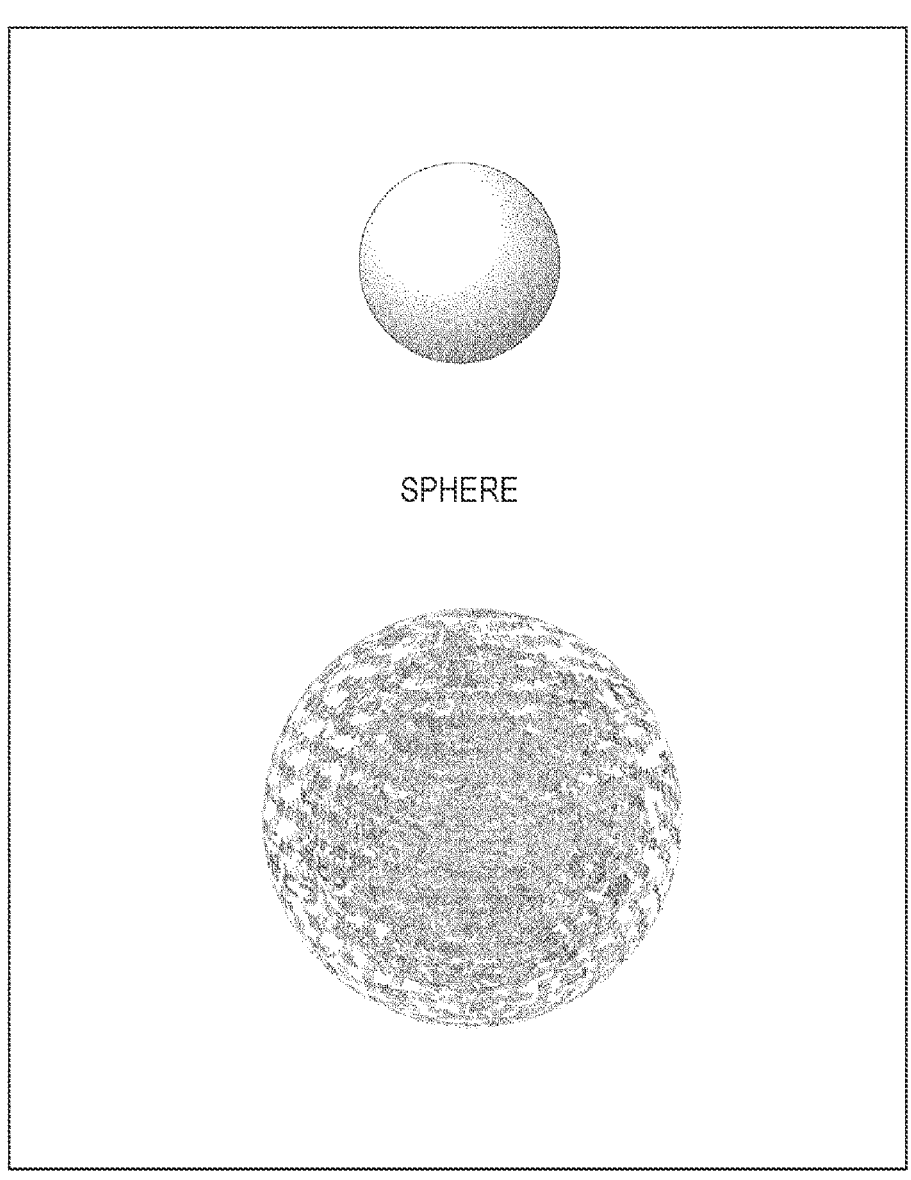
FIG. 29 is a diagram illustrating an example of the collection of the messages.

In FIG. 29, a sphere as the object is illustrated on the upper side in FIG. 29. The control unit 54 arranges the text information as the reaction information, that is, the message of the spectator on the surface of the sphere and generates the effect video. As a result, for example, in the drawing, a video of a collection of spherical messages as illustrated on the lower side is generated as the effect video.

Figure 30:
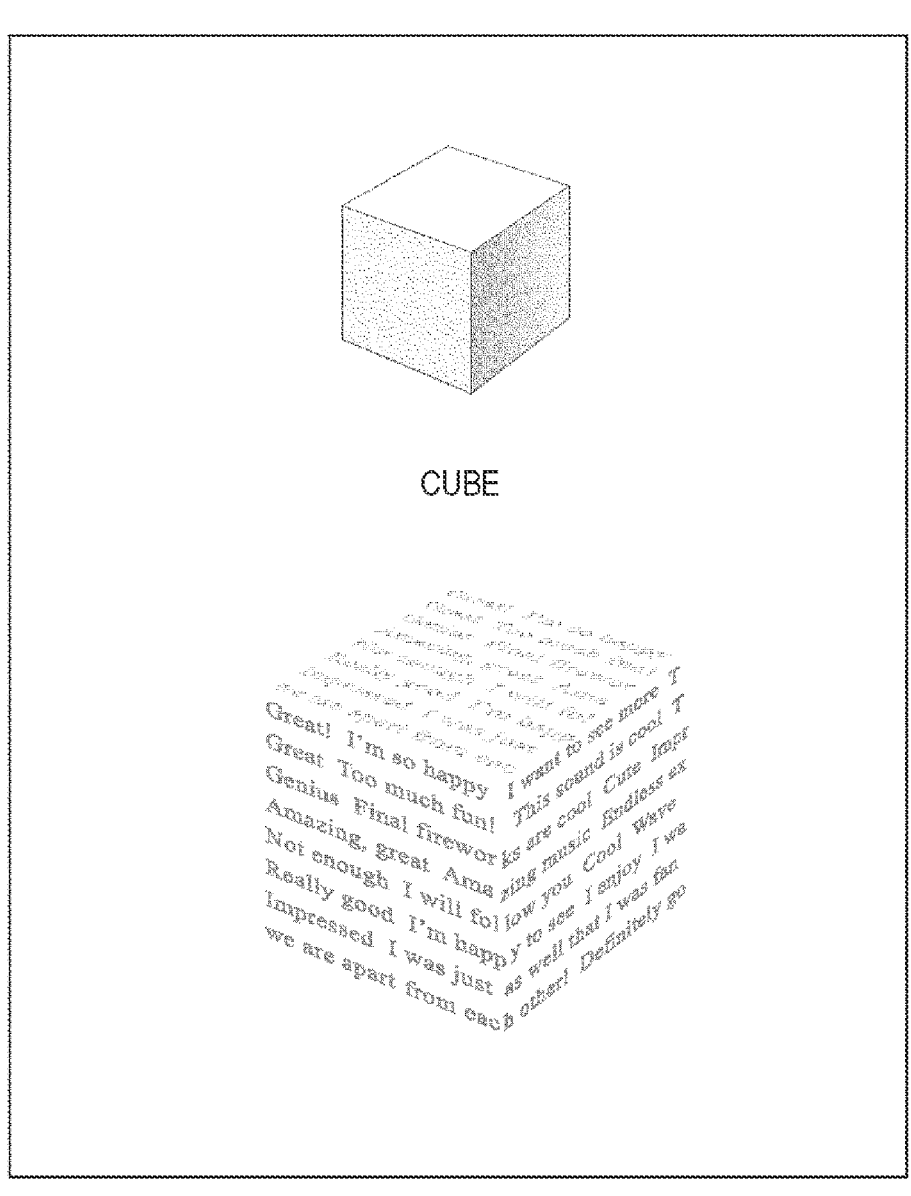
FIG. 30 is a diagram illustrating an example of the collection of the messages.

In FIG. 30, a cube as the object is illustrated on the upper side in FIG. 30. The control unit 54 arranges the message of the spectator on a surface of the cube and generates the effect video. As a result, for example, in the drawing, a video of a collection of cube messages as illustrated on the lower side is generated as the effect video.

In FIG. 31, a plane as the object is illustrated on the upper side in FIG. 31. The control unit 54 arranges the message of the spectator on this plane and generates the effect video. As a result, for example, in the drawing, a video of a collection of two-dimensional planar messages as illustrated on the lower side is generated as the effect video.

Figure 32:
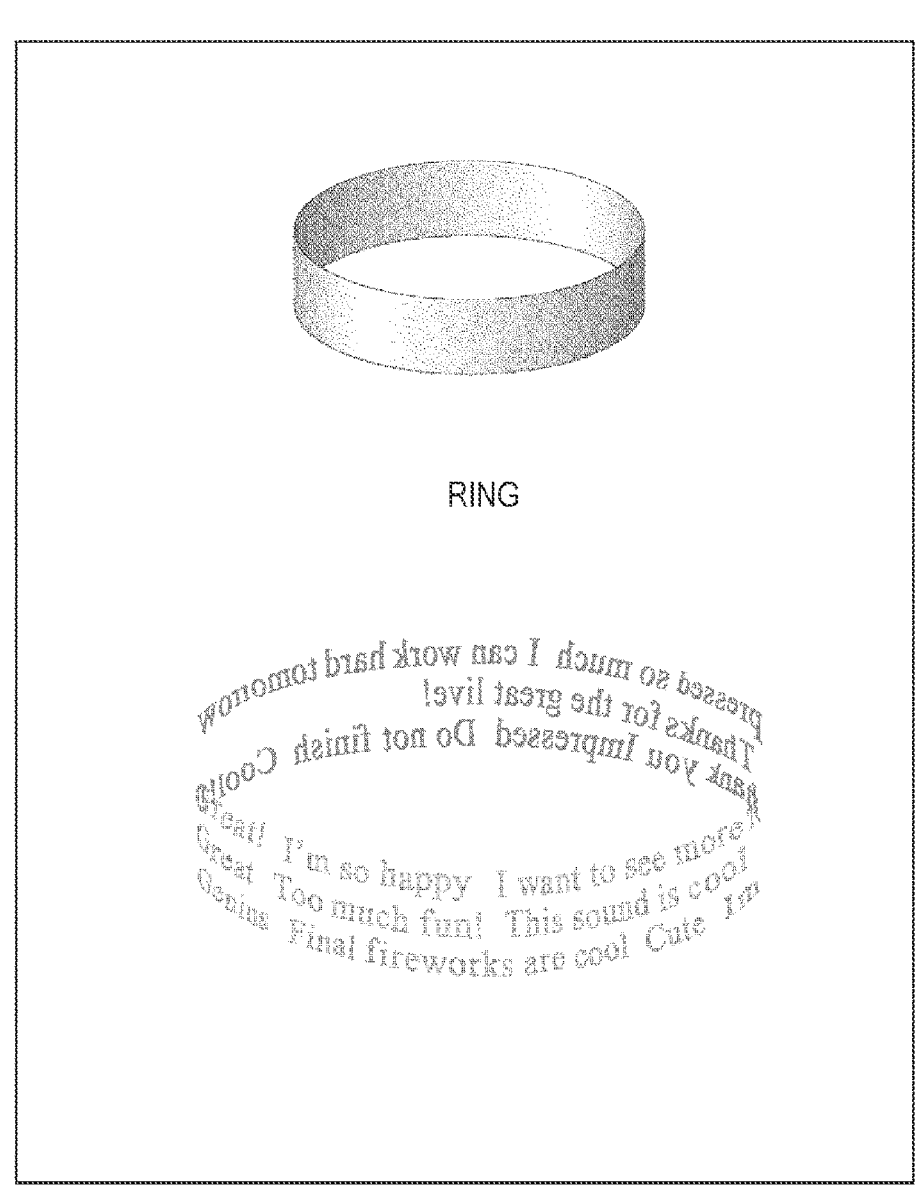
FIG. 32 is a diagram illustrating an example of the collection of the messages.

In FIG. 32, a ring-like (ring-shaped) object is illustrated on the upper side in FIG. 32. The control unit 54 arranges the message of the spectator on a surface of the object and generates the effect video. As a result, for example, in the drawing, a video of a collection of ring-like messages as illustrated on the lower side is generated as the effect video.

Furthermore, the effect video may be supplied from the information processing device 11 to the operation-side terminal 13 and be displayed on the display unit 61 of the operation-side terminal 13.

In this case, for example, the performer may hold the operation-side terminal 13, operate the input unit 64 at any timing at the time of MC or the like, and issue an instruction input regarding the display of the effect video.

Specifically, for example, it is assumed that the performer performs an operation for changing the position of the viewpoint, that is, an operation for changing the position, the direction, or the like of the virtual camera CA11 illustrated in FIG. 25, as the instruction input, on the effect video displayed on the display unit 61.

Then, the control unit 65 supplies the instruction input according to the operation of the performer supplied from the input unit 64 to the communication unit 62 and makes the communication unit 62 transmit the instruction input to the information processing device 11. The communication unit 52 of the information processing device 11 receives the instruction input transmitted from the operation-side terminal 13 and supplies the instruction input to the control unit 54.

Then, the control unit 54 generates a new effect video according to the position and the direction of the virtual camera CA11 designated by the instruction input, on the basis of the instruction input supplied from the communication unit 52 and the reaction information of each spectator.

The new effect video generated in this way is displayed on the display device 41 and the display unit 61 of the operation-side terminal 13, and the distribution video is generated by synthesizing the new effect video with the captured image. Then, the distribution video is transmitted to the spectator-side terminal 12 and is displayed on the display unit 91.

Therefore, in the display device 41, the display unit 91 of the spectator-side terminal 12, and the display unit 61 of the operation-side terminal 13, the viewpoint or a line-of-sight direction in the displayed effect video or a portion of the effect video in the distribution video changes according to the operation on the operation-side terminal 13 by the performer.

Note that the instruction input (operation) on the effect video displayed on the operation-side terminal 13 by the performer is not limited to the change of the position or the direction of the virtual camera CA11 and may be any other instruction inputs.

For example, when the performer performs a zoom-in or zoom-out operation of the virtual camera CA11 as the instruction input, an angle of view of the effect video changes. In this case, by performing zooming in or the like in response to the instruction input, the control unit 54 changes a size of the object such as the sphere displayed in the effect video, on a screen.

Furthermore, for example, when the performer performs an operation for rotating the sphere in a predetermined direction such as the horizontal direction or the vertical direction in FIG. 29 as the instruction input, in a state where the video of the collection (sphere) of the spherical messages illustrated in FIG. 29 is displayed as the effect video, the sphere rotates in response to the operation. That is, the control unit 54 changes the direction of the sphere (object) in the effect video.

In this case, for example, the performer can introduce the messages of the spectators by rotating the sphere in the effect video and reading the message displayed on the sphere surface.

Similarly, for example, the performer can display a desired surface by rotating the collection of the cube messages illustrated in FIG. 30 or rotate the collection of the ring-like messages illustrated in FIG. 32.

Moreover, for example, the performer can perform an operation for switching the shape of the object on which the message is displayed from the sphere illustrated in FIG. 29 into the plane illustrated in FIG. 31 as the instruction input or may perform an operation for moving the positions of the objects such as the plurality of spheres arranged in the virtual space, as the instruction input. In such a case, the control unit 54 changes the position or the shape of the object such as the sphere in the effect video, in response to the instruction input.

Furthermore, in a case where the message of the spectator is displayed on the object with the three-dimensional or two-dimensional shape in the effect video, it is considered that the control unit 54 divides the object into a plurality of regions and displays the messages in the plurality of regions in order.

Figure 33:
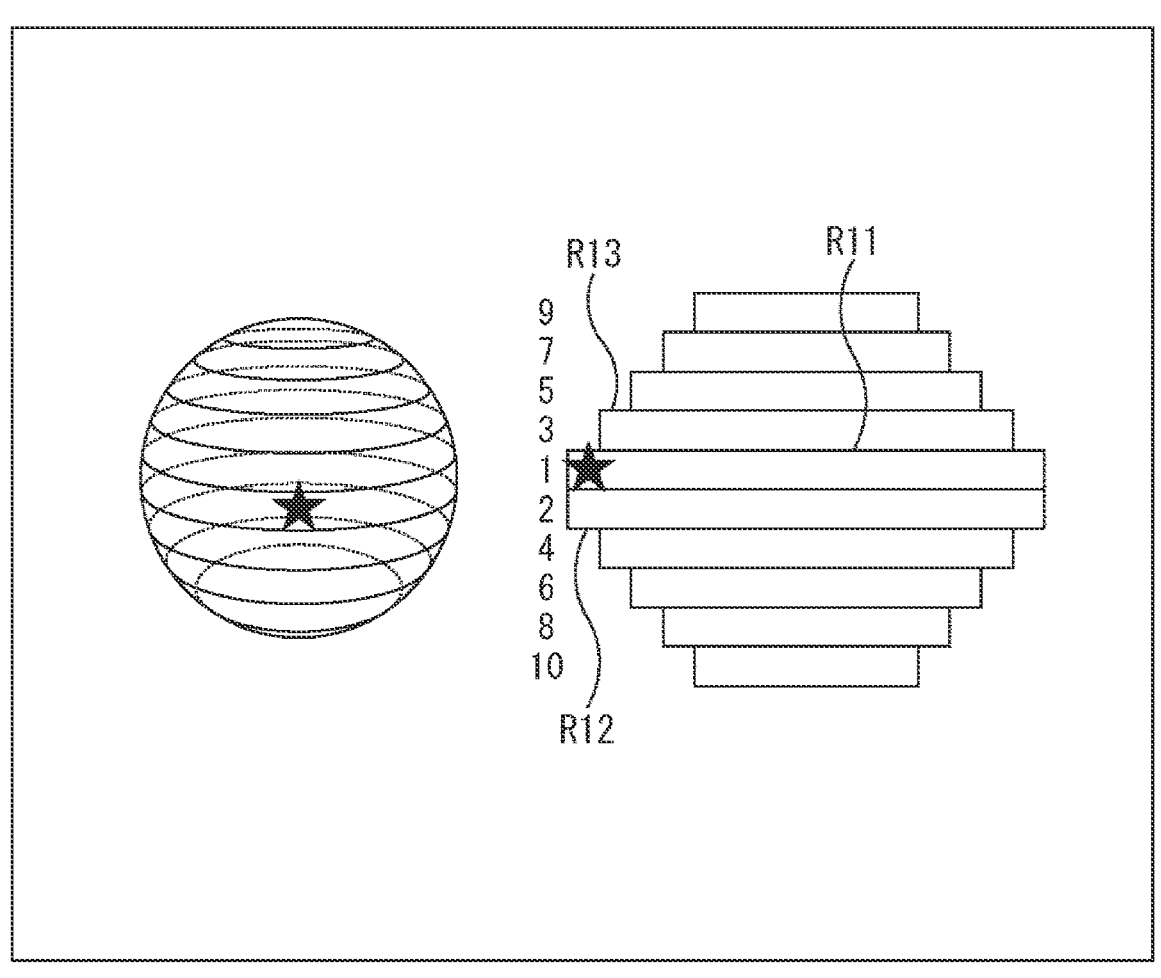
FIG. 33 is a diagram for explaining display of a message in a comment display region.

Specifically, for example, it is assumed that the messages of the spectators be displayed on the sphere as the object as illustrated on the left side in FIG. 33.

In this example, the sphere is divided into 10 regions arranged in the vertical direction in the drawing, and the messages of the spectators are displayed in the 10 regions (hereinafter, also referred to as comment display region) in order. In other words, in this example, the 10 comment display regions are provided on the sphere surface, and a message for one line is displayed in the single comment display region.

Furthermore, a state where the sphere including the 10 comment display regions is developed into the plane is illustrated on the right side in the drawing, and a number written on the left side in the drawing in each comment display region represents an order when the message of the spectator is displayed.

Here, first, a message is displayed in a comment display region R11 at the center of the sphere. Then, when the messages cannot be completely displayed in the comment display region R11, the messages displayed in the comment display region R11 move to a comment display region R12 adjacent to the lower side of the comment display region R11 in the drawing, and a new message is displayed in the comment display region R11.

Moreover, when the messages cannot be completely displayed in the comment display region R12, the messages displayed in the comment display region R12 move to a comment display region R13 adjacent to the upper side of the comment display region R11 in the drawing. At this time, the messages displayed in the comment display region R11 move to the comment display region R12, and a new message is displayed in the comment display region R11.

In this way, in the 10 comment display regions on the sphere, from the comment display region R11 at the center toward the upper and lower ends of the sphere alternately upward and downward, the messages of the spectators are displayed in the respective comment display regions.

Figure 34:
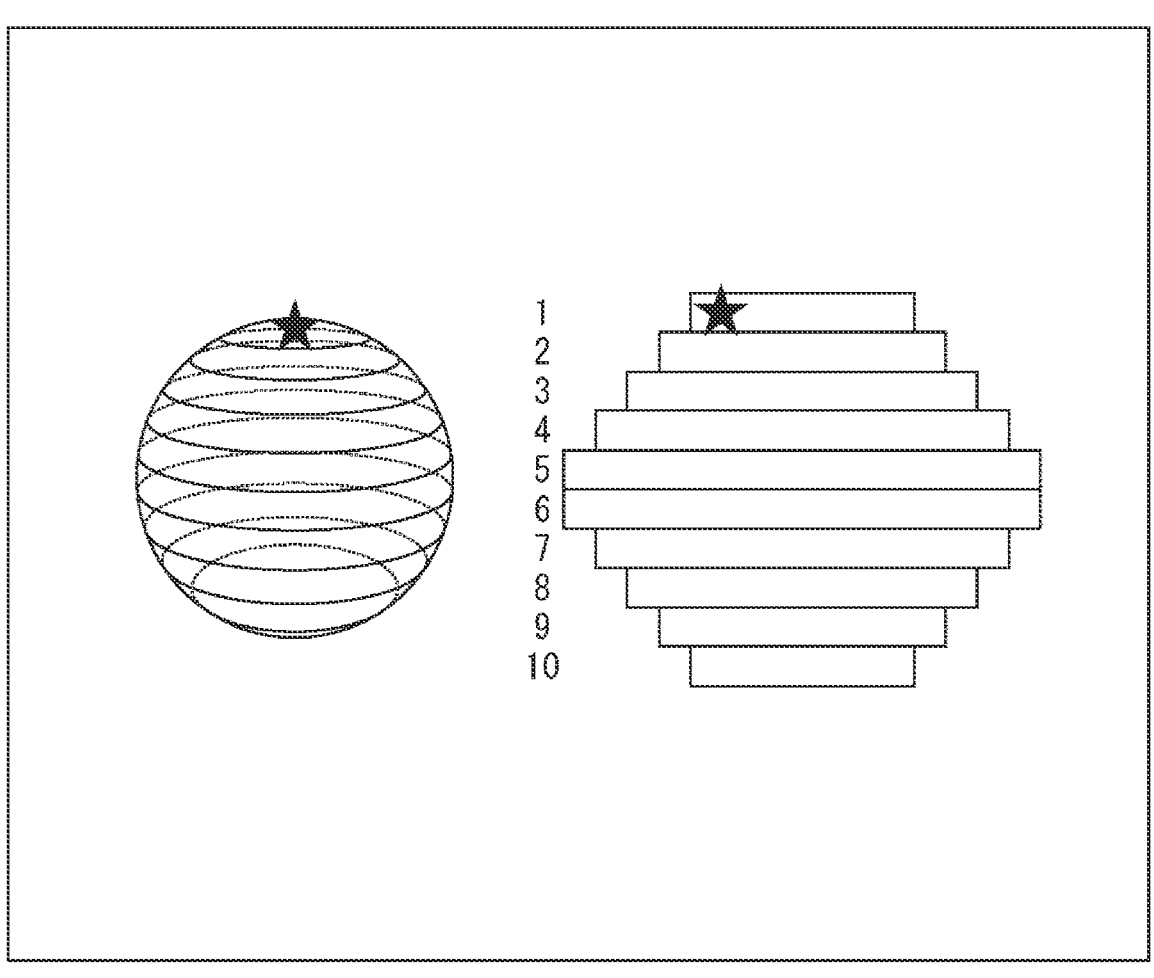
FIG. 34 is a diagram for explaining the display of the message in the comment display region.

Note that the present invention is not limited to the example illustrated in FIG. 33, and for example, as illustrated in FIG. 34, the messages may be displayed from a comment display region in the upper stage to a comment display region in the lower stage in order.

On the left side in FIG. 34, as in a case of FIG. 33, the sphere on which the message of the spectator is displayed is illustrated, and this sphere is divided into 10 comment display regions arranged in the vertical direction.

Furthermore, a state where the sphere including the comment display regions is developed into the plane is illustrated on the right side in FIG. 34, and a number written on the left side in FIG. 34 in each comment display region represents an order when the message of the spectator is displayed.

Therefore, in this example, first, the message is displayed in the uppermost (uppermost stage) comment display region of the sphere in FIG. 34. Then, when the messages cannot be completely displayed in the uppermost comment display region, the messages displayed in the uppermost comment display region move to a comment display region adjacent to the lower side of the comment display region in the drawing, and a new message is displayed in the uppermost comment display region.

Furthermore, for example, in the examples illustrated in FIGS. 33 and 34, in a state where the messages of the spectators are displayed in the comment display regions in all the stages on the sphere, the size (size) of the sphere increases, and the number of comment display regions provided on the sphere may increase.

Specifically, for example, in the examples illustrated in FIGS. 33 and 34, when the messages are displayed in all of the 10 comment display regions, the sphere becomes larger, and 12 comment display regions are formed on the sphere.

As a result, not only the number of comment display regions increases, but also the number of characters that can be displayed in each comment display region increases. Therefore, more messages can be displayed.

For example, a plurality of sizes different from each other such as an XS size or an S size may be prepared in advance as the size (size) of the sphere on which the message is displayed, and the size of the sphere may be changed in a stepwise manner according to the number of messages (reaction information) received by the information processing device 11.

In such a case, the size of the sphere increases as the number of received messages increases, and conversely, the size of the sphere decreases as the number of received messages decreases.

For example, when the size of the sphere reaches the predetermined maximum size, as described with reference to FIG. 26, the sphere moves to a position on a deeper side as viewed from the virtual camera in the virtual space, and a new sphere is formed at a position on the front side.

Furthermore, for example, in a case where the number of spheres that can be arranged in the virtual space is limited, the sphere that has reached the deepest position as viewed from the virtual camera in the virtual space disappears. In addition, for example, in a case where the position of the sphere itself does not change, when there is no free space for displaying the message in the entire sphere, the messages disappear in order from the oldest message in terms of time.

Here, an example in which the size of the sphere on which the message is displayed increases and an example in which the oldest message displayed on the sphere disappears will be described in detail.

Figure 35:
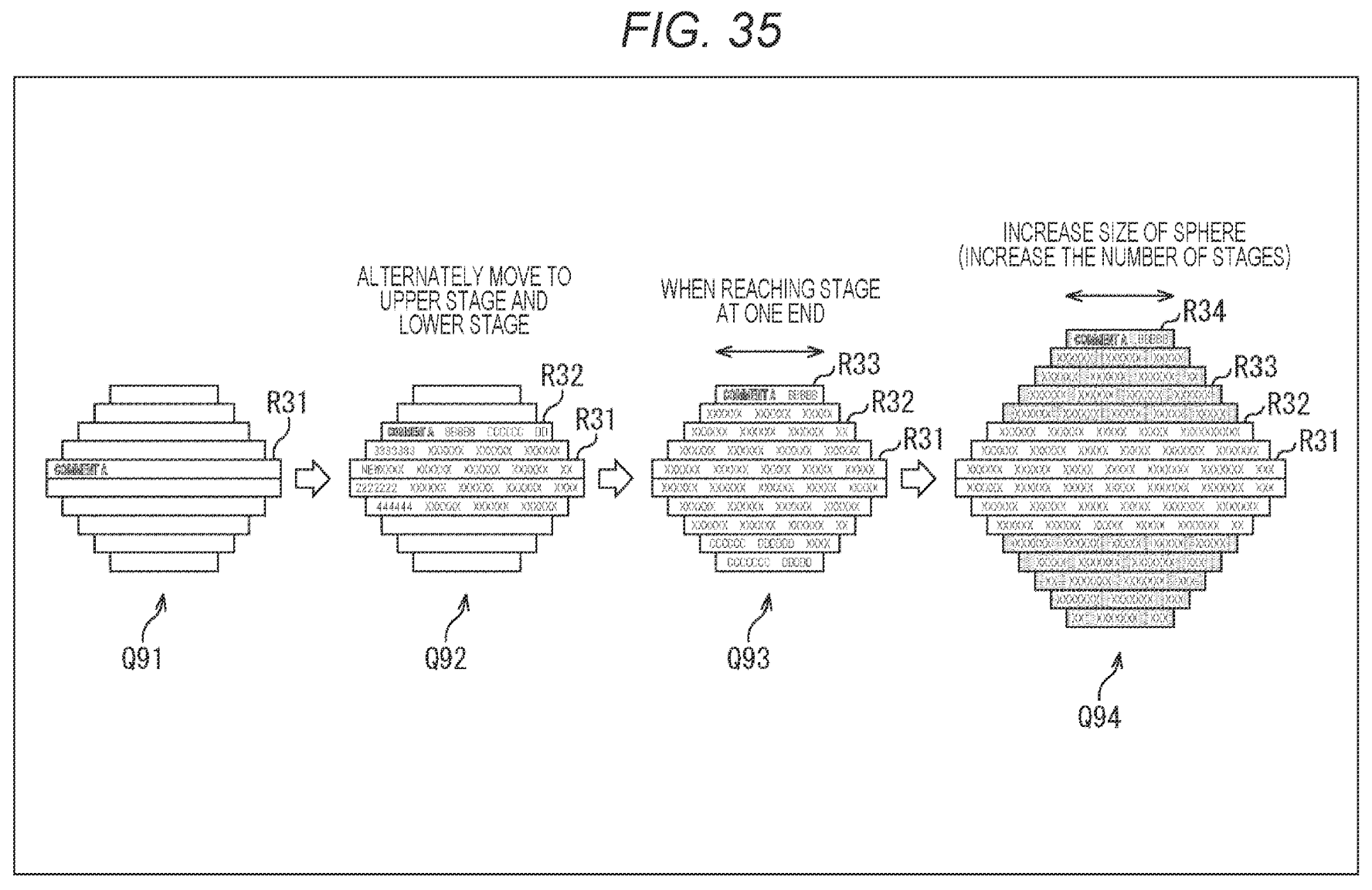

For example, as indicated by an arrow Q91 in FIG. 35, it is assumed that 10 stages (10) of comment display regions be provided on the sphere and a message "comment A" of a spectator be displayed in a comment display region R31 at the center stage.

Note that, in FIG. 35, for easy viewing of the drawing, a state where a sphere is developed into a plane is illustrated.

Furthermore, in this example, as in the example in FIG. 33, first, the message is displayed in the comment display region R31 at the center, and thereafter, the messages of the spectators are displayed in the respective comment display regions from the comment display region R31 toward an upper and a lower ends of the sphere alternately upward and downward.

That is, when there is no free space in the comment display region in which the message is written, the comment display region that is the closest to the center (middle stage) of the sphere, among the comment display regions in which messages are not written yet, is selected as the movement destination of the message. At this time, in a case where there are two comment display regions that are the closest to the middle stage, for example, the comment display region on the upper end side of the sphere is selected. Note that, in addition to move the message alternately upward and downward, the message that has moved to the comment display region adjacent to the upper side then may constantly move to a comment display region adjacent to the upper side, and the message moved to the comment display region adjacent to the lower side may thereafter constantly move to a comment display region adjacent to the lower side.

In a state indicated by an arrow Q91, when a newly received message is displayed in the comment display region R31 at the middle stage, the message "comment A" displayed first moves rightward in the comment display region R31 in the drawing.

Then, when the message "comment A" reaches the right end of the comment display region R31, the message "comment A" moves to a head (one end) of the comment display region adjacent to the lower side in the drawing of the comment display region R31.

In this way, if the display position of the message "comment A" moves each time when a newly received message is displayed, for example, as indicated by an arrow Q92, the message "comment A" is displayed in a comment display region R32.

From this state, if the display position of the message "comment A" further moves, as indicated by an arrow Q93, a state is achieved where the message "comment A" reaches an uppermost comment display region R33, that is, the messages are displayed in all the comment display regions included in the sphere.

Then, as indicated by an arrow Q94, the size of the sphere for displaying the messages increases, the number of comment display regions included in the sphere also increases. Then, the newly received message is displayed, and the display position of the message "comment A" moves.

In this example, the number of comment display regions increases from 10 to 16, and the message "comment A" has moved to an uppermost comment display region R34.

The control unit 54 displays the message in each comment display region on the sphere while changing the size of the sphere in the effect video, accordance to the number of messages of the spectators supplied from the communication unit 52, that is, the number of pieces of text information as the reaction information. At this time, as described above, the sphere and the message may be drawn with particles (aggregate of dots).

Figure 36:
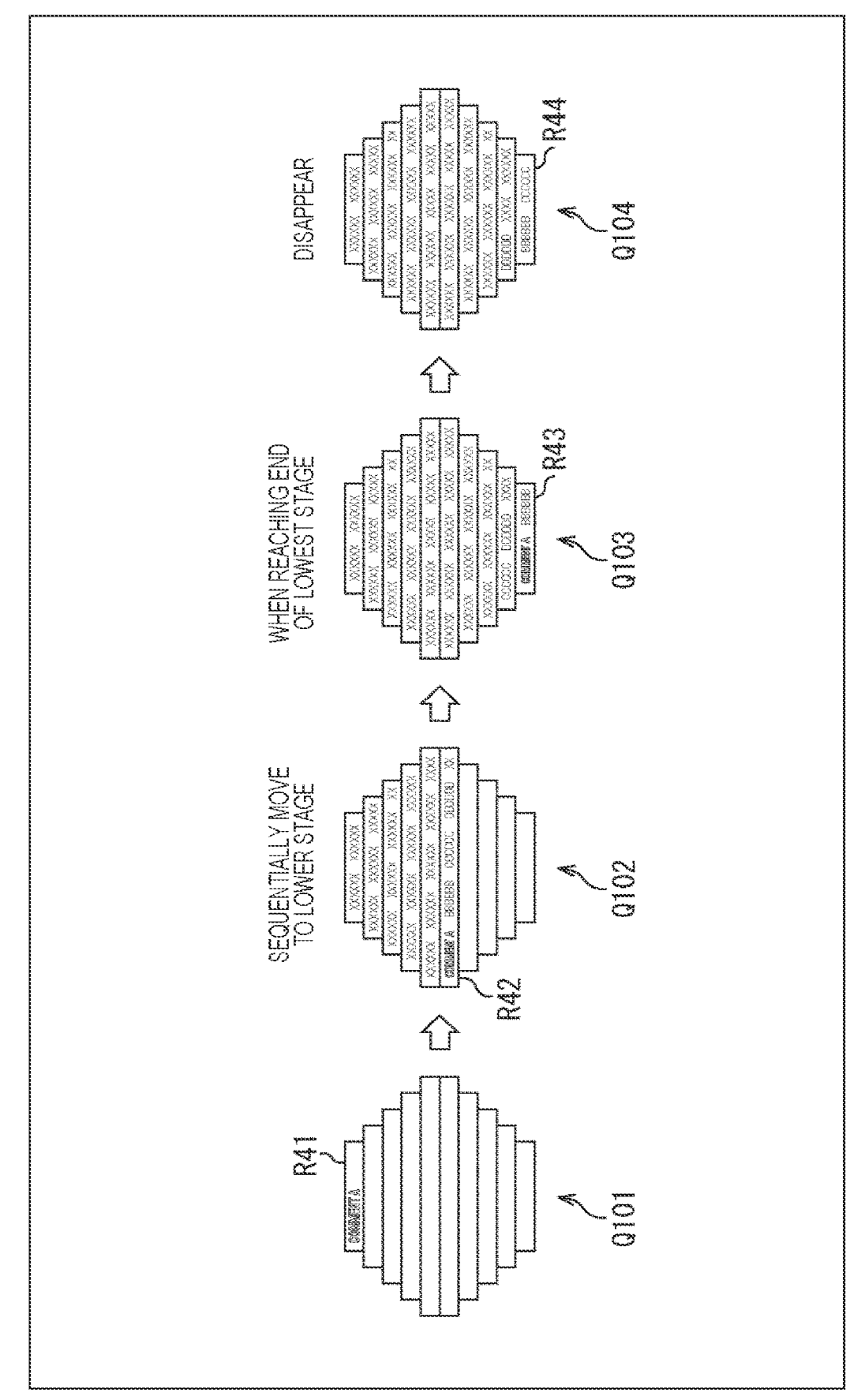
FIG. 36 is a diagram for explaining deletion of the display of the message.

Furthermore, for example, as illustrated in FIG. 36, the control unit 54 may generate the effect video in which the oldest message displayed on the sphere disappears. Note that, in FIG. 36, for easy viewing of the drawing, a state where a sphere is developed into a plane is illustrated.

For example, as indicated by an arrow Q101, it is assumed that 10 stages (10) comment display regions be provided on the sphere and the message "comment A" of the spectator be displayed in an uppermost comment display region R41.

Furthermore, in this example, as indicated by an arrow Q102, each time when a new message is displayed, the old message moves from the uppermost comment display region R41 on the sphere to a comment display region at a lower stage.

Here, the message "comment A" in the uppermost comment display region R41 has moved to a comment display region R42 at the middle stage.

When the display position of the message "comment A" further moves from this state, for example, as indicated by an arrow Q103, the message "comment A" reaches an end of a comment display region R43 at the lowermost stage of the sphere.

Here, for example, it is assumed that the number of spheres that can be arranged in the virtual space be determined in advance, for example, displaying the sphere for each performer or each region where the spectator exists, that is, it be not possible to form a new sphere.

In such a case, when a new message is further displayed from the state indicated by the arrow Q103, as indicated by an arrow Q104, the message "comment A" is deleted from the sphere.

On the other hand, in a case where a new sphere can be formed, for example, the number of spheres arranged in the virtual space is not limited, thereafter, the sphere in the state indicated by the arrow Q103 moves to the position on the deeper side as viewed from the virtual camera, and a new sphere is formed on the front side of the sphere (side of virtual camera).

Figure 37:
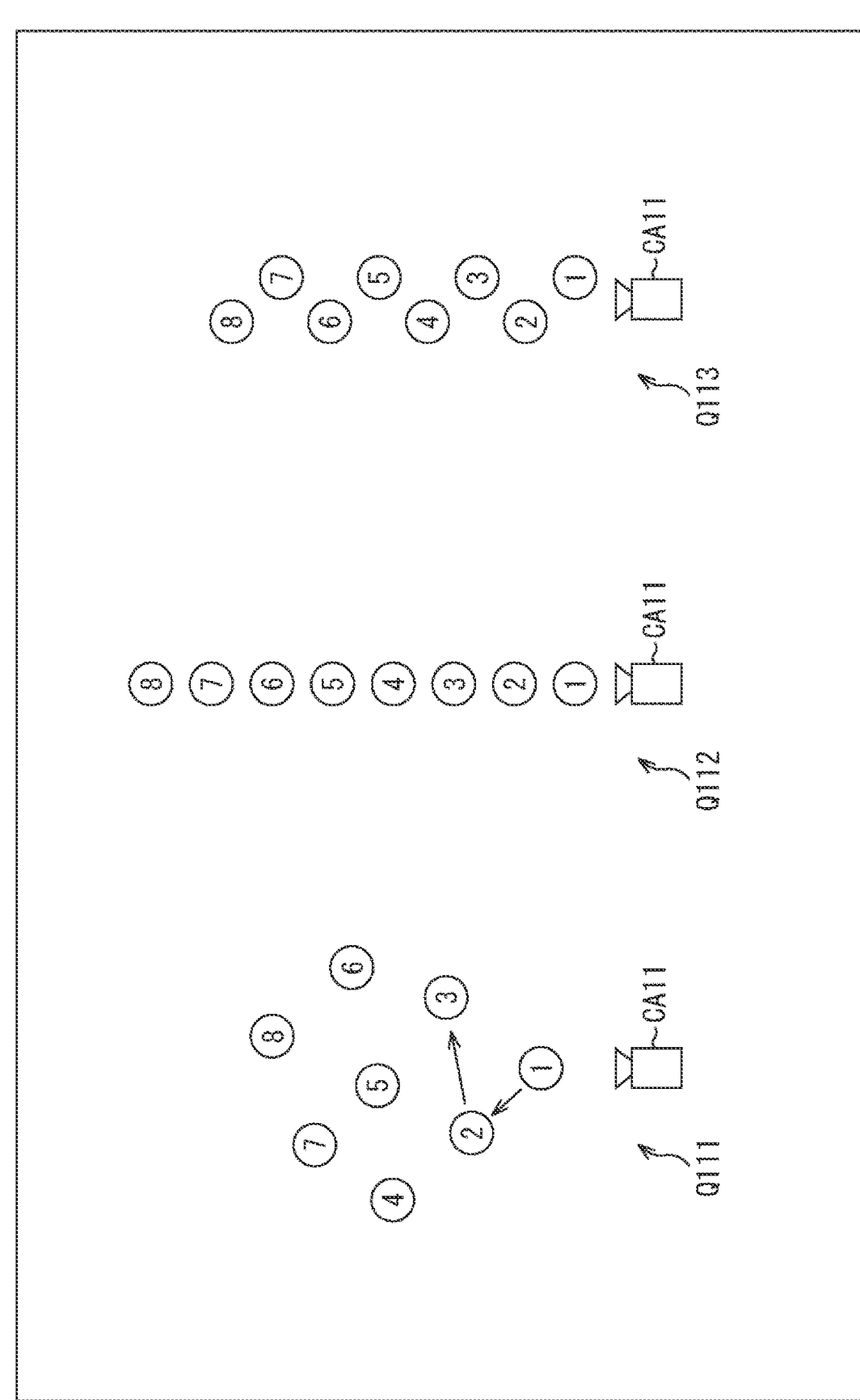
FIG. 37 is a diagram for explaining movement of the sphere.

At this time, each position to be the movement destination of the sphere in the virtual space may be arbitrary position, for example, a position illustrated in FIG. 37 or the like. Note that, in FIG. 37, portions corresponding to those in FIG. 26 are denoted by the same reference numerals, and description thereof will be omitted as appropriate.

One circle in FIG. 37 represents an arrangement position of the sphere in the virtual space, and in particular, a number written in the sphere represents an order to be the movement destination of the sphere.

For example, in the example indicated by an arrow Q111, first, a sphere is formed at a position, close to the virtual camera CA11, where a number "1" is written. Then, when the messages cannot be completely displayed in the sphere, thereafter, the sphere moves from the position where the number "1" is written, to a position where a number "2" is written and a position where a number "3" is written, to a position where a number "8" is written.

Furthermore, in the example indicated by an arrow Q112, the positions to be the movement destinations of the sphere are linearly arranged, and when a new sphere is formed, the existing sphere moves in a direction immediately behind the newly formed sphere as viewed from the virtual camera CA11.

Moreover, in the example indicated by an arrow Q113, each time when the new sphere is formed, the existing sphere alternately moves obliquely backward left and obliquely backward right as viewed from the virtual camera CA11.

Furthermore, it is considered that the text information (message) as the reaction information of the spectator is simultaneously and frequently received, that is, a message reception frequency is high and it is difficult to display the received messages in one stage of the comment display region in real time. In such a case, for example, the simultaneously received messages may need to be displayed to be overlapped.

Therefore, for example, at the center of the graphic object such as the sphere on which the message is displayed, a region where a latest message is displayed with a large font size (large character) (hereinafter, also referred to as center region) may be provided.

Figure 38:
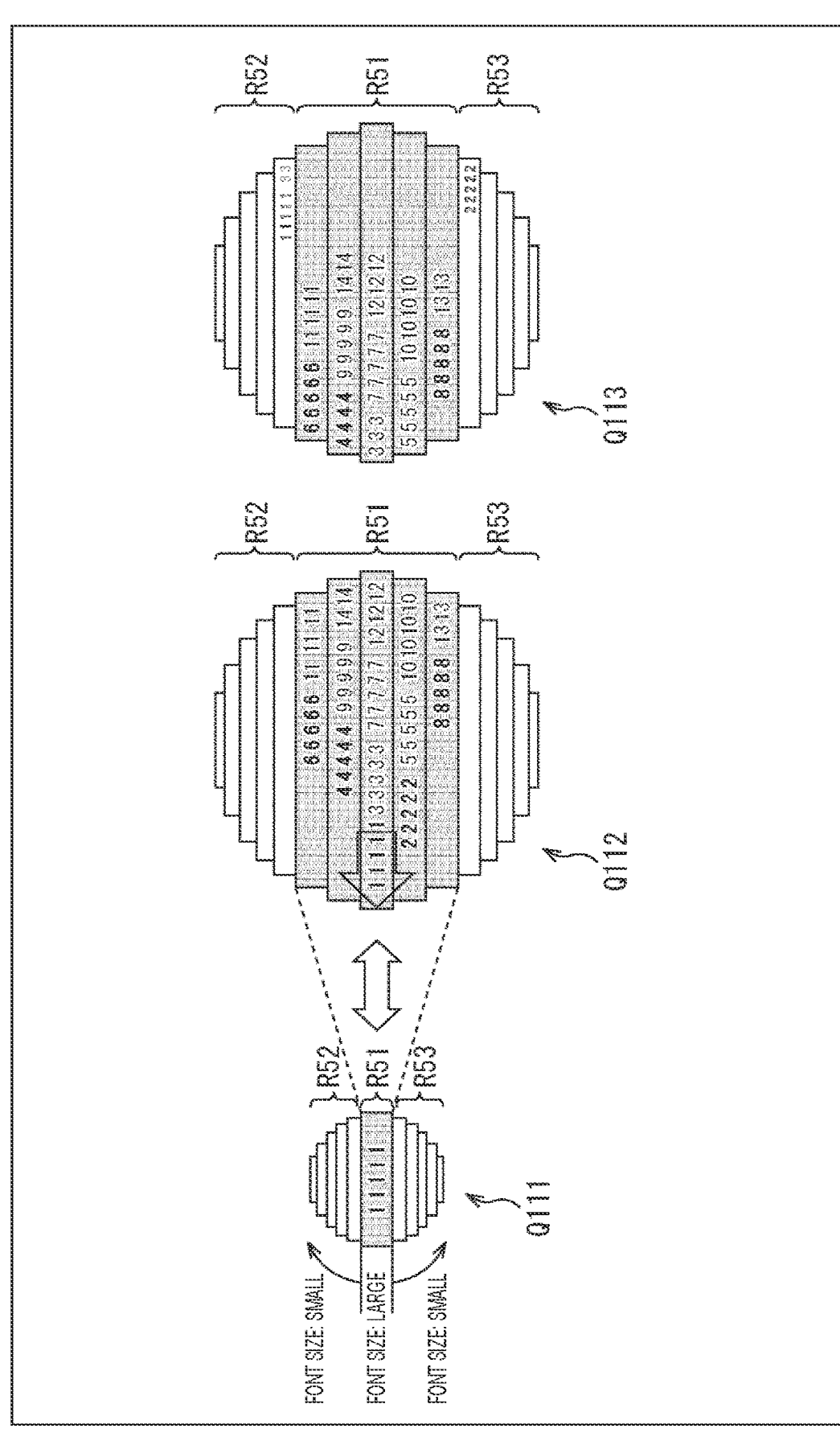
FIG. 38 is a diagram for explaining expansion/contraction of the sphere.

In this case, for example, as illustrated in FIG. 38, a center region R51 is provided at the center of the sphere on which the message is displayed, a region on an upper side of the center region R51 of the sphere in FIG. 38 is set as an upper region R52, and a region on a lower side of the center region R51 of the sphere in FIG. 38 is set as a lower region R53.

One or a plurality of comment display regions is provided in the center region R51, and a message (text information) with a larger font size is displayed in the comment display region than that in a case of the upper region R52 and the lower region R53.

In particular, in the center region R51, a message that is the most recently received (latest) is displayed. Furthermore, a width of each comment display region provided in the center region R51 in the vertical direction in the drawing, that is, a height is the same height, and the message is displayed with the same font size in each comment display region in the center region R51.

In the upper region R52 and the lower region R53, a plurality of comment display regions is provided, and a message (text information) with a smaller font size is displayed in these comment display regions than that in a case of the center region R51.

In particular, in the upper region R52 and the lower region R53, regarding the comment display region on the side of the upper or lower end of the sphere, that is, on the farther side from the center region R51, the height (width) in the vertical direction is set to be lower in the drawing. That is, the closer to the upper and the lower ends of the sphere, the smaller the font side of the message displayed in the comment display region.

In the upper region R52 and the lower region R53, older messages in terms of time than the message displayed in the center region R51, that is, messages received in the past are displayed.

More specifically, in response to the reception of the new message, the message displayed in the center region R51 moves to the upper region R52 or the lower region R53. Furthermore, in the upper region R52 and in the lower region R53, in response to the reception of the new message, an older message moves from the comment display region on the closer side to the center region R51 to the comment display region on the farther side from the center region R51. Then, the message that has reached the end of the comment display region on the upper end or the lower end of the sphere disappears (disappear).

In this example, the control unit 54 changes the size of the center region R51 in the sphere, that is, the number of comment display regions formed in the center region R51, according to the message reception frequency (the number of simultaneously received messages). At this time, the control unit 54 also changes the size of the entire sphere, according to the change in the size of the center region R51.

On the other hand, for example, the number of comment display regions provided in the upper region R52 and in the lower region R53 is set to be a certain number or the like regardless of the message reception frequency.

For example, in a case where the message reception frequency is equal to or less than a predetermined value, that is, in a case where the reception frequency is low, the control unit 54 sets the number of comment display regions formed in the center region R51 to one (one stage), as indicated by an arrow Q111.

Then, the control unit 54 increases the number of comment display regions in the center region R51 as the message reception frequency increases, and in a case where the reception frequency becomes equal to or more than a specific value, for example, as indicated by the arrow Q112, the control unit 54 forms five (five stages) comment display regions in the center region R51.

Furthermore, the control unit 54 moves the message displayed in the comment display region in the center region R51 from one end to another end in the comment display region in response to the reception of the new message, and moves the message that has reached the other end to the upper region R52 or the lower region R53.

At this time, the message displayed in each comment display region moves to the other comment display region according to the predetermined rule, for example, as in the example described with reference to FIG. 36 or the like.

Specifically, for example, as indicated by an arrow Q113, the message displayed in the comment display region in the center region R51 moves to the comment display region in the upper region R52 or the comment display region in the lower region R53.

For example, a message "11111" displayed on a left end of a comment display region at a center stage in the center region R51 at a timing indicated by the arrow Q112 has moved to a comment display region on the most center region R51 side in the upper region R52 at a timing indicated by the arrow Q113.

In particular, at the timing indicated by the arrow Q113, the message "11111" is displayed with a smaller font size than that when the message is displayed in the center region R51.

Thereafter, the displayed font size of the message "11111" decreases while the message "11111" moves to the comment display region on the outer side (side farther from center region R51), and when the message reaches an end of the outermost comment display region, the message "11111" is deleted.

Similarly, a message "22222" displayed on a left end of a comment display region at a second stage from the bottom in the center region R51 at the timing indicated by the arrow Q112 has moved to a comment display region on the most center region R51 side in the lower region R53 at the timing indicated by the arrow Q113.

In particular, at the timing indicated by the arrow Q113, the message "22222" is displayed with a smaller font size than that when the message is displayed in the center region R51.

Thereafter, similarly to the message "11111" the displayed font size of the message "22222" decreases while the message "22222" moves to the comment display region on the outer side, and when the message reaches an end of the outermost comment display region, the message "22222" is deleted.

As described above, according to the increase in the reception frequency, by increasing the number of comment display regions in the center region R51, even in a case where the messages are simultaneously and frequently received, the comments can be displayed in an easily viewable manner without being overlapped.

Furthermore, when the number of comment display regions formed in the center region R51 increases, the size (display) of the sphere increases by the increase, and conversely, when the number of comment display regions in the center region R51 decreases, the size of the sphere decreases. That is, as the remote live is excited and the number of messages from the spectators increases, a larger sphere is displayed.

By increasing or decreasing the size of the sphere according to the message reception frequency in this way, the excitement degree of the remote live (spectator) can be visualized in real time according to the sphere in the effect video.

Figure 39:
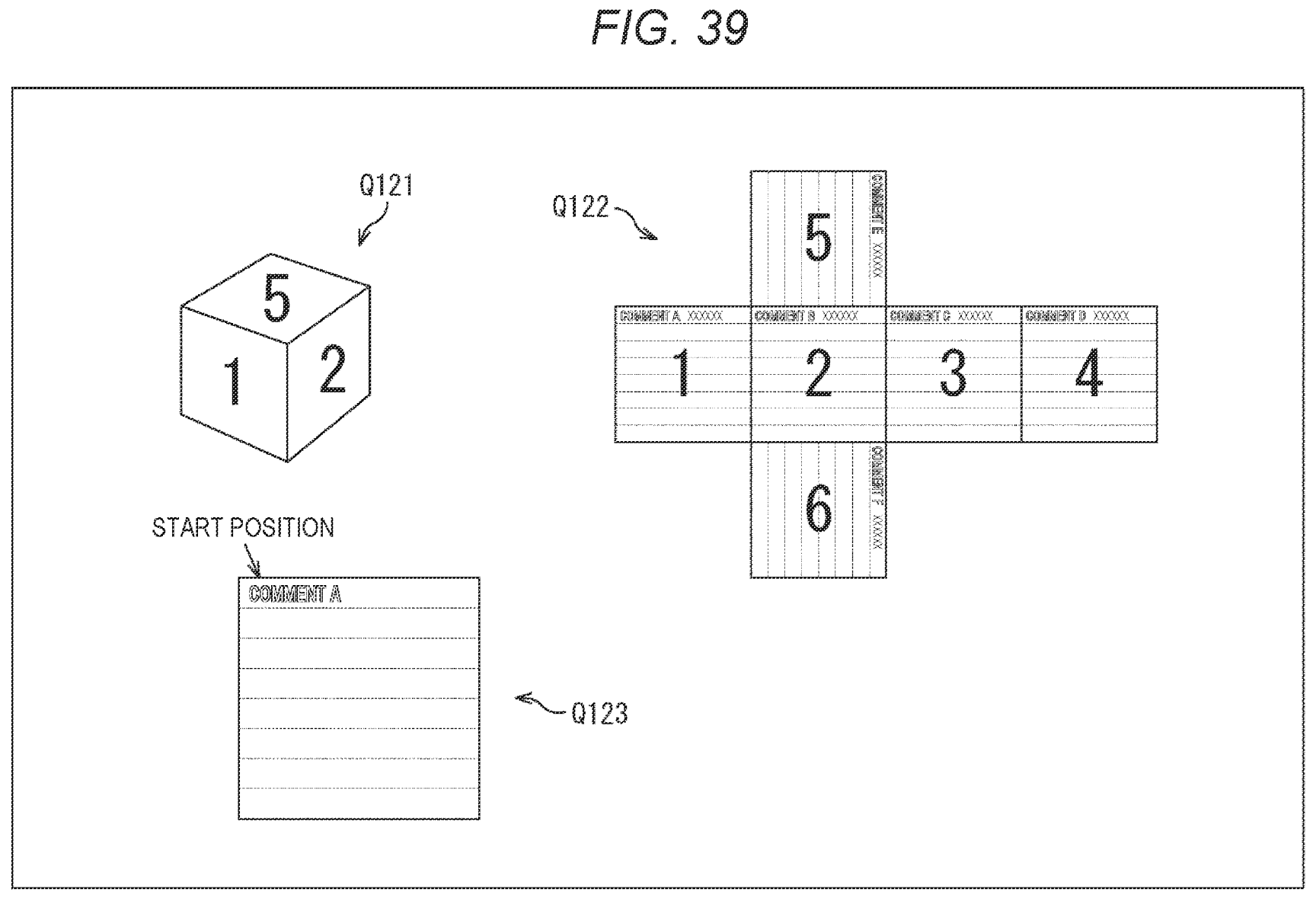

Furthermore, the object on which the message is displayed may be a cube as indicated by an arrow Q121 in FIG. 39, for example.

In this case, for example, as indicated by an arrow Q122, it is possible to provide a comment display region, in which the message is displayed, on each surface of the cube.

Note that, in a portion indicated by the arrow Q122, a state is illustrated where the cube indicated by the arrow Q121 is developed into a plane. Numbers "1" to "6" written on the respective surfaces of the cube are written to identify these surfaces, and the numbers are not actually written. Hereinafter, a surface on which a number k (k=1, 2, . . . , 6) is written is also referred to as a k-th surface.

For example, on each surface of the cube, as indicated by the arrow Q123 in the drawing, a plurality of comment display regions arranged in the vertical direction is provided from an end on an upper side (upper end) to an end on a lower side (lower end), and the messages of the spectators are displayed in these comment display regions.

In particular, in the example indicated by the arrow Q123, first, the message is displayed on the left end in the comment display region that is on the upper end side of the surface of the cube, and the message moves rightward.

Then, when the message reaches the right end, the message moves to the comment display region adjacent to the lower end side of the comment display region where the message is currently displayed. Similarly, the message moves to a comment display region on the lower end side, and when the message reaches the end of the comment display region on the lowermost end, the message disappears (deleted).

In such a case, for example, on the respective surfaces (plane) of the cube, the messages can be simultaneously displayed.

As a specific example, for example, each time of receiving the supply of the newly received message (reaction information) from the communication unit 52, the control unit 54 selects any one of a first to sixth surfaces of the cube, as a display destination of the message, and generates the effect video for displaying the message on the selected surface. At this time, the surface to be the display destination of the message may be randomly selected or selected in order.

Furthermore, for example, a message to the performer is displayed on the first surface, and a message to another performer is displayed on the second surface. In this way, the surfaces of the cube may be allocated to the performer, the area or the country where the spectator exists, the spectator group, or the like.

For example, in a case where the surface of the cube is allocated to each performer, the reaction information from each spectator includes destination information indicating to which performer the message is addressed. The control unit 54 displays the text information (message) included in the reaction information, in a comment display region provided on the surface corresponding to the performer indicated by the destination information included in the reaction information, among the surfaces of the cube arranged in the virtual space.

Furthermore, in such a case, for example, an operation on the displayed effect video may be performed so that the effect video is displayed on the operation-side terminal 13 at the time of MC or the like, the performer throws a dice, and a surface corresponding to the surface of the dice shown at the top as a result is displayed. As a result, in the effect video, the message displayed on the surface of the cube, corresponding to the surface of the dice shown on the top, is featured.

In this way, when the messages of the spectators are displayed on a polyhedron in the effect video, it is possible to realize a production having a game element or the like by selecting a predetermined surface by the performer or selecting a predetermined surface by a dice, lottery, or the like.

Note that, in the example in which the message of the spectator is displayed in the comment display region provided in the graphical object, described above, the operation side (production side) can arbitrarily set how to display the message of each spectator.

For example, the number of seconds in which one message is displayed in a stationary state is set to be four or the like, and after a newly received messages is displayed for four seconds in the stationary state, the message can move to another display position. Furthermore, for example, the number of characters displayed in the single comment display region can be limited to about 13 to 30 at the maximum.

Moreover, all the messages of the spectators received during the remote live including those not displayed in the effect video may be archived by the control unit 54 and may be recorded in the recording unit 53. As a result, not only the performer and the spectator, but also funs who cannot participate in the remote live or the like can view the message of each spectator after the remote live.

In addition, for example, in a case where the performer taps and selects a message from a predetermined spectator in the effect video displayed on the operation-side terminal 13, feedback may be sent to a spectator who has transmitted the selected message.

In such a case, for example, the control unit 65 of the operation-side terminal 13 generates an instruction input indicating information for specifying the message selected by the performer, on the basis of a signal supplied from the input unit 64 according to the operation by the performer and supplies the instruction input to the communication unit 62, and makes the communication unit 62 transmit the instruction input to the information processing device 11.

Furthermore, in the information processing device 11, the communication unit 52 receives the instruction input transmitted from the operation-side terminal 13 and supplies the instruction input to the control unit 54. The control unit 54 appropriately refers to a list of the spectator identification information or the like recorded in the recording unit 53, on the basis of the instruction input supplied from the communication unit 52 and specifies spectator identification information of the spectator who has transmitted the selected message.

Moreover, the control unit 54 generates an image of a stamp representing, for example, an expression of the performer or the like, as feedback information corresponding to the message of the spectator, in response to the instruction input from the operation-side terminal 13 and presents the feedback information to the spectator who has transmitted the selected message.

Specifically, for example, it is considered that the control unit 54 supplies the feedback information to the communication unit 52 and makes the communication unit 52 transmit the feedback information only to the spectator-side terminal 12 indicated by the specified spectator identification information.

In this case, in the spectator-side terminal 12, the communication unit 96 receives the feedback information from the information processing device 11 and supplies the feedback information to the control unit 98, and the control unit 98 supplies the feedback information supplied from the communication unit 96 to the display unit 91 to be superimposed on a distribution video that is separately received, and makes the display unit 91 display the feedback information.

Furthermore, for example, the control unit 54 of the information processing device 11 may generate a distribution video dedicated to the spectator who has transmitted the selected message by superimposing (synthesizing) the feedback information on the distribution video and supply the distribution video to the communication unit 52 and make the communication unit 52 to transmit the distribution video.

In this way, the feedback information is presented only to the spectator who has transmitted the message selected by the performer.

Similarly, for example, the feedback information may be generated according to an action on the object (effect) such as the fountain that changes according to the reaction of the spectator in the effect video.

In such a case, for example, it is assumed that the performer performs some action such as an air touch on a desired object (effect) in the effect video displayed on the display device 41 or the display unit 61. Then, the control unit 54 specifies a spectator or a spectator group that has contributed to generate the effect on which the action is performed.

For example, in a case where the effect video is displayed on the display device 41 arranged as the background of the performer and the captured image in which the performer or the effect video is set as the subject is captured by the camera 42, the control unit 54 specifies the object on which the action has been performed, through image recognition or the like on the captured image.

Furthermore, the control unit 54 appropriately refers to the spectator group ID or the spectator identification information recorded in the recording unit 53, and specifies the spectator (spectator-side terminal 12) to be a transmission source of the reaction information used to generate the specified object (effect).

Moreover, by generating the feedback information according to the action of the performer such as an animation video that expresses an air touch and supplying the feedback information to the communication unit 52, the control unit 54 transmits the feedback information to only the spectator-side terminal 12 corresponding to the specified spectator or spectator group. Note that, by superimposing the feedback information on the distribution video as described above, the distribution video to be transmitted only to the specific spectator or spectator group may generated.

Example of Video of Face of Spectator

Next, an example will be described in which the effect video is a video of a face of a single or a plurality of spectators.

Hereinafter, an example will be described in which the effect video is generated on the basis of a video obtained by imaging a face of the own by each spectator with the camera 93 before the remote live starts (hereinafter, also referred to as spectator face video). In this case, although the spectator face video is not a real-time reaction, it can be said that the spectator face video is a reaction of a spectator outside a venue regarding the remote live.

Note that the spectator face video may be a video obtained by imaging or may be point cloud data obtained by point clouding the face of the spectator (video thereof), on the basis of the video obtained by imaging with the camera 93 and a distance image (3D data) of the face of the spectator. The point cloud data may be generated by the camera 93 or the control unit 98.

Figure 40:
FIG. 40 is a diagram for explaining generation of a video of a face of the spectator.

For example, as indicated by an arrow Q131 in FIG. 40, each spectator images the spectator face video in advance before the remote live starts. Note that, in FIG. 40, portions corresponding to those in FIG. 2 are denoted by the same reference numerals, and description thereof will be omitted as appropriate.

Furthermore, the spectator-side terminal 12 transmits the spectator face video to the information processing device 11. Therefore, the recording unit 53 of the information processing device 11 records the spectator face video of each spectator in association with the spectator identification information, before the remote live starts.

As indicated by an arrow Q132, the control unit 54 generates the effect video on the basis of the spectator identification information, the spectator face video recorded in the recording unit 53, the set list information, or the like before the remote live starts or during the remote live. The effect video is, for example, the point-clouded video of the face of the spectator or the like. Note that the video of the face of the spectator may be expressed by particles.

At the time of generating the effect video, for example, the control unit 54 edits the spectator face video while switching a display mode, according to a tone of music played in the remote live, the excitement point described above, or the like, and generates the effect video.

The display mode is a mode indicating how to display the face of the spectator, and here, it is assumed that the display mode includes a transition mode and a chorus mode.

In the transition mode, the control unit 54 generates a video in which displayed faces of a single or a plurality of spectators are switched for a certain time, as the effect video.

On a left side of a portion indicated by the arrow Q132, an effect video generated in the transition mode is illustrated, and in this example, faces of three spectators are simultaneously displayed on the effect video. Furthermore, in the effect video, display is switched so that faces of a single or a plurality of spectators different from the three spectators currently displayed are displayed at a next timing.

On the other hand, in the chorus mode, the control unit 54 generates a video in which faces of a large number of spectators (equal to or more than predetermined number) are simultaneously displayed on an entire screen, as the effect video.

For example, in the chorus mode, the faces of the spectators more than those in a case of the transition mode are displayed in the screen at a time, and a display time of the faces of the spectators, that is, a time before the display is switched is longer than that in a case of the transition mode.

On a right side of the portion indicated by the arrow Q132, an effect video generated in the chorus mode is illustrated. Note that, when the faces of all the spectators are not fully included in the screen, the displayed spectators may be switched at certain time intervals.

As described above, the control unit 54 generates the effect video with a predetermined length while appropriately switching the display mode such as the transition mode or the chorus mode, and causes the recording unit 53 to record the video of the faces of the spectators as the generated effect video, as necessary.

At the time of remote live, for example, as indicated by an arrow Q133, the control unit 54 displays the video of the faces of the spectators as the generated effect video on the back screen SC11 (display device 41) arranged behind (behind performer) the stage ST11 and uses the video to generate the distribution video.

Note that, for example, how to switch the display mode in a song played in the remote live is determined in advance and may be recorded in the recording unit 53 as the set list information.

Figure 41:
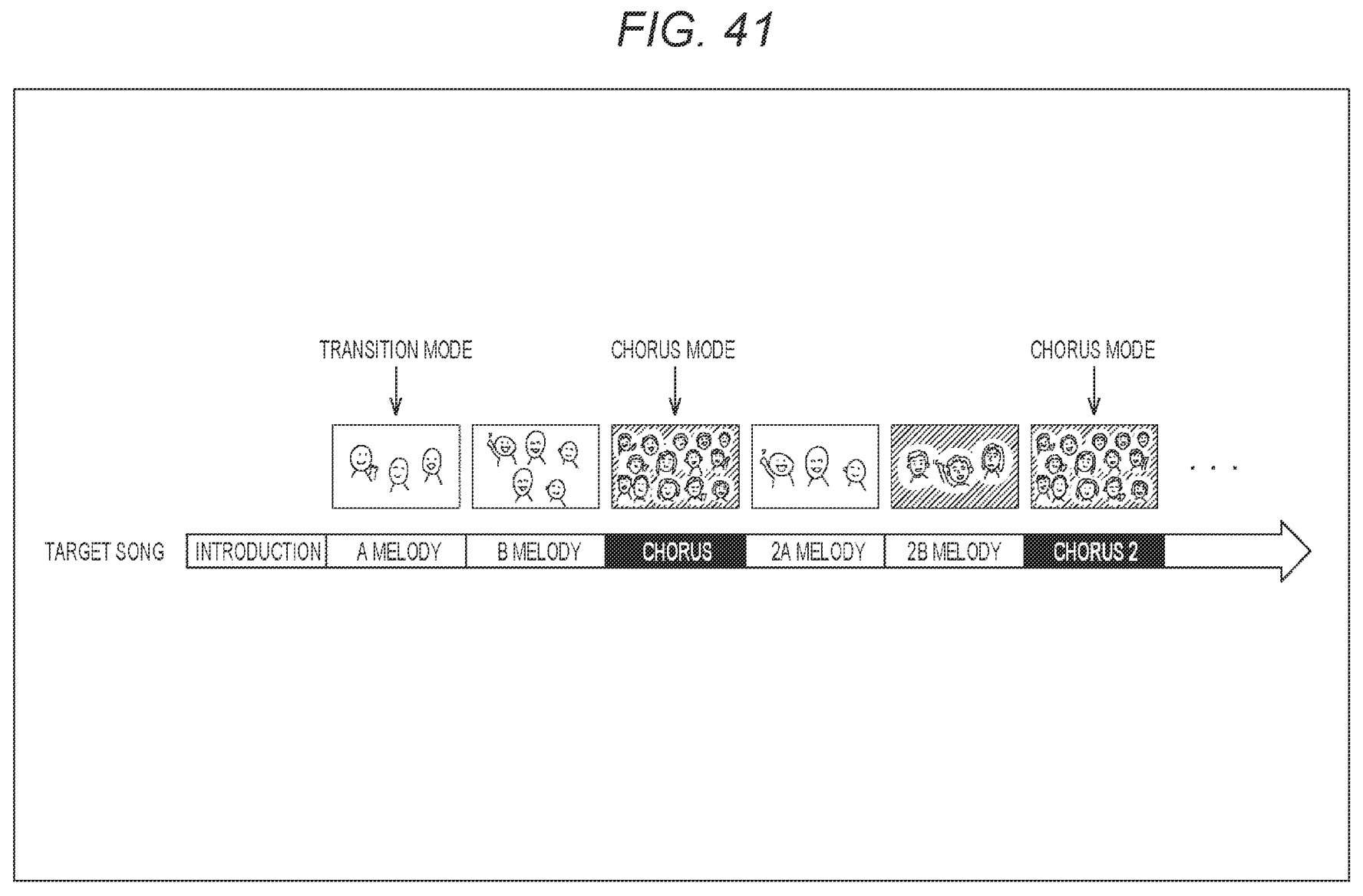

Specifically, for example, as illustrated in FIG. 41, in the remote live, while "A melody" that is a verse portion after an introduction of a target song and a portion of "B melody" that is a bridge portion following the "A melody" are played, the effect video is generated in the transition mode.

Furthermore, "chorus" that is a chorus portion following the "B melody" is set as the chorus mode, and when the portions of "2A melody" and "2B melody" are played thereafter, the mode is set to the transition mode. Thereafter, in a portion of "chorus 2", the mode is set to the chorus mode again.

Note that, here, an example has been described in which the spectator face video is captured before the remote live starts. However, the spectator face video may be captured during the remote live. In such a case, the spectator face video captured during the remote live is used as the reaction information indicating the reaction of the spectator with respect to the remote live, and the video of the face of the spectator is generated as the effect video.

Moreover, for example, the effect video dedicated to each spectator group may be generated for each spectator group.

Figure 42:
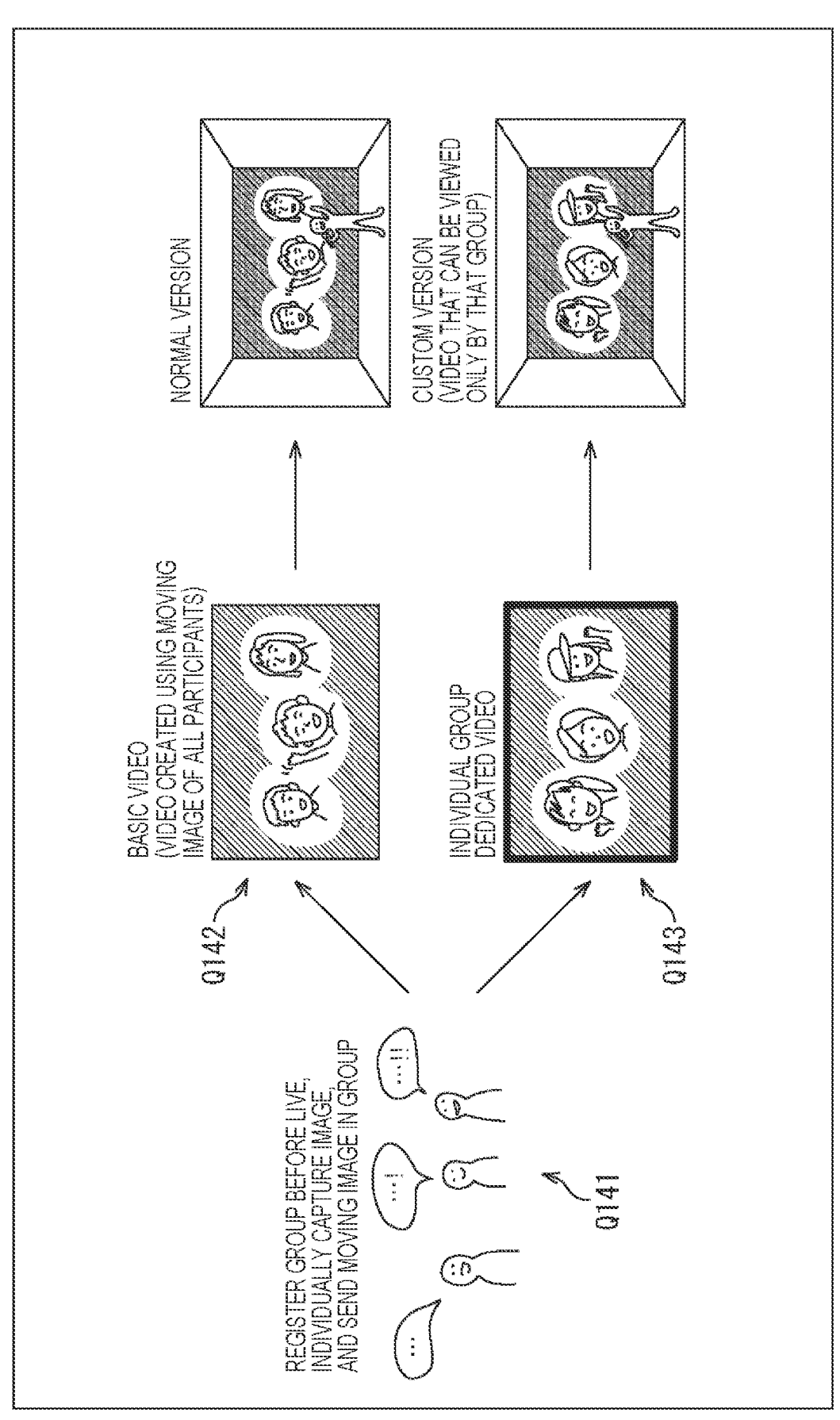
FIG. 42 is a diagram for explaining generation of a video of the face of the spectator for each spectator group.

In such a case, for example, as indicated by an arrow Q141 in FIG. 42, each spectator registers the spectator group including the spectator and other spectators in advance before the remote live starts and captures the spectator face video and transmits the spectator face video to the information processing device 11.

As a result, in the recording unit 53, the spectator group ID of the spectator group and the spectator identification information of the spectator belonging to that spectator group are recorded in association with each other, and the spectator face video of each spectator is recorded in association with the spectator identification information.

Note that, for example, a single video having the faces of the plurality of spectators belonging to the spectator group as subjects may be captured as the spectator face video of the spectator group and recorded in the recording unit 53.

Furthermore, the pieces of the spectator face video of all the spectators belonging to the spectator group may be collectively transmitted.

As in the example in FIG. 40, the control unit 54 generates the effect video on the basis of the spectator identification information, the spectator face video, the spectator group ID, the set list information, or the like recorded in the recording unit 53, before the remote live starts or during the remote live.

At this time, as indicated by an arrow Q142, the control unit 54 generates the effect video (hereinafter, also referred to as basic video) while appropriately switching the display mode, using the spectator face videos of all the spectators who are participating in the remote live.

This basic video is the video of the face of the spectator as the effect video generated by executing the processing same as that in the example described with reference to FIG. 40, and this basic video is displayed on the display device 41 installed in the remote live venue. That is, the basic video is presented to the performer.

Furthermore, the control unit 54 generates the basic video and superimposes (synthesize) the basic video on the captured image as a background video so as to generate a normal type (normal version) distribution video.

At the same time as the generation of such a basic video, the control unit 54 generates an effect video dedicated to the spectator group (hereinafter, also referred to as dedicated video), as indicated by an arrow Q143. The dedicated video is generated for each spectator group.

At the time of generation of the dedicated video, the control unit 54 replaces (replaces) a video portion of the basic video generated in the transition mode to a group face video generated on the basis of the spectator face video of the spectator belonging to the spectator group and sets the group face video as the dedicated video. For example, in the group face video, the faces of all the spectators belonging to the spectator group are simultaneously displayed, or only the faces of the spectators belonging to the spectator group are sequentially displayed.

Figure 43:
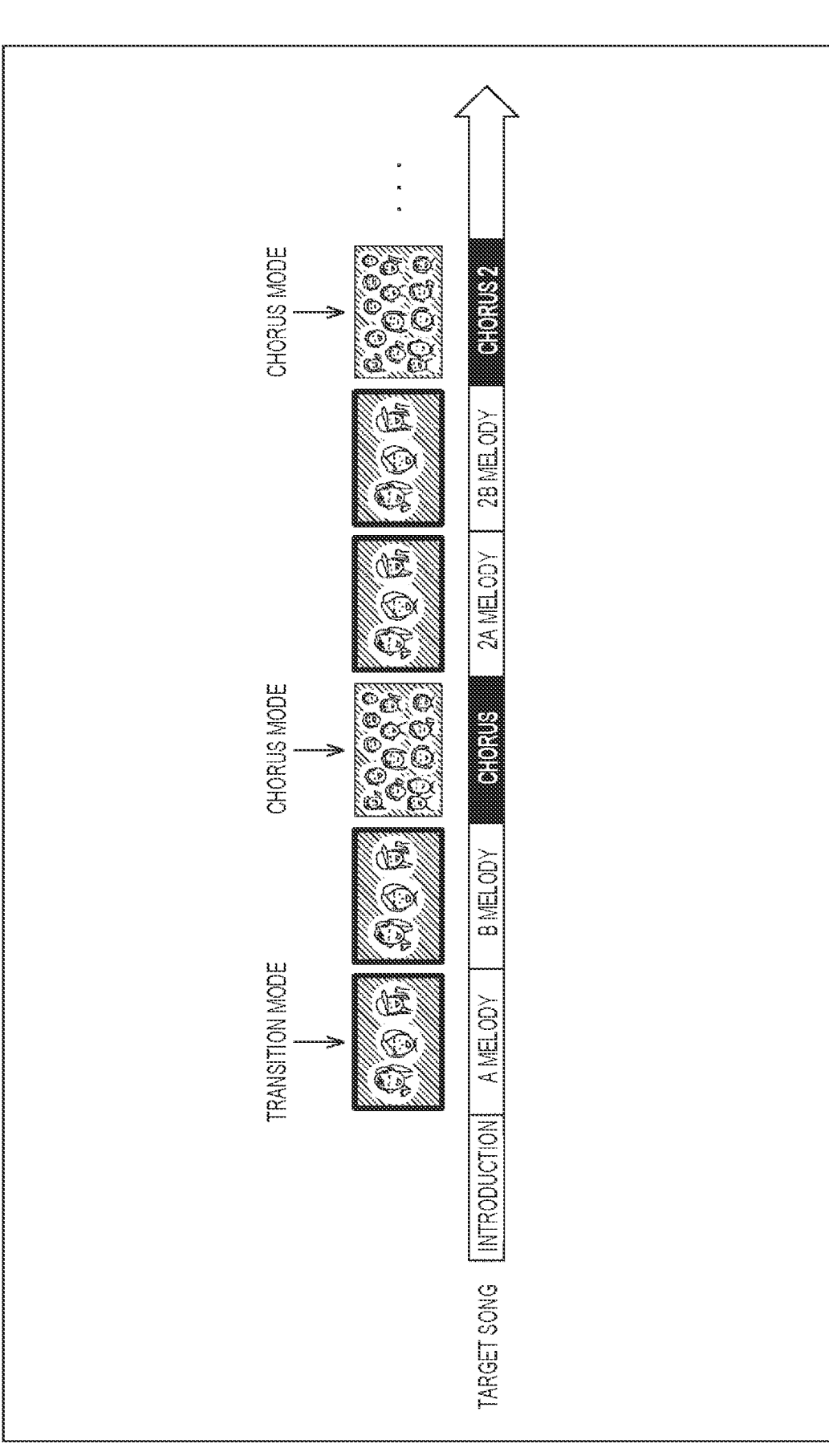
FIG. 43 is a diagram for explaining generation of a dedicated video.

Therefore, for example, if the basic video is generated as illustrated in FIG. 41, the video is partially replaced as illustrated in FIG. 43, and the dedicated video is generated.

That is, in the example illustrated in FIG. 43, in the portions of "A melody", "B melody", 2A melody", and "2B melody" in the transition mode, the basic video is replaced with the group face video. On the other hand, in the portions of "chorus" and "chorus 2" in the chorus mode, the basic video is used.

Returning to the description of FIG. 42, when generating the dedicated video on the basis of the basic video and the spectator face video of the spectator of the spectator group, by superimposing (synthesizing) the dedicated video on the captured image as the background video, the control unit 54 generates a custom type (custom version) distribution video for each spectator group.

Note that, in a case where the captured image includes the basic video as the subject, for example, it is sufficient that a basic video portion in the captured image be replaced (replaced) with the dedicated video and be made as a custom type distribution video through chromaticity processing or the like.

Figure 6:
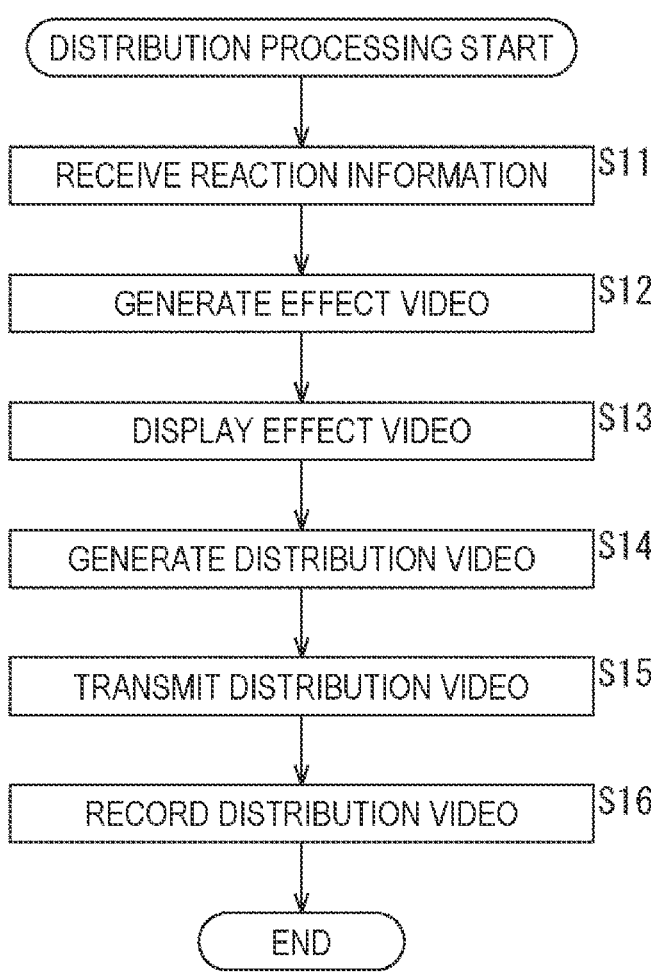
FIG. 6 is a flowchart for explaining distribution processing.

In this example, a single basic video and a dedicated video for each spectator group are generated in step S12 in FIG. 6, and a single normal type distribution video and a custom type distribution video for each spectator group are generated in step S14.

Then, in step S16, the normal type distribution video and the custom type distribution video are recorded in the recording unit 53. Note that, in step S16, the dedicated video of each spectator group may be recorded in the recording unit 53.

For example, the custom type distribution video of the spectator group is basically viewable only by the spectators belonging to the spectator group.

At the time of viewing the distribution video, each spectator may selectively switch and view the custom type distribution video dedicated to the spectator group to which the spectator belongs and the normal type distribution video.

Therefore, for example, each spectator can select and view any one, for example, by selecting the normal type distribution video in a case where each spectator wants to see what is displayed in the venue, that is, what the performer sees, and selecting the custom type distribution video if the spectator wants to make memories.

In this case, the communication unit 52 may transmit only one of the normal type distribution video and the custom type distribution video to the spectator-side terminal 12, in response to a request of the spectator-side terminal 12. Furthermore, the communication unit 52 may transmit both of the normal type distribution video and the custom type distribution video to the spectator-side terminal 12, and the spectator-side terminal 12 may selectively display one of the normal type distribution video and the custom type distribution video according to the selection of the spectator.

Furthermore, the recording unit 53 of the information processing device 11 records not only the normal type distribution video but also the custom type distribution video and the dedicated video of each spectator group.

Therefore, for example, in a dedicated web page or a dedicated application, after the end of the remote live, the spectator or the like is made to be able to view or purchase (download) the custom type distribution video or the dedicated video of the individual.

Figure 44:
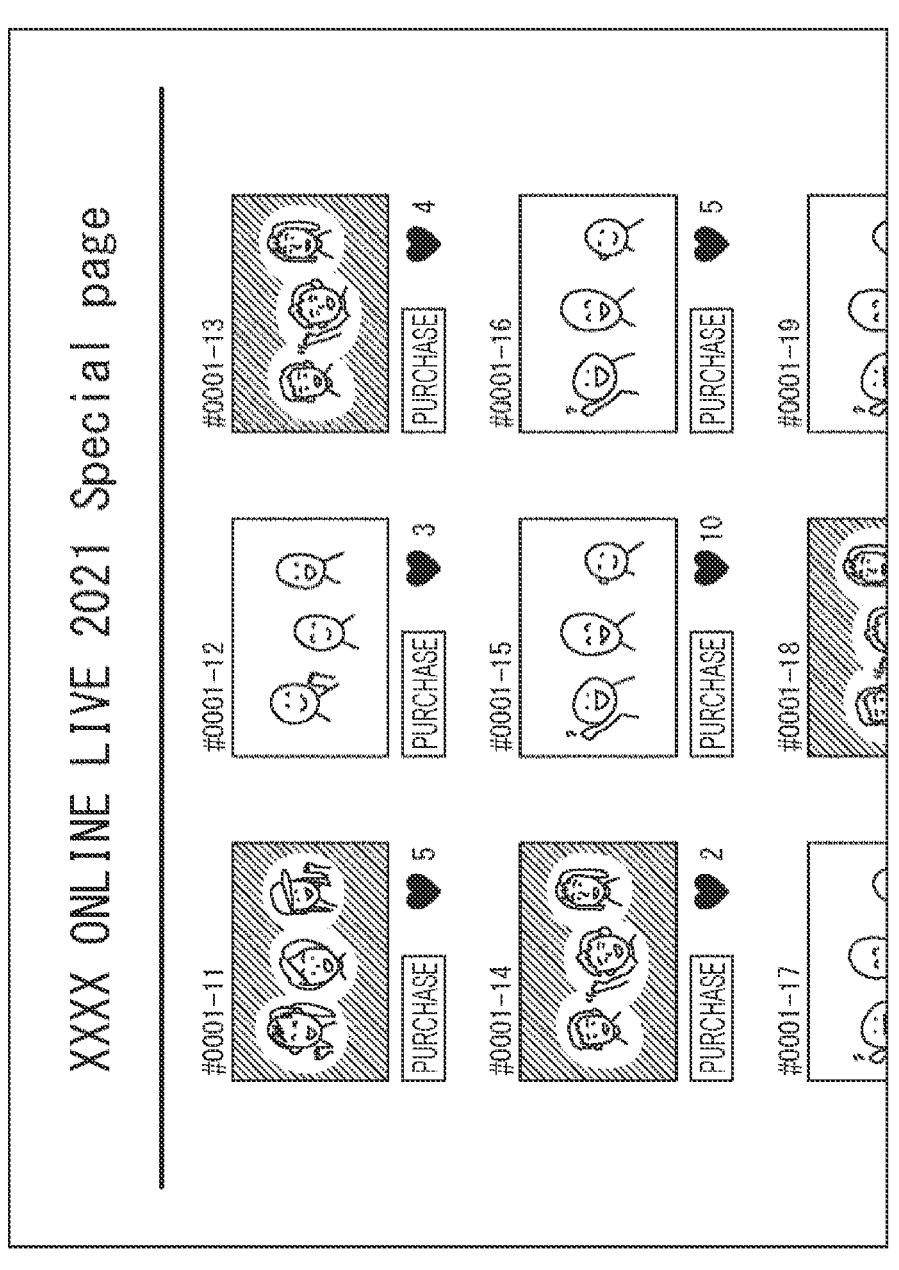
FIG. 44 is a diagram for explaining viewing and purchasing of the distribution video.

In such a case, for example, the control unit 54 generates a thumbnail list page of the custom type distribution video and the dedicated video for each spectator group illustrated in FIG. 44.

The spectator-side terminal 12 or the like accesses the information processing device 11 so as to display the list page illustrated in FIG. 44. Then, the spectator can appropriately operate the input unit 95, select a desired custom type distribution video or dedicated video, and view or purchase the select custom type distribution video or dedicated video.

For example, at the time of purchasing the custom type distribution video or the dedicated video, the control unit 54 reads the custom type distribution video or the dedicated video purchased by the spectator from the recording unit 53 and supplies the video to the communication unit 52, and makes the communication unit 52 transmit the video to the spectator-side terminal 12.

Note that, for example, the video that can be purchased by the spectator can be only the custom type distribution video and the dedicated video of the spectator group to which the spectator belongs. Furthermore, the custom type distribution video and the dedicated video may be downloaded for free.

As described above, each spectator can obtain the custom type distribution video and the dedicated video as memories and souvenirs of the remote live. Furthermore, by making it possible to view or purchase the custom type distribution video and the dedicated video, it is possible to provide a place where the spectators who have participated in the remote live can communicate with each other.

Note that, here, an example has been described in which the custom type distribution video dedicated to the spectator group is generated. However, similarly, it is needless to say that a custom type distribution video and a dedicated video dedicated to an individual spectator may be generated.

Furthermore, hereinafter, an example has been described in which the video of the remote live is distributed. However, the present technology can be applied to any other event without limiting to the remote live. That is, the present technology can be applied to a case where a video of an arbitrary event is distributed to a spectator outside a venue of the event. In such a case, an effect video that changes according to a reaction of the spectator outside the event venue regarding the event is generated.

Configuration Example of Computer

Note that, the above-described series of processing may be executed by hardware or software. In a case where the series of processing is executed by the software, a program forming the software is installed on a computer. Here, examples of the computer include a computer incorporated in dedicated hardware, and for example, a general-purpose personal computer capable of executing various functions by installing various programs.

Figure 45:
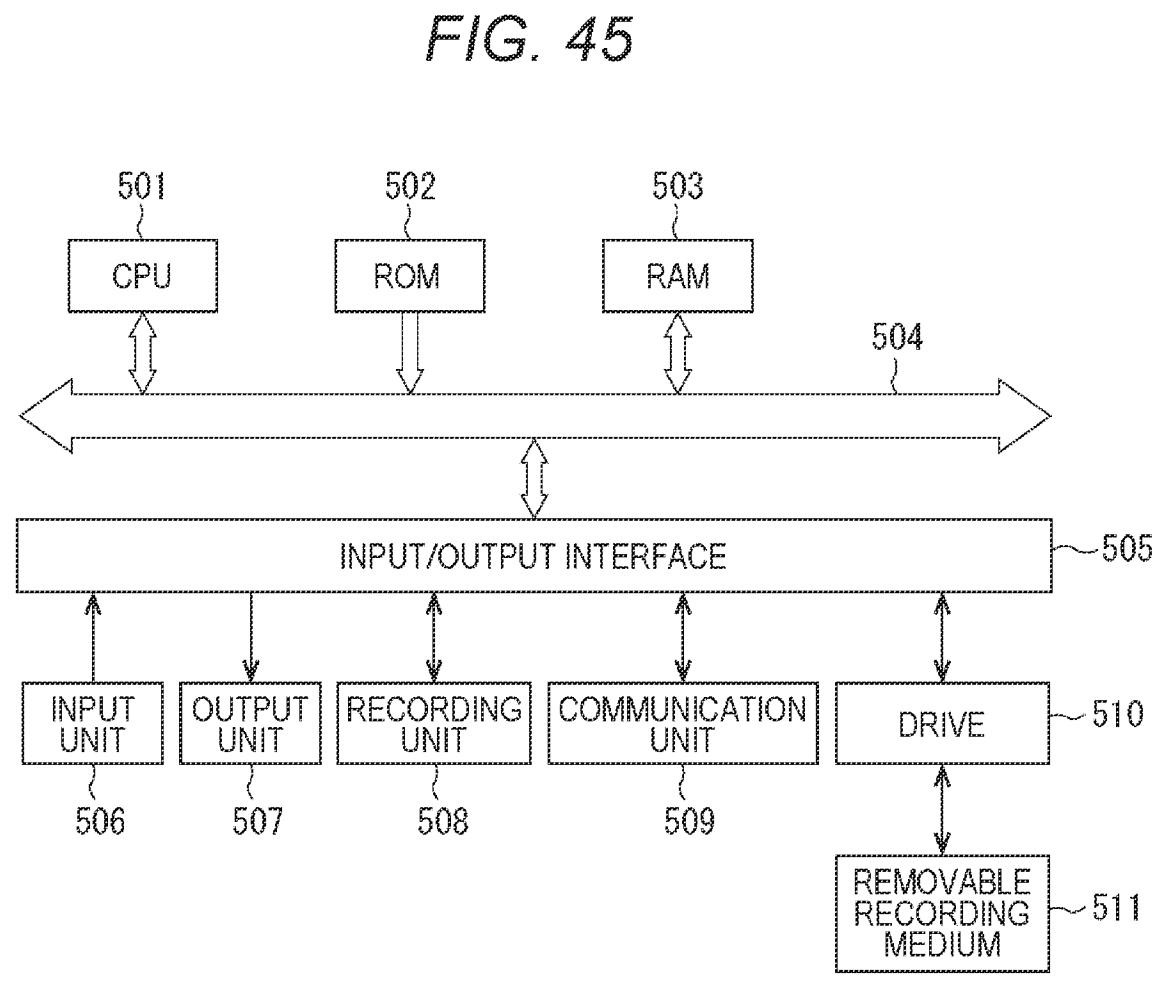

FIG. 45 is a block diagram illustrating a configuration example of hardware of a computer that executes the above-described series of processing by a program.

In the computer, a central processing unit (CPU) 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input/output interface 505 and the bus 504, and executes the program, so as to execute the above-described series of processing.

The program executed by the computer (CPU 501) can be provided by being recorded on the removable recording medium 511 as a package medium and the like, for example. Furthermore, the program may be provided via a wired or wireless transmission medium, such as a local area network, the Internet, or digital satellite broadcasting.

In the computer, the program can be installed in the recording unit 508 via the input/output interface 505 by mounting the removable recording medium 511 on the drive 510. Furthermore, the program can be received by the communication unit 509 via the wired or wireless transmission medium to be installed on the recording unit 508. In addition, the program can be installed in the ROM 502 or the recording unit 508 in advance.

Note that, the program to be executed by the computer may be a program that is processed in time series in the order described herein, or may be a program that is processed in parallel or at required timings such as when a call is made.

Furthermore, the embodiment of the present technology is not limited to the above-described embodiment, and various modifications may be made without departing from the scope of the present technology.

For example, the present technology may be configured as cloud computing in which one function is shared by a plurality of devices via a network to process together.

In addition, each step described in the above flowcharts can be executed by one device or shared and performed by a plurality of devices.

Moreover, in a case where a plurality of types of processing is included in one step, the plurality of types of processing included in the one step can be executed by one device or shared and performed by a plurality of devices.

Moreover, the present technology may also have following configurations.

(1)
An information processing device including:
a communication unit that receives reaction information indicating a reaction of a spectator outside a venue of a predetermined event; and
a control unit that generates an effect video that changes according to the reaction of the spectator, on a basis of the reaction information.

(2)
The information processing device according to (1), in which
the control unit makes a display device that is installed in the venue of the event display the effect video.

(3)
The information processing device according to (1) or (2), in which
the effect video includes a particle expression video.

(4)
The information processing device according to any one of (1) to (3), in which
the control unit generates the effect video for each spectator or for each spectator group including a plurality of the spectators.

(5)
The information processing device according to any one of (1) to (4), in which
the control unit generates a video of the event including the effect video as a subject.

(6)
The information processing device according to (5), in which
the communication unit transmits the video of the event to a terminal of the spectator.

(7)
The information processing device according to any one of (1) to (6), in which
the communication unit receives an instruction input regarding the effect video, from a terminal, in the venue of the event, and operated by a performer or an operator concerned party of the event, and
the control unit generates the effect video on a basis of the instruction input.

(8)
The information processing device according to (7), in which
the control unit changes a direction, a size, a position, or a shape of an object in the effect video, according to the instruction input.

(9)
The information processing device according to any one of (1) to (8), in which the effect video includes a video of an object that is generated or changed according to the reaction of the spectator.

(10)

The information processing device according to (9), in which the shape, the size, or a color of the object in the effect video changes, according to the reaction of the spectator.

(11)

The information processing device according to (9) or (10), in which the effect video includes a plurality of objects that changes according to the reactions of the spectators different from each other or the reactions of the spectators belonging to spectator groups different from each other.

(12)

The information processing device according to any one of (1) to (8), in which the control unit generates a video of a collection of characters as the effect video, on a basis of text information received as the reaction information.

(13)

The information processing device according to (12), in which the control unit moves the collection of the characters that has been already displayed in the effect video backward and displays a new collection of the characters based on the newly received text information on a front side of the collection of the characters.

(14)

The information processing device according to (12) or (13), in which the collection of the characters includes an object with a predetermined shape having a surface on which the text information is displayed, and on the surface of the object, a first region in which the newly received text information is displayed and a second region in which the text information older than the text information displayed in the first region is displayed with a font size smaller than that of the text information displayed in the first region are provided.

(15)

The information processing device according to (14), in which the control unit changes a size of the first region, according to a reception frequency of the text information.

(16)

The information processing device according to (15), in which the control unit changes the size of the object, according to a change in the size of the first region.

(17)

The information processing device according to any one of (1) to (8), in which the effect video includes a video of a face of a single or a plurality of the spectators.

(18)

The information processing device according to (5) or (6), further including:

a recording unit that records the effect video or the video of the event.

(19)

An information processing method including:

by an information processing device, receiving reaction information indicating a reaction of a spectator outside a venue of a predetermined event; and generating an effect video that changes according to the reaction of the spectator, on a basis of the reaction information.

(20)

A program for causing a computer to execute processing including steps for:

receiving reaction information indicating a reaction of a spectator outside a venue of a predetermined event; and generating an effect video that changes according to the reaction of the spectator, on a basis of the reaction information.

REFERENCE SIGNS LIST

11 Information processing device
12-1 to 12-N, 12 Spectator-side terminal
13 Operation-side terminal
41 Display device
42 Camera
51 Acquisition unit
52 Communication unit
53 Recording unit
54 Control unit
91 Display unit
93 Camera
94 Reaction detection unit
95 Input unit
96 Communication unit
97 Recording unit
98 Control unit

The invention claimed is:

1. An information processing method comprising:

receiving, from a terminal device of a spectator, reaction information indicating a reaction of the spectator of a predetermined event; and generating an effect object that changes according to the reaction of the spectator, on a basis of the reaction information, wherein at least one of a size, a shape, a color of the effect object is changed based on the reaction information, and wherein in a case where the terminal device of the spectator connects a penlight-type device or a device worn by a wrist of the spectator, the reaction information is an acceleration of a movement of the penlight-type device or the device worn by the wrist of the spectator.

2. The information processing method according to claim 1, wherein the method further comprises displaying, by a display device that is installed in the event, the effect object.

3. The information processing method according to claim 1, wherein the effect object includes a particle expression video.

4. The information processing method according to claim 1, wherein the method further comprises generating the effect object for each spectator or for each spectator group including a plurality of the spectators.

5. The information processing method according to claim 1, wherein the method further comprises:

receiving an instruction input regarding the effect object, from a terminal, in the event, and operated by a performer or an operator of the event; and generating the effect object on a basis of the instruction input.

6. The information processing method according to claim 5, wherein the method further comprises changing a direction, a size, a position, or a shape of an object in the effect object, according to the instruction input.

7. The information processing method according to claim 1, wherein the effect object includes a video of an object that is generated or changed according to the reaction of the spectator.

8. The information processing method according to claim 7, wherein a shape, a size, or a color of the object in the effect object changes, according to the reaction of the spectator.

9. The information processing method according to claim 7, wherein the effect object includes a plurality of objects that changes according to the reactions of the spectators different from each other or the reactions of the spectators belonging to spectator groups different from each other.

10. The information processing method according to claim 1, wherein the method further comprises generating a video of a collection of characters as the effect object, on a basis of text information newly received as the reaction information.

11. The information processing method according to claim 10, wherein the method further comprises moving the collection of the characters that has been already displayed in the effect object backward and control a displaying of a new collection of the characters based on the newly received text information on a front side of the collection of the characters.

12. The information processing method according to claim 10, wherein the collection of the characters includes an object with a predetermined shape having a surface on which the text information is displayed, and on the surface of the object, a first region in which the newly received text information is displayed and a second region in which the text information older than the text information displayed in the first region is displayed with a font size smaller than that of the text information displayed in the first region are provided.

13. The information processing method according to claim 12, wherein the method further comprises changing a size of the first region, according to a reception frequency of the text information.

14. The information processing method according to claim 13, wherein the method further comprises changing a size of the object, according to a change in the size of the first region.

15. The information processing method according to claim 1, wherein the effect object includes a video of a face of a single or a plurality of the spectators.

16. The information processing method according to claim 1, wherein the method further comprises recording the effect object or a video of the event.

17. An information processing system comprising:

an information processing device comprising:

circuitry configured to:

receive, from a terminal device of a spectator, reaction information indicating a reaction of the spectator of a predetermined event; and perform control to generate an effect object that changes according to the reaction of the spectator, on a basis of the reaction information, wherein at least one of a size, a shape, a color of the effect object is changed based on the reaction information, and wherein in a case where the terminal device of the spectator connects a penlight-type device or a device worn by a wrist of the spectator, the reaction information is an acceleration of a movement of the penlight-type device or the device worn by the wrist of the spectator.

18. A non-transitory computer-readable medium having embodied thereon a program, which when executed by a computer causes the computer to execute an information processing method, the method comprising:

receiving, from a terminal device of a spectator, reaction information indicating a reaction of the spectator of a predetermined event; and generating an effect object that changes according to the reaction of the spectator, on a basis of the reaction information, wherein at least one of a size, a shape, a color of the effect object is changed based on the reaction information, and wherein in a case where the terminal device of the spectator connects a penlight-type device or a device worn by a wrist of the spectator, the reaction information is an acceleration of a movement of the penlight-type device or the device worn by the wrist of the spectator.

* * * * *